(12) United States Patent
Cirik et al.

(10) Patent No.: US 12,389,424 B2
(45) Date of Patent: Aug. 12, 2025

(54) METHODS, SYSTEMS, AND APPARATUSES FOR BEAM MANAGEMENT

(71) Applicant: Ofinno, LLC, Reston, VA (US)

(72) Inventors: Ali Cagatay Cirik, Chantilly, VA (US); Esmael Hejazi Dinan, McLean, VA (US); Hua Zhou, Vienna, VA (US); Hyoungsuk Jeon, Centreville, VA (US); Alireza Babaei, Fairfax, VA (US); Kyungmin Park, Vienna, VA (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/598,531

(22) Filed: Mar. 7, 2024

(65) Prior Publication Data

US 2024/0292422 A1 Aug. 29, 2024

Related U.S. Application Data

(63) Continuation of application No. 16/738,681, filed on Jan. 9, 2020, now Pat. No. 11,968,679.
(Continued)

(51) Int. Cl.
*H04W 72/23* (2023.01)
*H04B 7/06* (2006.01)
(Continued)

(52) U.S. Cl.
CPC .......... *H04W 72/23* (2023.01); *H04B 7/0695* (2013.01); *H04B 7/088* (2013.01);
(Continued)

(58) Field of Classification Search
CPC .................................................... H04W 72/23
See application file for complete search history.

(56) References Cited

U.S. PATENT DOCUMENTS

| 10,651,917 B2 | 5/2020 | Wilson et al. |
| 10,856,316 B2 | 12/2020 | Liou et al. |

(Continued)

FOREIGN PATENT DOCUMENTS

| CN | 108199819 A | 6/2018 |
| EP | 3319244 A1 | 5/2018 |

OTHER PUBLICATIONS

R1-1813251 3GPP TSG-RAN WG1 Meeting #95, Spokane, USA, Nov. 12-16, 2018, Source: Ericsson, Title: Draft CR to TS 38.213 on PDCCH QCL TypeD collision.
(Continued)

*Primary Examiner* — Jason E Mattis
(74) *Attorney, Agent, or Firm* — Patrick Moon; Kavon Nasabzadeh; Jacob L. Mangan

(57) ABSTRACT

Wireless communications are described. A base station may send control information for scheduling data to be transmitted to the wireless device via a downlink. The control information may comprise one or more indications of wireless resources to be used by the wireless device to receive the data. The wireless device may receive the data based on one or more determinations/conditions, such as satisfying a time offset (e.g., between reception of the downlink information and a scheduled transmission of the data), whether a control resource set is configured to indicate a transmission configuration state, and/or whether the control information indicates a transmission configuration state.

20 Claims, 31 Drawing Sheets

Related U.S. Application Data

(60) Provisional application No. 62/790,753, filed on Jan. 10, 2019, provisional application No. 62/790,317, filed on Jan. 9, 2019.

(51) Int. Cl.
| | |
|---|---|
| *H04B 7/08* | (2006.01) |
| *H04L 5/00* | (2006.01) |
| *H04L 5/10* | (2006.01) |
| *H04L 25/02* | (2006.01) |
| *H04W 72/044* | (2023.01) |
| *H04W 80/02* | (2009.01) |

(52) U.S. Cl.
CPC .............. *H04L 5/0051* (2013.01); *H04L 5/10* (2013.01); *H04L 25/0226* (2013.01); *H04W 72/046* (2013.01); *H04W 80/02* (2013.01)

(56) References Cited

U.S. PATENT DOCUMENTS

| | | | |
|---|---|---|---|
| 10,925,083 | B2 | 2/2021 | Lee et al. |
| 10,931,355 | B2 | 2/2021 | Huang |
| 10,931,389 | B2 | 2/2021 | Lee et al. |
| 10,952,231 | B2 | 3/2021 | Liou |
| 10,986,622 | B2 | 4/2021 | Zhang et al. |
| 11,006,403 | B2 | 5/2021 | Zhang et al. |
| 11,882,580 | B2 | 1/2024 | Song et al. |
| 2017/0237478 | A1 | 8/2017 | Kwak et al. |
| 2019/0027363 | A1 | 1/2019 | Im et al. |
| 2019/0104477 | A1 | 4/2019 | MolavianJazi et al. |
| 2019/0320469 | A1 | 10/2019 | Huang et al. |
| 2019/0342907 | A1 | 11/2019 | Huang et al. |
| 2020/0204246 | A1* | 6/2020 | Zhou ................... H04W 72/044 |
| 2020/0221405 | A1 | 7/2020 | Zarifi |
| 2020/0221435 | A1* | 7/2020 | Kim ....................... H04L 5/0048 |
| 2020/0221485 | A1 | 7/2020 | Cirik et al. |
| 2020/0288479 | A1 | 9/2020 | Xi et al. |
| 2020/0337058 | A1 | 10/2020 | Song et al. |
| 2021/0045141 | A1* | 2/2021 | Lee ........................ H04L 5/0053 |
| 2021/0051667 | A1 | 2/2021 | Yang et al. |
| 2021/0159966 | A1 | 5/2021 | Xi et al. |
| 2021/0167821 | A1 | 6/2021 | Chen et al. |
| 2021/0168714 | A1 | 6/2021 | Guan et al. |
| 2021/0212098 | A1 | 7/2021 | Yoon et al. |
| 2021/0250152 | A1 | 8/2021 | Zhang et al. |
| 2021/0337453 | A1 | 10/2021 | Gao et al. |
| 2021/0345390 | A1 | 11/2021 | Okamura et al. |
| 2021/0409091 | A1 | 12/2021 | Svedman et al. |
| 2021/0409094 | A1* | 12/2021 | Yuan ...................... H04W 72/23 |
| 2022/0116247 | A1* | 4/2022 | Sengupta ............. H04L 5/0051 |
| 2023/0115798 | A1* | 4/2023 | Lee ..................... H04W 52/362 |
| | | | 370/318 |

OTHER PUBLICATIONS

R1-1813251 3GPP TSG-RAN WG1 Meeting #95, Spokane, USA, Nov. 12-16, 2018, Source: Ericsson, Title: Maintenance for simultaneous RX and TX.
R1-1813300 3GPP TSG-RAN WG1 Meeting #95, Spokane, USA, Nov. 12-16, 2018, Source: NTT Docomo, Inc., Title: Simultaneous Tx for physical channels.
R1-1813398 3GPP TSG-RAN WG1 Meeting #95, Spokane, USA, Nov. 12-16, 2018, Source: Qualcomm Incorporated Title: Details on simultaneous reception/transmission of PHY channels and RS in FR2.
R1-18xxxxx 3GPP TSG-RAN WG1 Meeting #95, Spokane, USA, Nov. 12-16, 2018, Source: NTT Docomo, Inc., Title: Offline summary for PDCCH structure and search space.
R1-1814011 3GPP TSG-RAN WG1 Meeting #95, Spokane, USA, Nov. 12-16, 2018, Source: Intel, Ericsson, Huawei, Vivo, Nokia, Title: Proposal for simultaneous Tx and Rx of channels and RS.
R1-1814011 3GPP TSG-RAN WG1 Meeting #95, Spokane, USA, Nov. 12-16, 2018, Source: Intel, Ericsson, Huawei, Vivo, Nokia, Title: Proposal for simultaneous Tx and Rx of channels and RS (draft).
May 20, 2020—European Extended Search Report—EP 20150971.8.
R1-1813915 3GPP TSG-RAN WG1 Meeting #95, Spokane, USA, Nov. 12-16, 2018, Source: ZTE, Title: Discussion on draft CRs on RS and QCL.
R1-1810643 3GPP TSG-RAN WG1 Meeting #94, Gothenburg, Sweden, Aug. 20-24, 2018, Source: Sony, Title: Considerations on Multi-TRP/Panel Transmission.
R1-1813896 3GPP TSG-RAN WG1 Meeting #95, Spokane, USA, Nov. 12-16, 2018, Source: Intel Corporation, Title: Summary for simultaneous Tx and Rx of channels and RS.
Jul. 27, 2021—European Office Action—EP 20151054.2.
Nov. 18, 2022—EP Search Report—EP App. No. 22187003.3.
R1-1811996 3GPP TSG RAN WG1 Meeting #94bis, Chengdu, China, Oct. 8-12, 2018, Source: Ericsson, Title: Summary of views on beam measurement and reporting-v3.
Apr. 11, 2023—EP Office Action—EP App. No. 20151054.2.
Mar. 25, 2020—European Extended Search Report—EP 20151054.2.
R1-1807958 3GPP TSG RAN1 Meeting #93, Busan, Korea, May 21-25, 2018, Source: Nokia, Title: CR to 38.214 capturing the RAN1#92bis and RAN1#93 meeting agreements.
R1-1810256 3GPP TSG RAN WG1 Meeting #94bis, Chengdu, China, Oct. 8-12, 2018, Source: LG Electronics, Title: Remaining issues on downlink control channel.
R1-1814380 3GPP TSG-RAN WG1 Meeting #95, Spokane, USA, Nov. 12-16, 2018, Source: Samsung, Title: CR to 38.213 capturing the RAN1#94bis and RAN1#95 meeting agreements.
R1-1814400 3GPP TSG-RAN WG1 Meeting #95, Spokane, USA, Nov. 12-16, 2018, Source: Huawei, Title: Combined CR of all essential corrections to 38.212 from RAN1#94bis and RAN1#95.
3GPP TS 38.213 V15.3.0 (Sep. 2018); Technical Specification; 3rd Generation Partnership Project; Technical Specification Group Radio Access Network; NR; Physical layer procedures for control (Release 15).
R1-1814395 3GPP TSG-RAN WG1 Meeting #95, Spokane, USA, Nov. 12-16, 2018, Source: Nokia, Title: Combined CR of all essential corrections to 38.214 from RAN1#94bis and RAN1#95.
3GPP TS 38.214 V15.3.0 (Sep. 2018); Technical Specification; 3rd Generation Partnership Project; Technical Specification Group Radio Access Network; NR; Physical layer procedures for data (Release 15).
3GPP TS 38.321 V15.3.0 (Sep. 2018); Technical Specification; 3rd Generation Partnership Project; Technical Specification Group Radio Access Network; NR; Medium Access Control (MAC) protocol specification (Release 15).
3GPP TS 38.331 V15.3.0 (Sep. 2018), Technical Specification; 3rd Generation Partnership Project; Technical Specification Group Radio Access Network; NR; Radio Resource Control (RRC) Protocol Specification (Release 15).
R2-1818749 3GPP TSG-RAN WG2 Meeting #104, Spokane, USA, Nov. 12-16, 2018, Source: Samsung, Title: Miscellaneous corrections.
R1-1809881 3GPP TSG-RAN WG1 Meeting #94, Gothenburg, Sweden, Aug. 20-24, 2018, Source: [RAN1], Intel, Title: draft LS on UE behaviour on reception of channels or RS in the same OFDM symbol.
R1-181xxxx 3GPP TSG-RAN WG1 Meeting #95, Spokane, USA, Nov. 12-16, 2018, Source: Intel Corporation, Title: Summary for simultaneous Tx and Rx of channels and RS.
R1-1808142 3GPP TSG-RAN WG1 Meeting #94, Gothenburg, Sweden, Aug. 20-24, 2018, Source: Huawei, HiSilicon, Title: Remaining issues on simultaneous reception or transmission over CCs and BWPs.
R1-1808198 3GPP TSG-RAN WG1 Meeting #94, Gothenburg, Sweden, Aug. 20-24, 2018, Source: ZTE, Title: Simultaneous transmission and reception of different channels and reference signals.

(56) References Cited

OTHER PUBLICATIONS

R1-1808199 3GPP TSG-RAN WG1 Meeting #94, Gothenburg, Sweden, Aug. 20-24, 2018, Source: ZTE, Title: Enhancements on multi-beam operation.
R1-1808223 3GPP TSG-RAN WG1 Meeting #94, Gothenburg, Sweden, Aug. 20-24, 2018, Source: vivo, Title: Remaining issues on simultaneous reception of DL/UL physical channels and RSs.
R1-1808265 3GPP TSG-RAN WG1 Meeting #94, Gothenburg, Sweden, Aug. 20-24, 2018, Source: MediaTek Inc., Title: Discussions on simultaneous reception and transmission across CCs.
R1-1808377 3GPP TSG-RAN WG1 Meeting #94, Gothenburg, Sweden, Aug. 20-24, 2018, Source: CATT, Title: Discussion on simultaneous transmission and reception of physical signals/channels.
R1-1808489 3GPP TSG-RAN WG1 Meeting #94, Gothenburg, Sweden, Aug. 20-24, 2018, Source: LG Electronics, Title: Remaining issues on simultaneous Tx/Rx.
R1-1808671 3GPP TSG-RAN WG1 Meeting #94, Gothenburg, Sweden, Aug. 20-24, 2018, Source: Intel Corporation, Title: Simultaneous Tx and Rx of channels and RS.
R1-1808752 3GPP TSG-RAN WG1 Meeting #94, Gothenburg, Sweden, Aug. 20-24, 2018, Source: Samsung, Title: Simultaneous reception of physical channels and reference signals.
R1-1809140 3GPP TSG-RAN WG1 Meeting #94, Gothenburg, Sweden, Aug. 20-24, 2018, Source: NTT Docomo, Inc., Title: Simultaneous Tx/Rx of UL/DL physical channels and reference signals.
R1-1809199 3GPP TSG-RAN WG1 Meeting #94, Gothenburg, Sweden, Aug. 20-24, 2018, Source: Ericsson, Title: On simultaneous transmission and reception in FR2.
R1-1809240 3GPP TSG-RAN WG1 Meeting #94, Gothenburg, Sweden, Aug. 20-24, 2018, Source: Nokia, Nokia Shanghai Bell, Title: On simultaneous transmission and reception of multiplexed channels.
R1-1809425 3GPP TSG-RAN WG1 Meeting #94, Gothenburg, Sweden, Aug. 20-24, 2018, Source: Qualcomm Incorporated, Title: Details on simultaneous reception/transmission of PHY channels and RS in FR2.
R1-1809820 3GPP TSG-RAN WG1 Meeting #94, Gothenburg, Sweden, Aug. 20-24, 2018, Source: Intel Corporation, Title: Summary of simultaneous Rx and Tx.
R1-1809882 3GPP TSG-RAN WG1 Meeting #94, Gothenburg, Sweden, Aug. 20-24, 2018, Source: Intel Corporation, Title: Guidance on simultaneous reception of channels or RS.
R1-1810102 3GPP TSG RAN WG1 Meeting #94bis, Chengdu, China, Oct. 8-12, 2018, Source: Huawei, HiSilicon, Title: Remaining issues on simultaneous reception or transmission over CC/BWP(s).
R1-1810216 3GPP TSG RAN WG1 Meeting #94bis, Chengdu, China, Oct. 8-12, 2018, Source: ZTE, Title: Simultaneous transmission and reception of channels/signals.
R1-1810368 3GPP TSG RAN WG1 Meeting #94bis, Chengdu, China, Oct. 8-12, 2018, Source: vivo, Title: Maintenance for simultaneous reception of DL/UL physical channels and RSs.
R1-1810753 3GPP TSG RAN WG1 Meeting #94bis, Chengdu, China, Oct. 8-12, 2018, Source: Intel Corporation, Title: Simultaneous Tx and Rx of channels and RS.
R1-1810841 3GPP TSG RAN WG1 Meeting #94bis, Chengdu, China, Oct. 8-12, 2018, Source: Samsung, Title: Simultaneous reception of physical channels and reference signals.
R1-1811233 3GPP TSG RAN WG1 Meeting #94bis, Chengdu, China, Oct. 8-12, 2018, Source: Qualcomm Incorporated, Title: Details on simultaneous reception/transmission of PHY channels and RS in FR2.
R1-1811353 3GPP TSG RAN WG1 Meeting #94bis, Chengdu, China, Oct. 8-12, 2018, Source: NTT Docomo, Inc., Title: Simultaneous Tx/Rx for physical channels.
R1-1811549 3GPP TSG RAN WG1 Meeting #94bis, Chengdu, China, Oct. 8-12, 2018, Source: Ericsson, Title: On simultaneous transmission and reception in FR2.
R1-1811820 3GPP TSG RAN WG1 Meeting #94bis, Chengdu, China, Oct. 8-12, 2018, Source: NTT Docomo, Inc., Title: Offline summary for PDCCH structure and search space.
R1-1812004 3GPP TSG RAN WG1 Meeting #94bis, Chengdu, China, Oct. 8-12, 2018, Source: Intel Corporation, Title: Summary of simultaneous Rx and Tx.
R1-1812241 3GPP TSG-RAN WG1 Meeting #95, Spokane, USA, Nov. 12-16, 2018, Source: Huawei, HiSilicon, Title: Simultaneous Rx or Tx over CC/BWP(s).
R1-1812268 3GPP TSG-RAN WG1 Meeting #95, Spokane, USA, Nov. 12-16, 2018, Source: ZTE, Title: Discussion on draft CR on simultaneous transmission and reception.
R1-1812268 3GPP TSG-RAN WG1 Meeting #95, Spokane, USA, Nov. 12-16, 2018, Source: ZTE, Title: Draft CR to TS 38.213 on simultaneous transmission of CORESET+PDSCH.
R1-1812287 3GPP TSG-RAN WG1 Meeting #95, Spokane, USA, Nov. 12-16, 2018, Source: vivo, Title: Draft CR on simultaneous reception of DL/UL physical channels and RSs.
R1-1812287 3GPP TSG-RAN WG1 Meeting #95, Spokane, USA, Nov. 12-16, 2018, Source: vivo, Title: CR on simultaneous reception of DL/UL physical channels and RSs.
R1-1812469 3GPP TSG-RAN WG1 Meeting #95, Spokane, USA, Nov. 12-16, 2018, Source: Intel Corporation, Title: CR to 38.214 for CSI-RS (TRS, CSI, IM) + PDSCH multiplexing.
R1-1812469 3GPP TSG-RAN WG1 Meeting #95, Spokane, USA, Nov. 12-16, 2018, Source: Intel Corporation, Title: CR to 38.214 for PDCCH + PDSCH multiplexing.
R1-1812469 3GPP TSG-RAN WG1 Meeting #95, Spokane, USA, Nov. 12-16, 2018, Source: Intel Corporation, Title: CR to 38.214 for SRS + SRS multiplexing.
R1-1812469 3GPP TSG-RAN WG1 Meeting #95, Spokane, USA, Nov. 12-16, 2018, Source: Intel Corporation, Title: Simultaneous Tx and Rx of channels and RS.
R1-1812548 3GPP TSG-RAN WG1 Meeting #95, Spokane, USA, Nov. 12-16, 2018, Source: LG Electronics, Title: Draft CR on simultaneous Tx/Rx.
R1-1812959 3GPP TSG-RAN WG1 Meeting #95, Spokane, USA, Nov. 12-16, 2018, Source: Samsung, Title: Simultaneous reception of physical channels and reference signals.
R1-1813251 3GPP TSG-RAN WG1 Meeting #95, Spokane, USA, Nov. 12-16, 2018, Source: Ericsson, Title: Correction to 38.214 on simultaneous reception of PDCCH and PDSCH.
Office Action mailed Dec. 31, 2024 in U.S. Appl. No. 18/635,356.

* cited by examiner

*TCI-State information element*

```
-- ASN1START
-- TAG-TCI-STATE-START

TCI-State ::=           SEQUENCE {
    tci-StateId             TCI-StateId,
    qcl-Type1               QCL-Info,
    qcl-Type2               QCL-Info
OPTIONAL,       -- Need R
    ...
}

QCL-Info ::=            SEQUENCE {
    cell                    ServCellIndex
OPTIONAL,       -- Need R
    bwp-Id                  BWP-Id
OPTIONAL,       -- Cond CSI-RS-Indicated
    referenceSignal         CHOICE {
        csi-rs                  NZP-CSI-RS-ResourceId,
        ssb                     SSB-Index
    },
    qcl-Type                ENUMERATED {typeA, typeB, typeC, typeD},
    ...
}
```

FIG. 21

TCI-State information element

```
TCI-State ::=           SEQUENCE {
    tci-StateId         TCI-StateId,
    tci-StateSets       SEQUENCE (SIZE (1..maxNrofTRPs)) OF TCI-StateSet
                        OPTIONAL, -- Need M,
}

TCI-StateSet ::=        SEQUENCE {
    tci-StateSetId      TCI-StateSetId
    qcl-Type1           QCL-Info,
    qcl-Type2           QCL-Info                        OPTIONAL,     -- Need R
    ...
}

QCL-Info ::=            SEQUENCE {
    cell                ServCellIndex                   OPTIONAL,     -- Need R
    bwp-Id              BWP-Id                          OPTIONAL,     -- Cond CSI-RS-
Indicated
    referenceSignal     CHOICE {
        csi-rs              NZP-CSI-RS-ResourceId,
        ssb                 SSB-Index
    },
    qcl-Type            ENUMERATED {typeA, typeB, typeC, typeD},
    ...
}

TCI-StateSetId ::=      INTEGER (0..maxNrofTRPs-1)
```

FIG. 22

METHODS, SYSTEMS, AND APPARATUSES FOR BEAM MANAGEMENT

CROSS-REFERENCE TO RELATED APPLICATIONS

This application is a continuation of and claims priority to U.S. patent application Ser. No. 16/738,681 filed on Jan. 9, 2020, which claims the benefit of U.S. Provisional Application No. 62/790,753 filed on Jan. 10, 2019 and U.S. Provisional Application No. 62/790,317 filed on Jan. 9, 2019, each of which is hereby incorporated by reference in its entirety.

BACKGROUND

Various procedures may be used for selecting wireless communication resources. A wireless device and/or a base station may select one or more beams among the multiple beams for transmission and/or reception of signals. Signaling protocols may not be able to indicate/provide signaling information for the wireless device to select beams, which may result in the wireless device being unable to determine a beam to be used for transmission and/or reception of signals.

SUMMARY

The following summary presents a simplified summary of certain features. The summary is not an extensive overview and is not intended to identify key or critical elements.

Wireless communications are described. A wireless device may determine/select one or more beams for reception of data from one or more cells and/or transmission points. The wireless device may determine/select one or more default beams and/or the wireless device may prioritize one or more beams (e.g., associated with high reliability and/or a critical procedure). Determination/selection of one or more default beams and/or prioritization of one or more beams for data reception may result in advantages such as more efficient data transfer, higher signal reliability, and/or improved beam alignment between a transmitter and a receiver.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 21 shows an example information element (IE) for a downlink beam management procedure.

FIG. 22 shows an example IE for a downlink beam management procedure.

DETAILED DESCRIPTION

Figure 1:
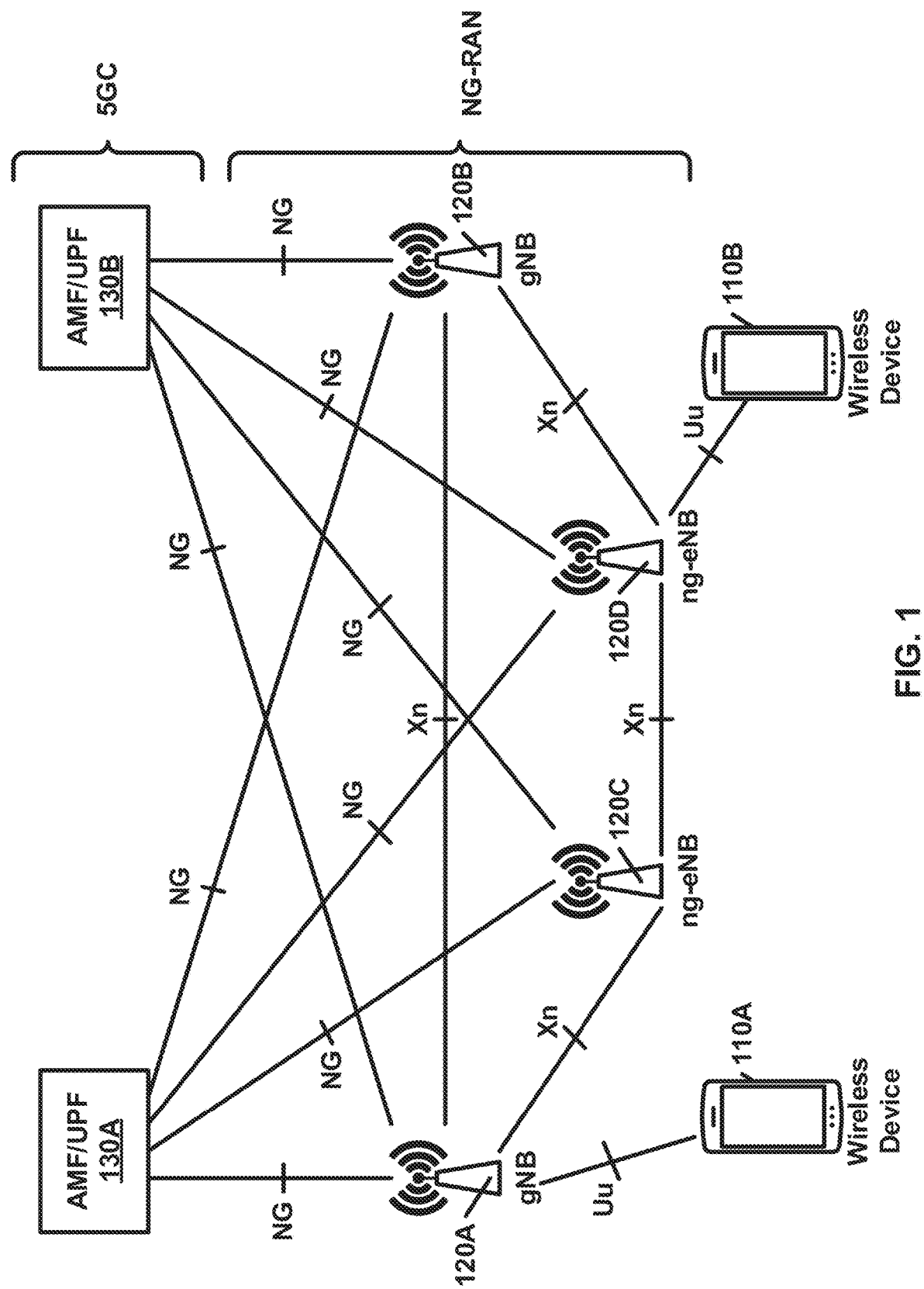
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to procedures for the management of beams and/or other wireless resource in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function ARQ Automatic Repeat Request
AS Access Stratum
ASIC Application-Specific Integrated Circuit
BA Bandwidth Adaptation
BCCH Broadcast Control Channel
BCH Broadcast Channel
BFR Beam Failure Recovery
BLER Block Error Rate
BPSK Binary Phase Shift Keying
BSR Buffer Status Report
BWP Bandwidth Part
CA Carrier Aggregation
CC Component Carrier
CCCH Common Control CHannel
CDMA Code Division Multiple Access
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCH Logical Channel
LCID Logical Channel Identifier
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QOS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SR Scheduling Request SRB Signaling Radio Bearer
SRS Sounding Reference Signal
SS Synchronization Signal
SSB Synchronization Signal Block
SSS Secondary Synchronization Signal
STAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission and Receiving Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QOS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QOS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
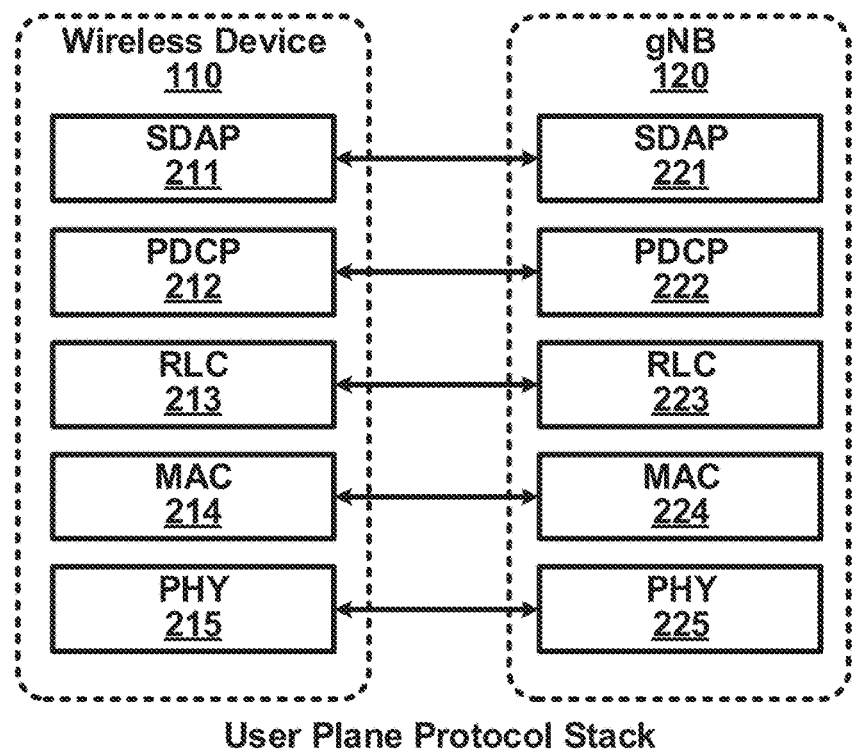
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes.

The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
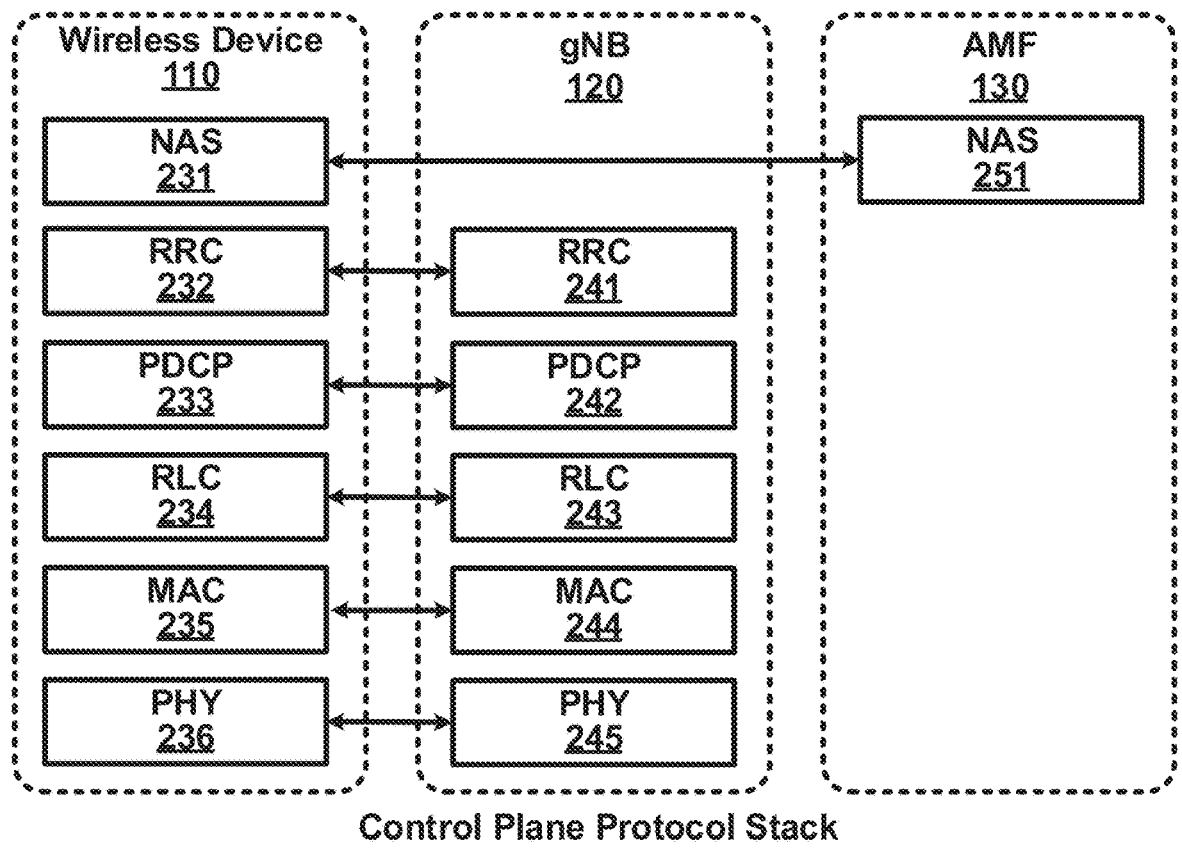
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC subheader corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
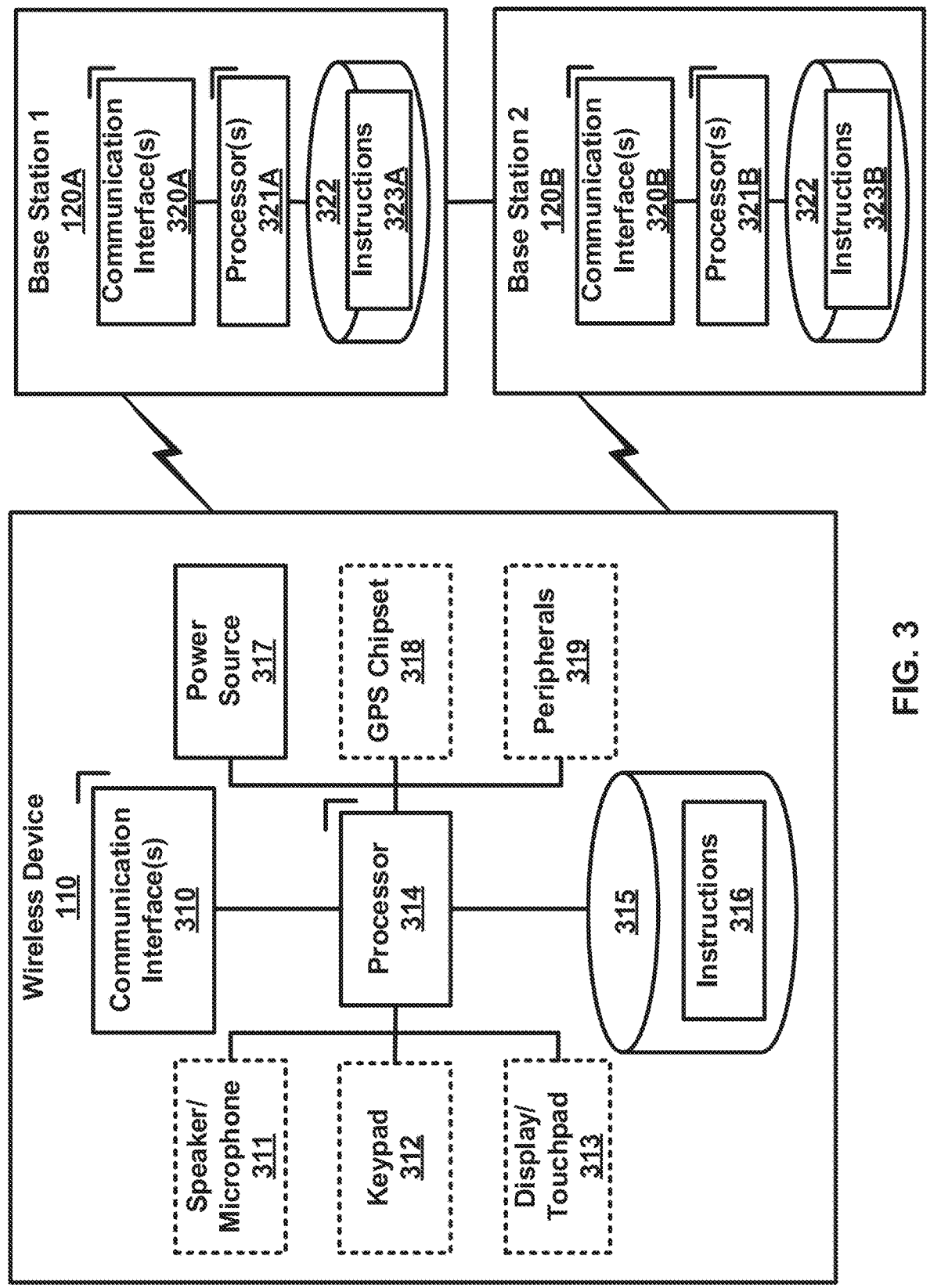
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and System- InformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figure 4A:
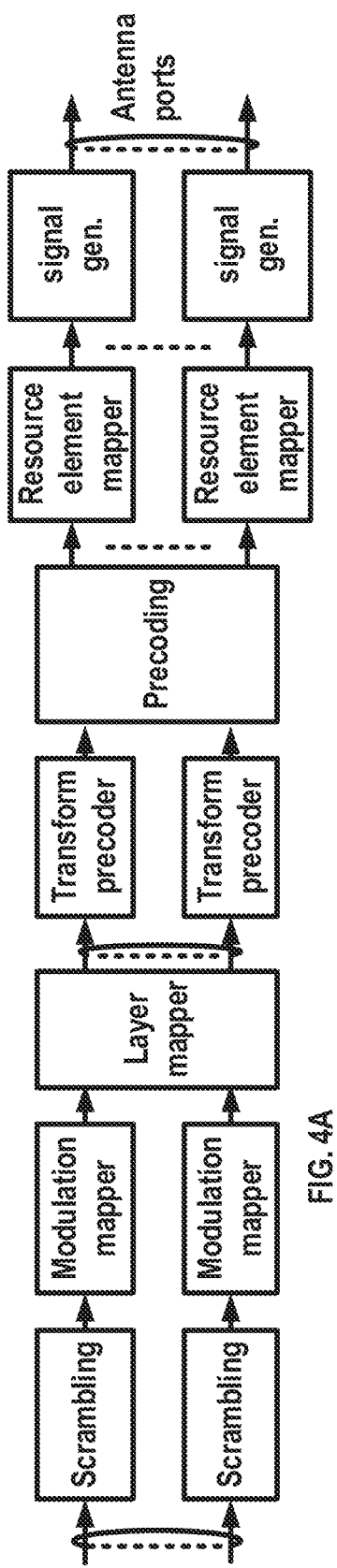
FIG. 4A, FIG. 4B, FIG. 4C, and FIG. 4D show examples of uplink and downlink signal transmission.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

Figure 4B:
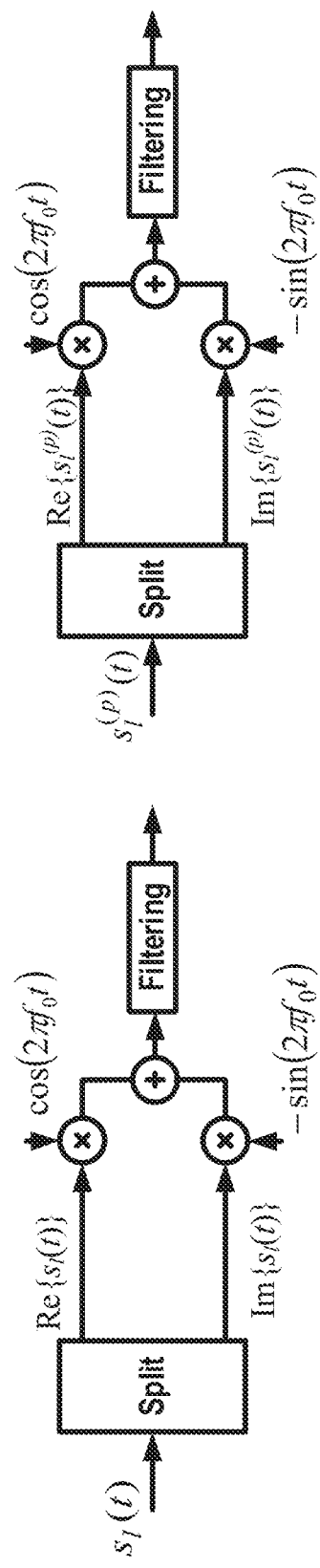

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

Figure 4D:
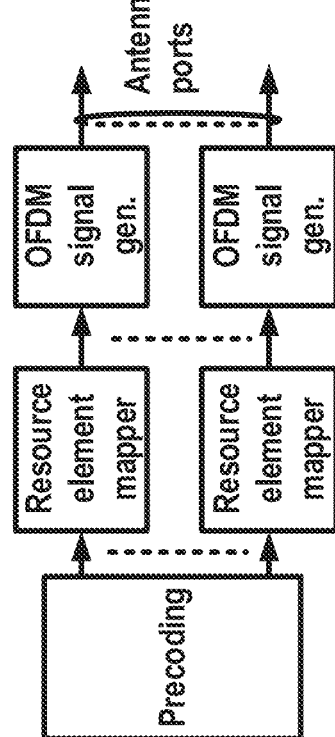
Figure 4C:
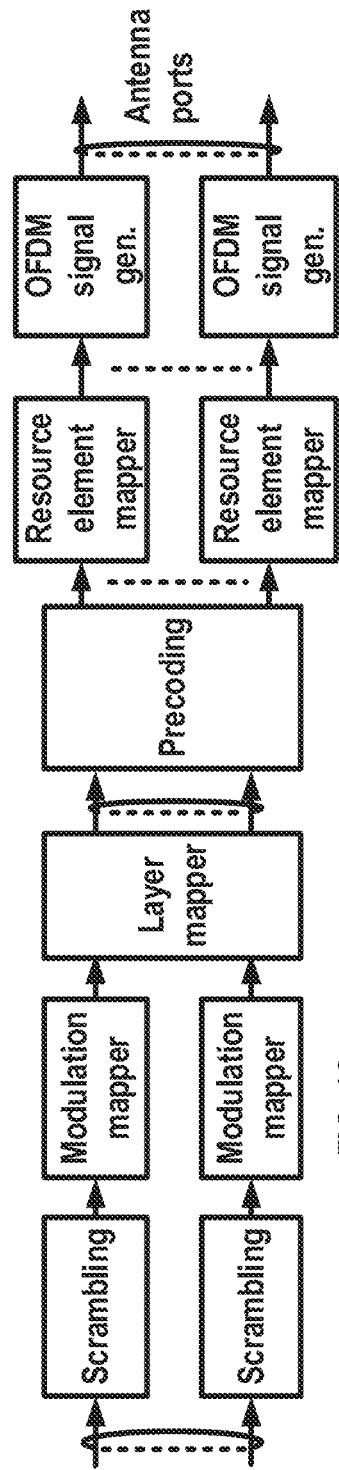

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
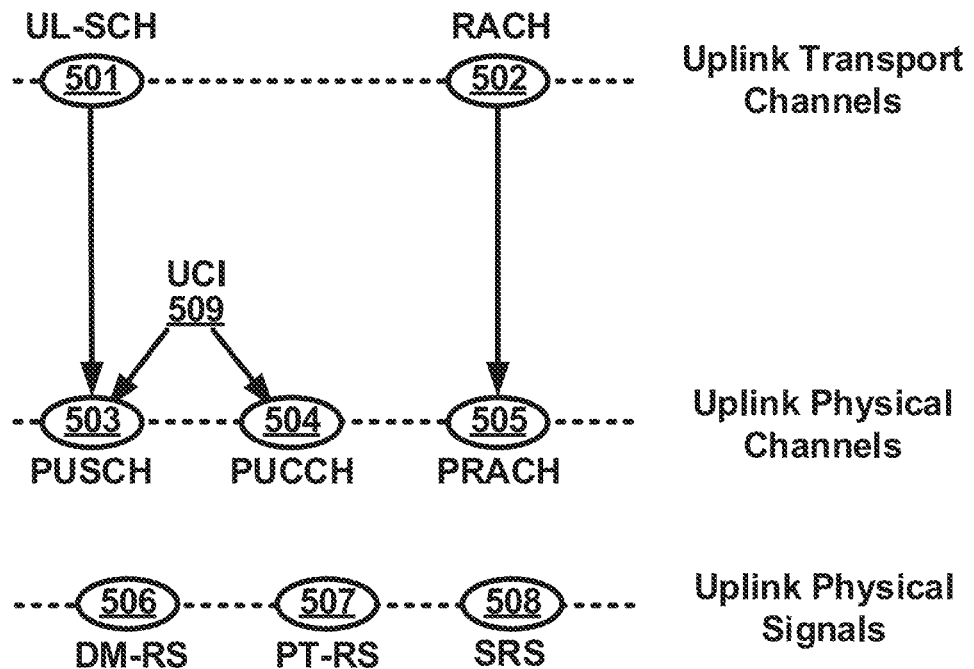
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DM-RS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
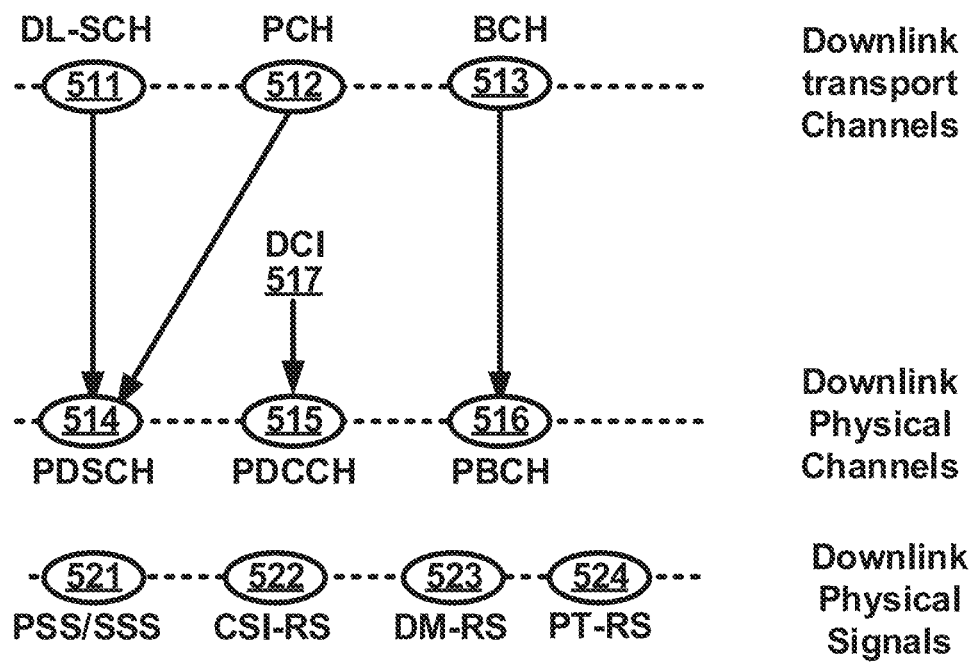
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DM-RS port and a PT-RS port. A number of PT-RS ports may be less than a number of DM-RS ports in a scheduled resource. The downlink PT-RS 524 may be confined in the scheduled time/frequency duration for a wireless device.

Figure 6:
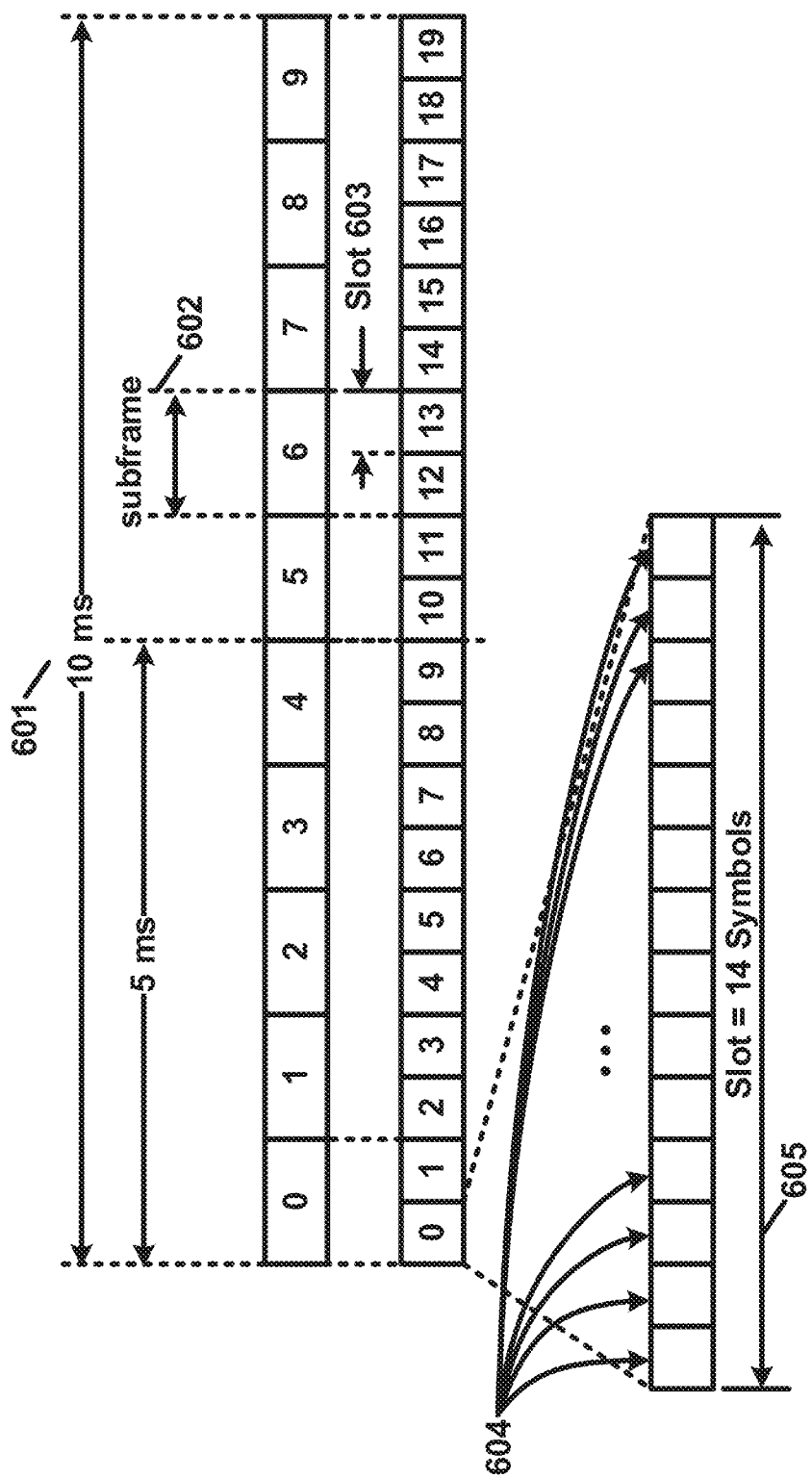
FIG. 6 shows an example transmission time and/or reception time for a carrier.

FIG. 6 shows an example transmission time and reception time, as well as an example frame structure, for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
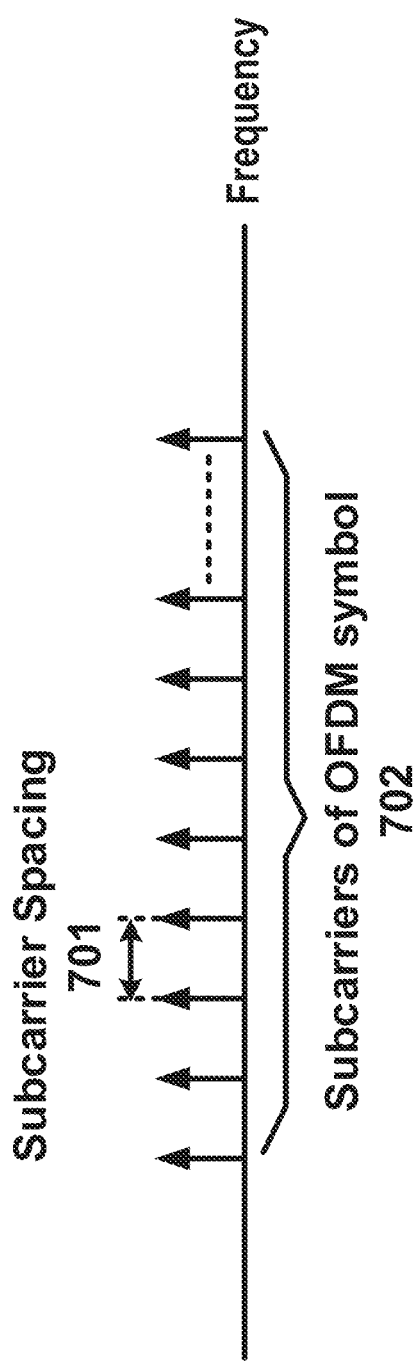
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
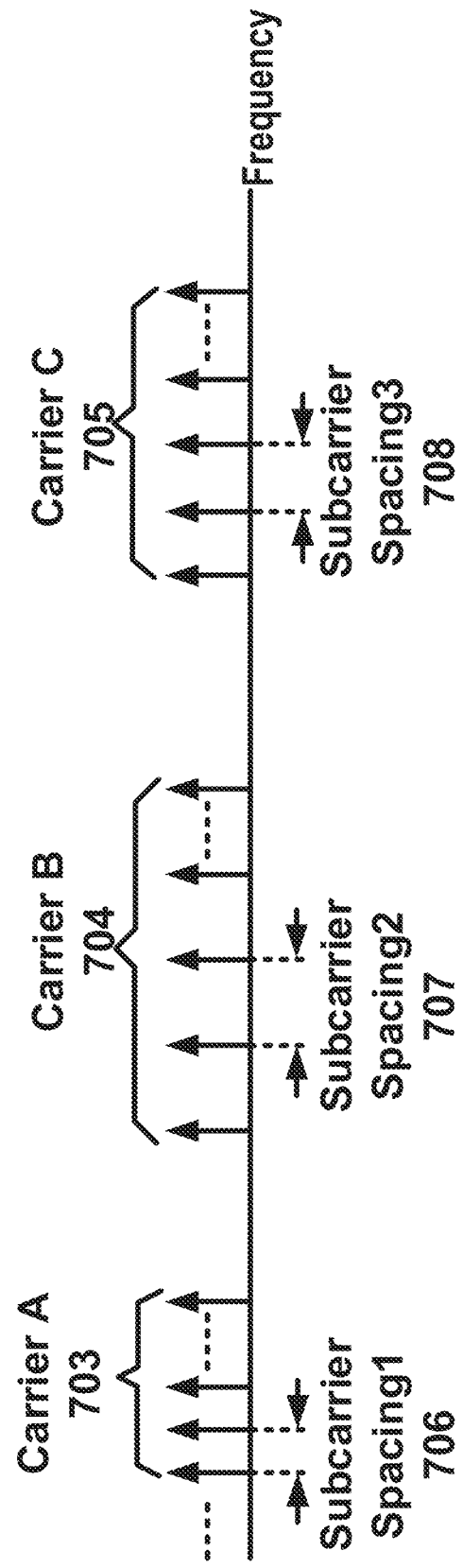

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
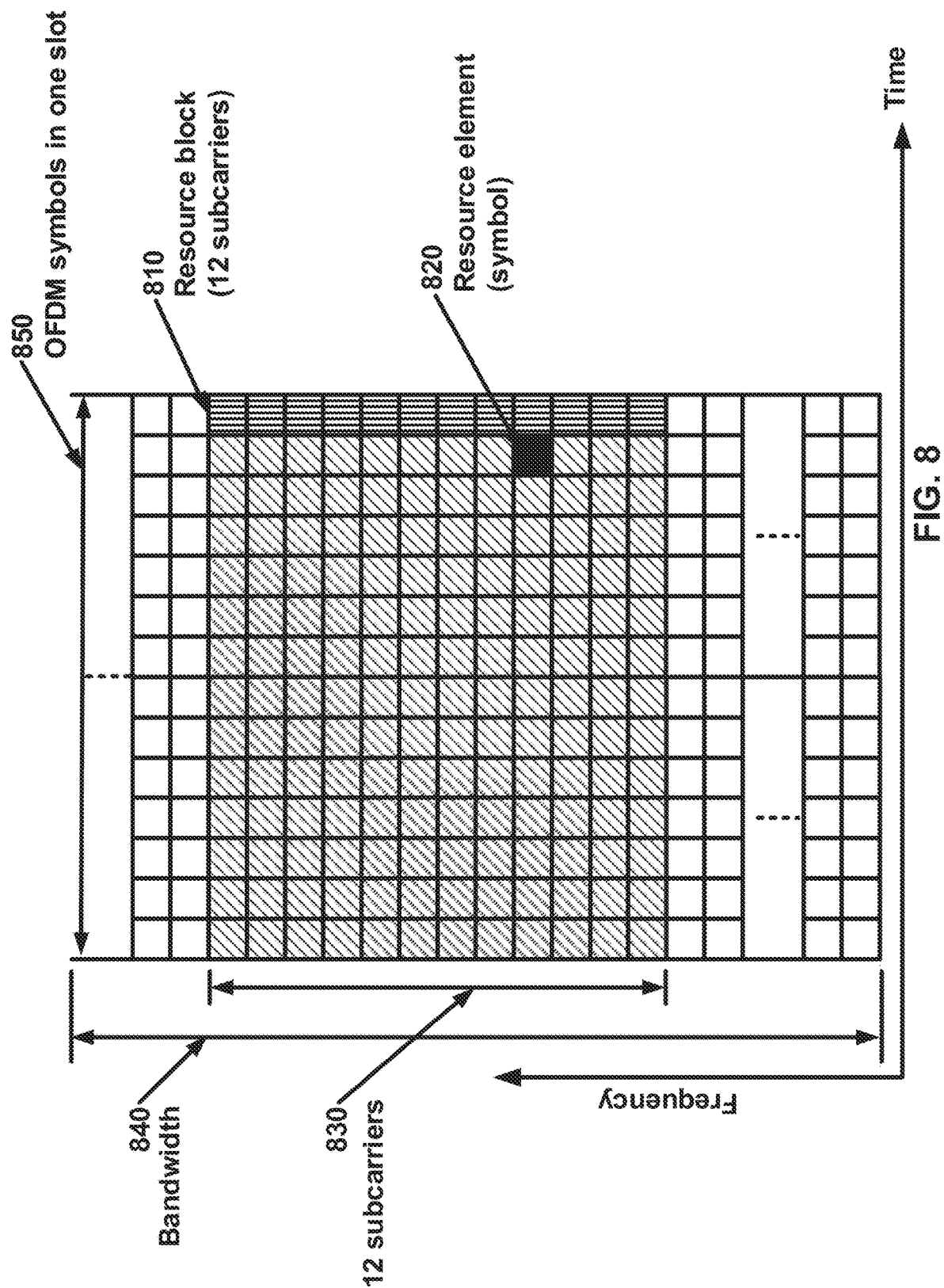
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
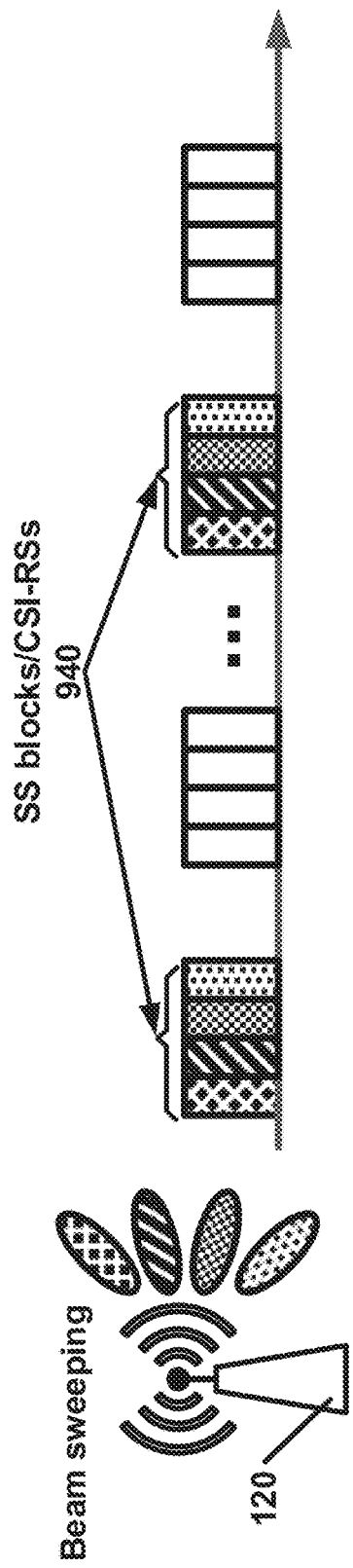
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
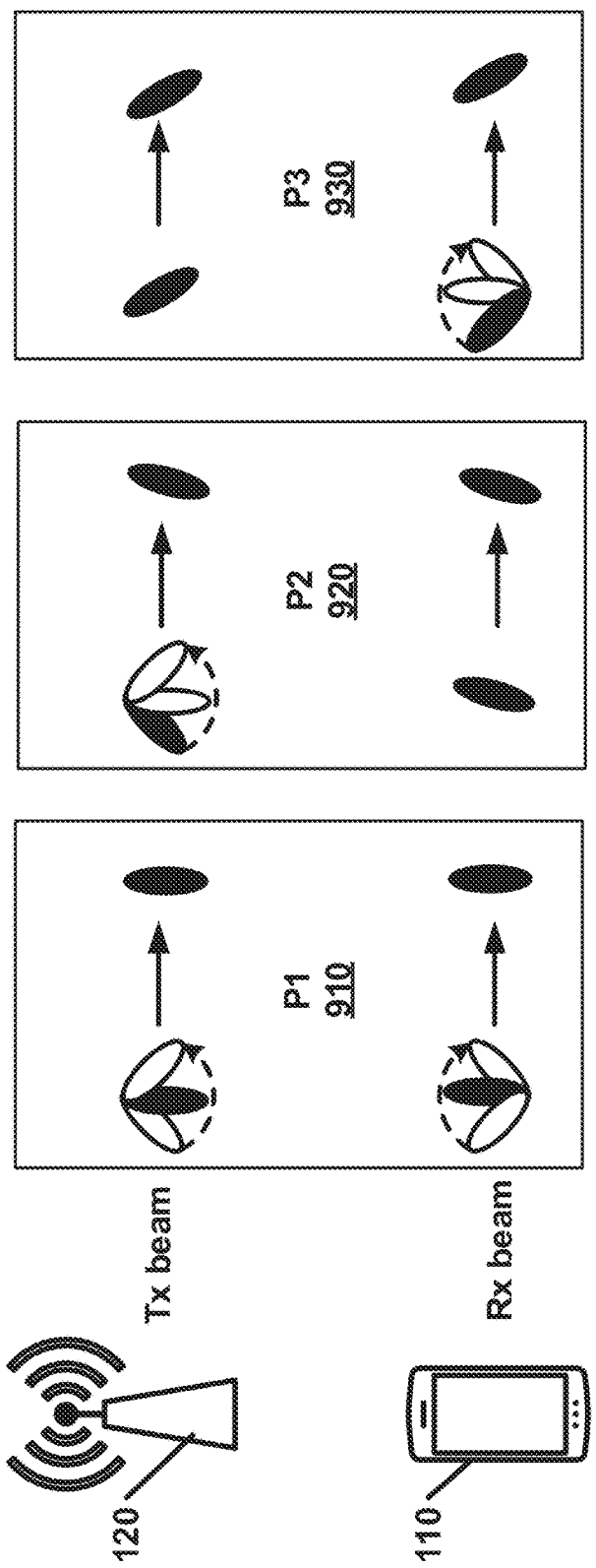
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
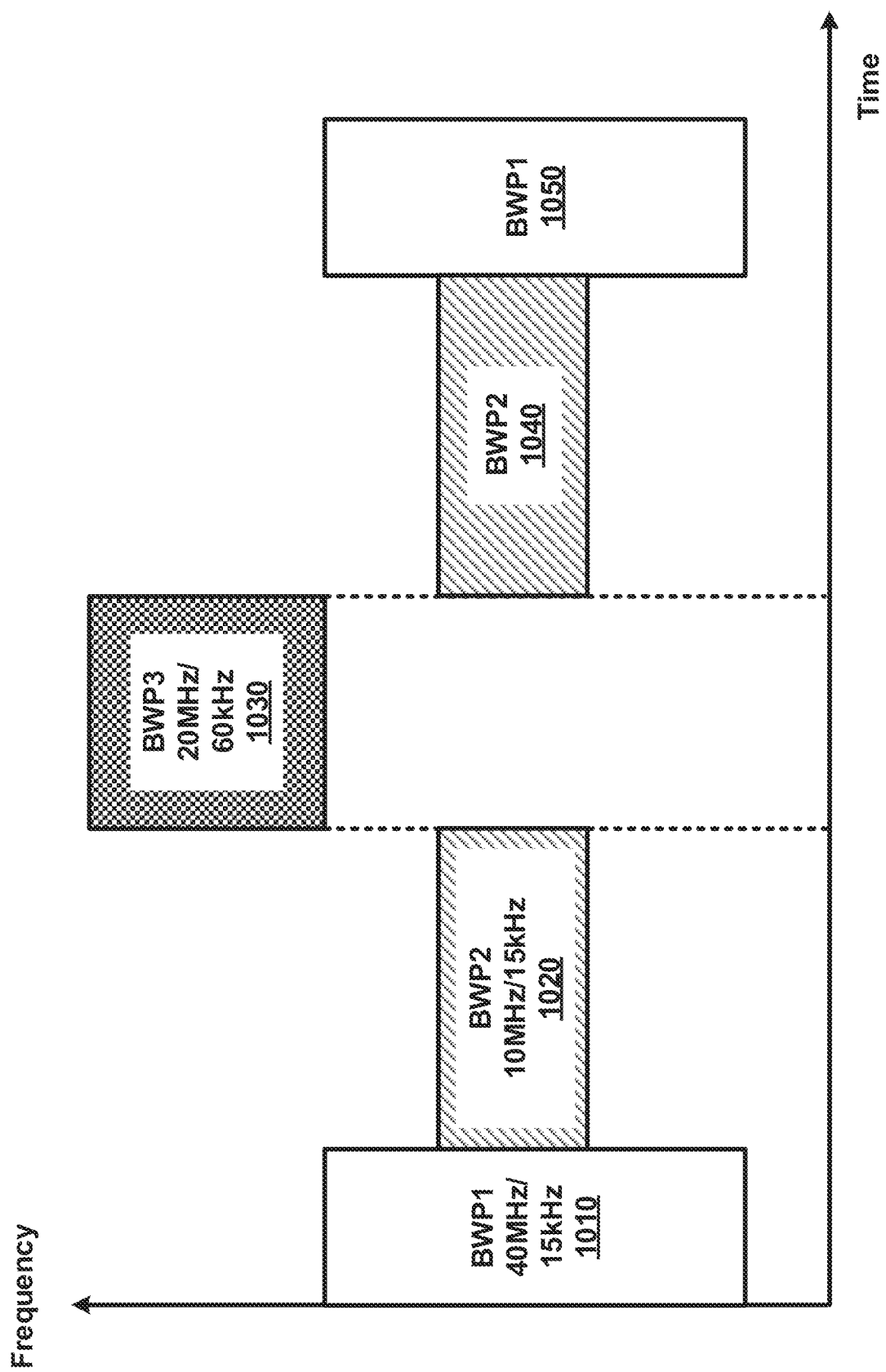
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a CORESETs for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
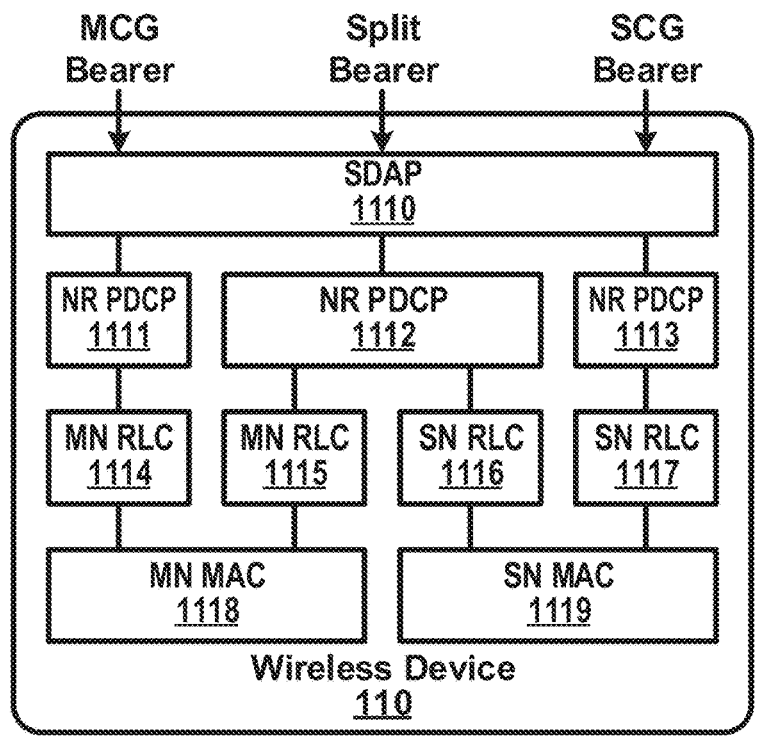
FIG. 11A and FIG. 11B show examples of multi connectivity.
Figure 11B:
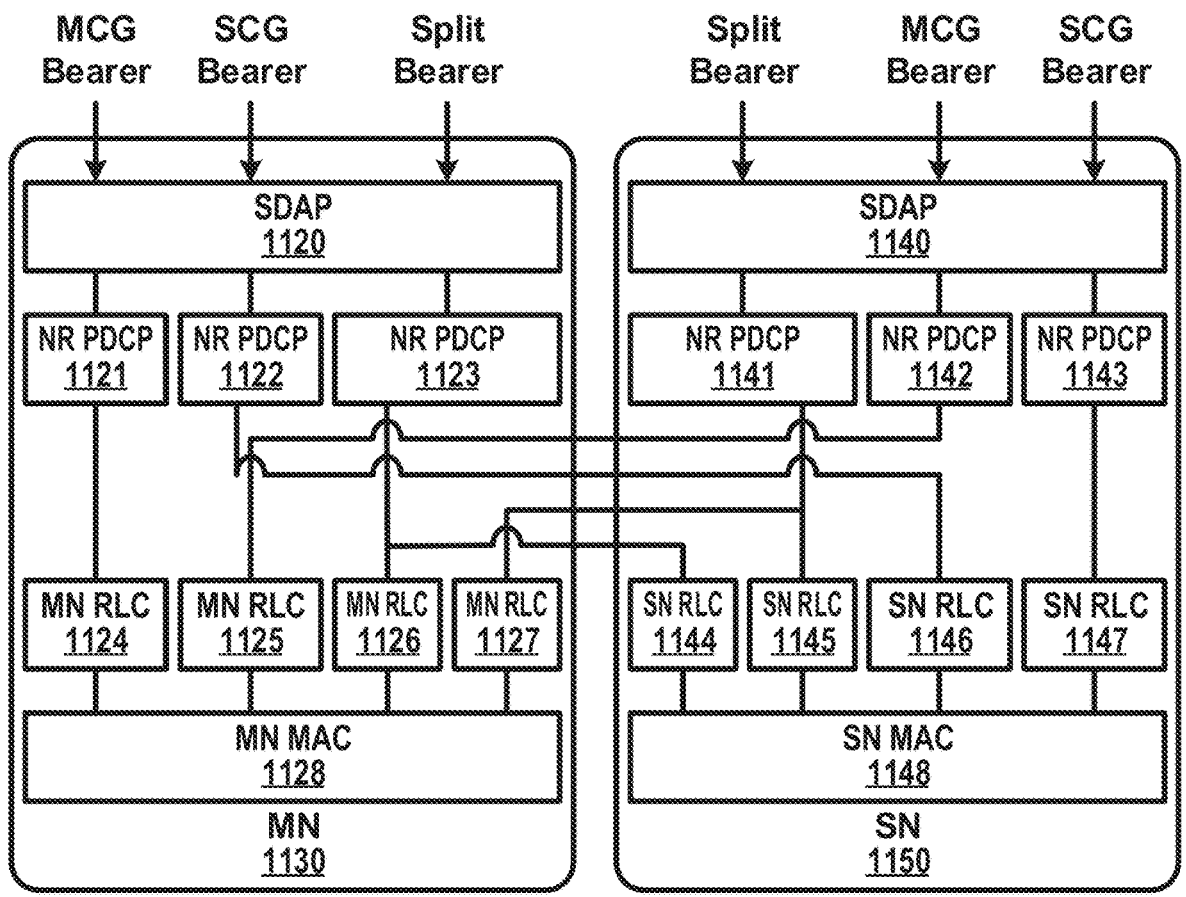

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be interconnected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
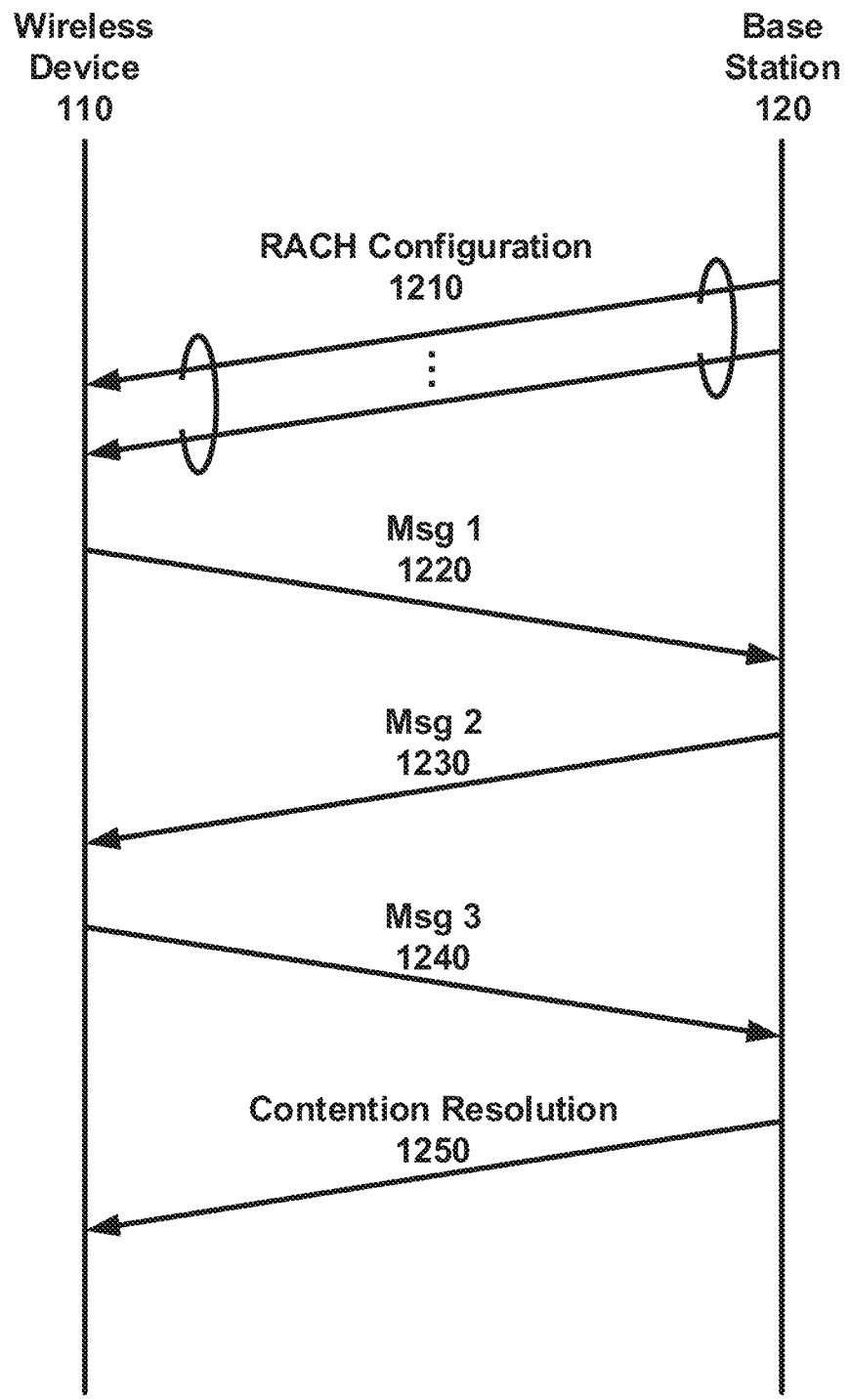
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery request and corresponding PRACH resource(s) (e.g., if any), a time window to monitor RA response(s), a time window to monitor response(s) on a beam failure recovery request, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery request associated with at least one of SS blocks and/or CSI-RSs. A wireless device may select a random access preamble index corresponding to a selected SS block or a CSI-RS from a set of one or more random access preambles for a beam failure recovery request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-Response Window) to monitor a random access response. For a beam failure recovery procedure, the base station may configure the wireless device with a different time window (e.g., bfr-Response Window) to monitor response to on a beam failure recovery request. The wireless device may start a time window (e.g., ra-ResponseWindow or bfr-Response Window) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention-free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
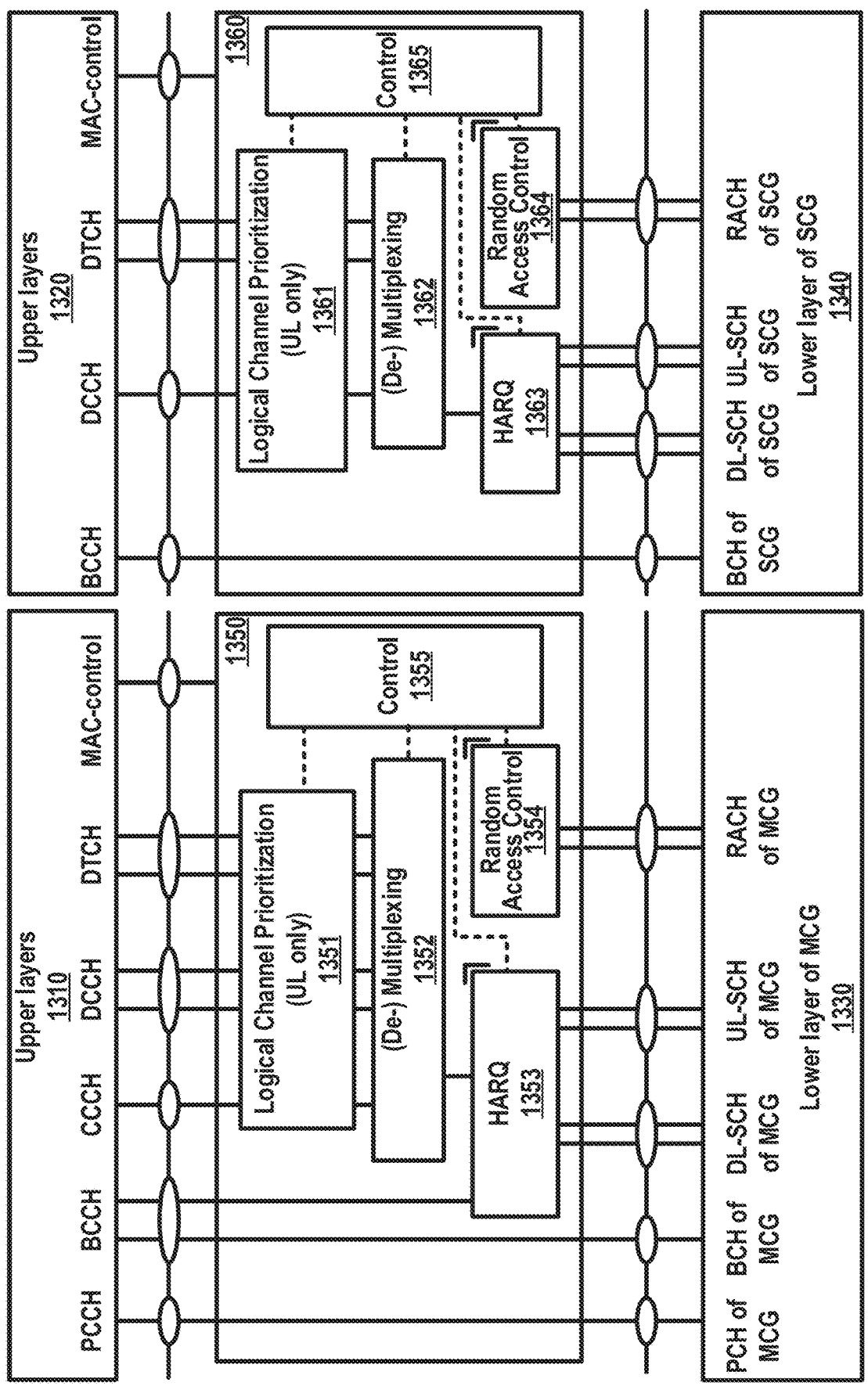
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
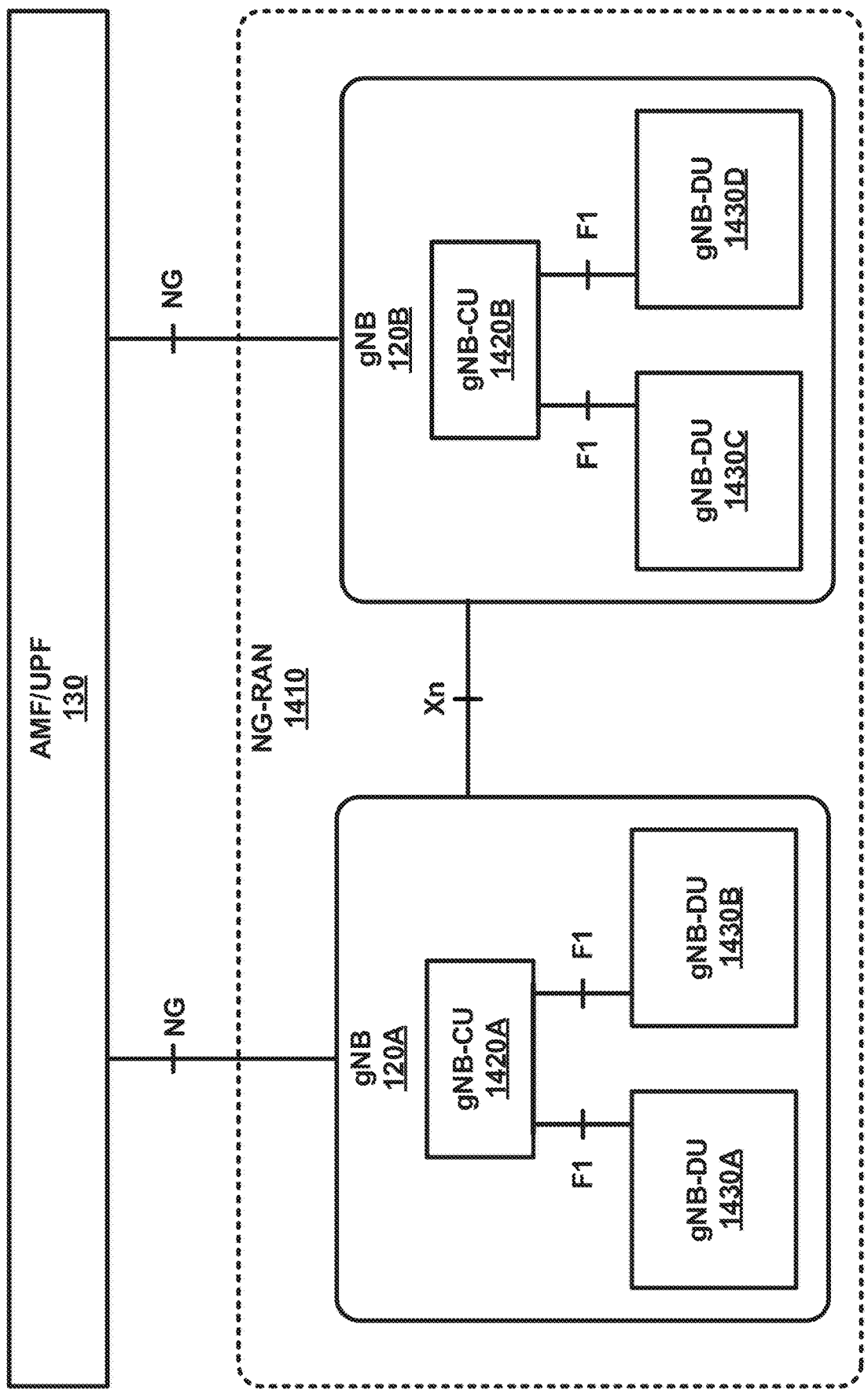
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
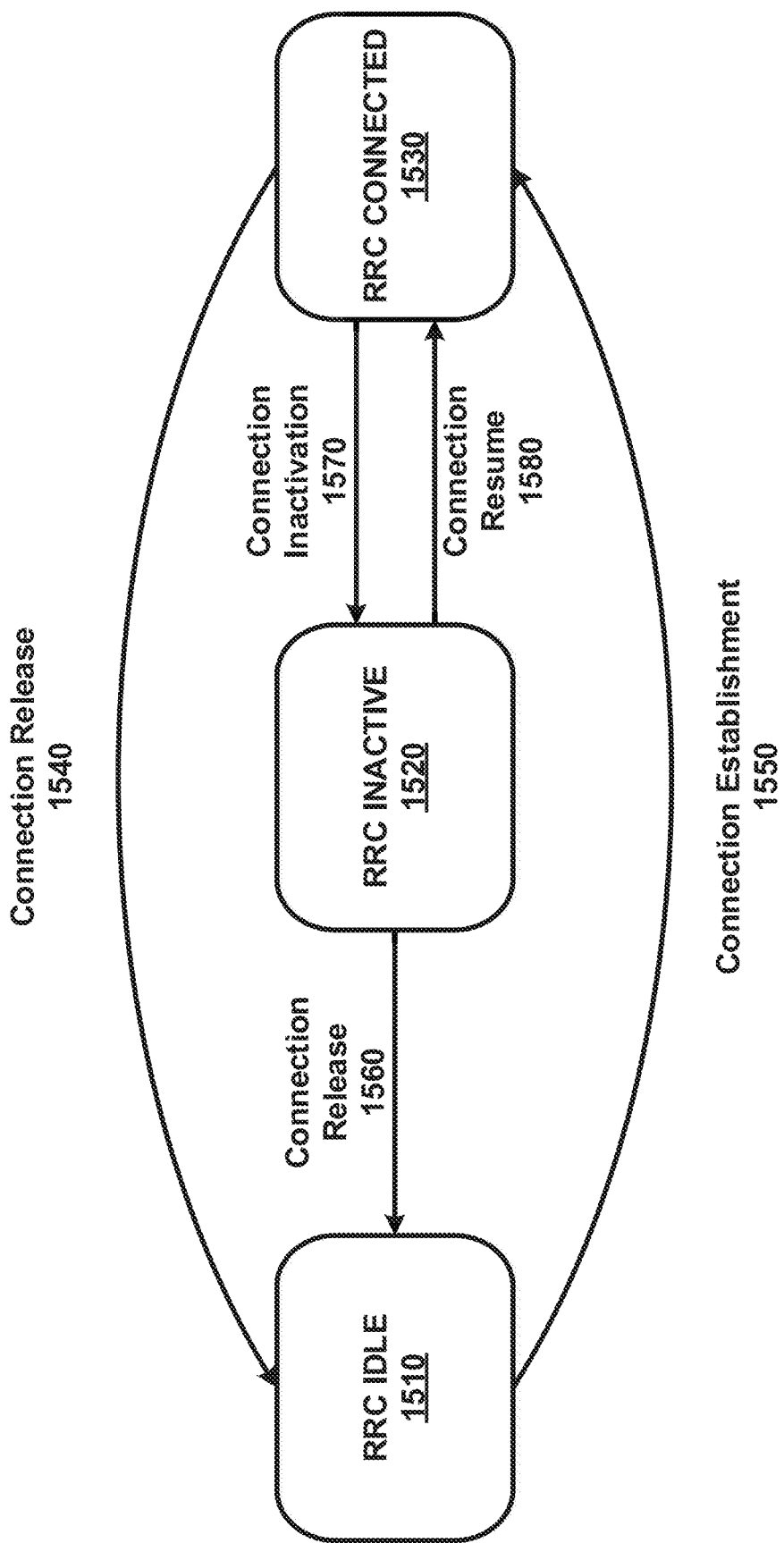
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

Figure 16:
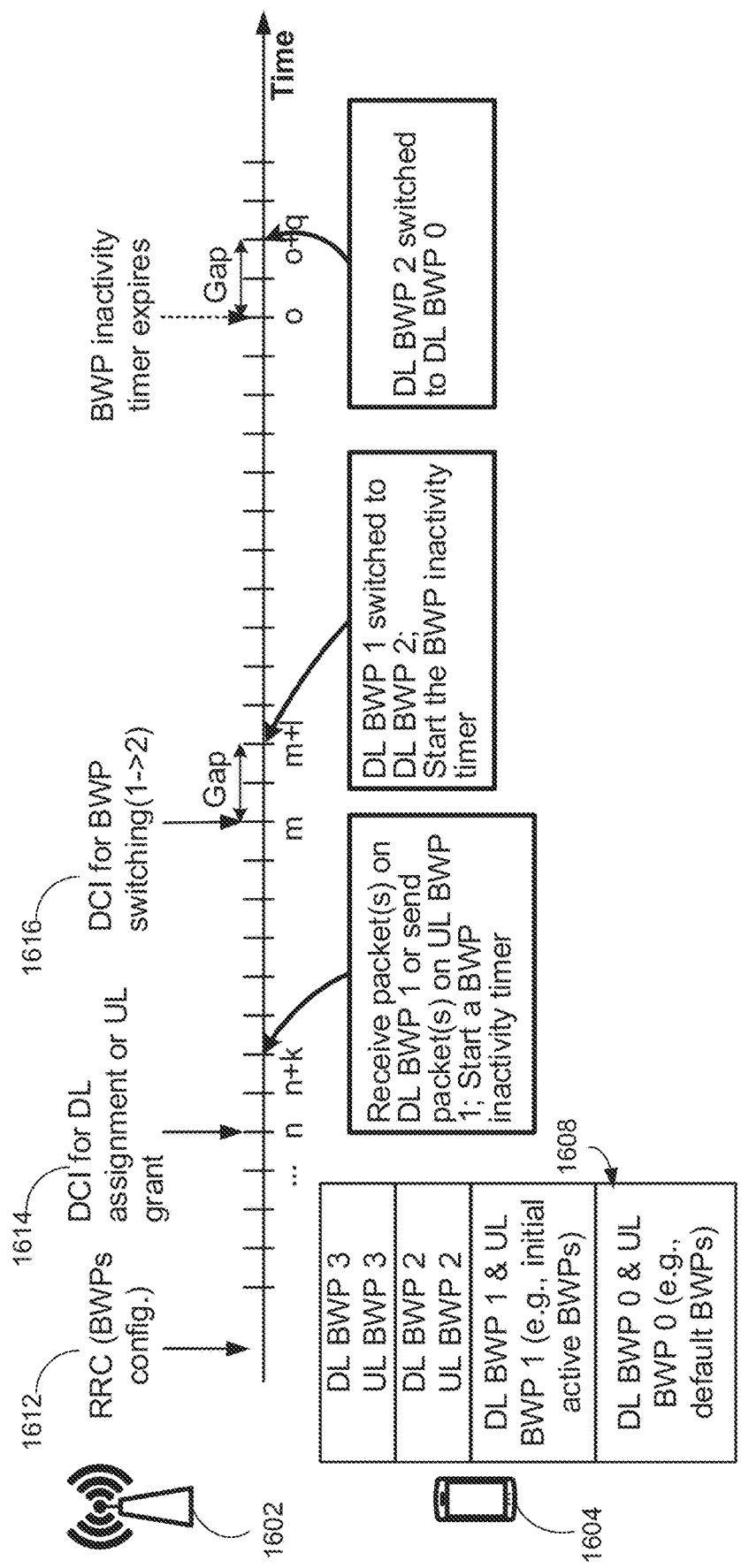
FIG. 16 shows an example of BWP switching.

FIG. 16 shows an example of BWP switching. The BWP switching may be on a PCell. A base station 1602 may send (e.g., transmit) one or more messages (e.g., one or more RRC messages) 1612 for configuring multiple BWPs (e.g., multiple BWPs comprising a DL BWP 0, a DL BWP 1, a DL BWP 2, a DL BWP 3, an UL BWP 0, an UL BWP 1, an UL BWP 2, and an UL BWP 3 shown in a table 1608). The DL (and/or UL) BWP 0 may be a default BWP. The DL (and/or UL) BWP 1 may be an initial active BWP (e.g., an initial DL BWP or an initial UL BWP). A wireless device 1604 may determine the multiple BWPs configured for the wireless device 1604, for example, based on the one or more messages 1612. The base station 1602 may send DCI 1614 for a DL assignment (e.g., at a time n). The DCI 1614 may be sent via the DL BWP 1 (e.g., an initial DL BWP). The wireless device 1604 may receive a packet via the DL BWP 1 or via another active DL BWP (e.g., at a time n+k), for example, based on the DL assignment. The wireless device 1604 may start a BWP inactivity timer (e.g., at the time n+k). The wireless device 1604 may start the BWP inactivity timer, for example, after receiving scheduled downlink packets. The base station 1602 may send DCI 1614 for an UL grant (e.g., at the time n). The DCI 1614 may be sent via the DL BWP 1 (e.g., a first DL BWP or an initial DL BWP). The wireless device 1604 may send a packet via an UL BWP 1 (e.g., via a first UL BWP or an initial UL BWP at a time n+k), for example, based on the UL grant. The wireless device 1604 may start a BWP inactivity timer (e.g., at the time n+k). The wireless device 1604 may start the BWP inactivity timer, for example, after sending scheduled uplink packets.

The base station 1602 may send DCI 1619 for BWP switching (e.g., a BWP switching from the DL BWP 1 to the DL BWP 2). The DCI 1619 may be sent via the active DL BWP 1 (e.g., at a time m). The wireless device 1604 may receive the DCI 1619, for example, by monitoring a PDCCH on the active DL BWP 1. The wireless device 1604 may switch the DL BWP 1 to the DL BWP 2 (e.g., at a time m+l), for example, based on the DCI 1619. There may be a delay (e.g., a gap) between the wireless device 1604 receiving the DCI 1619 and the wireless device 1604 switching to the DL BWP 2. The wireless device 1604 may start and/or re-start the BWP inactivity timer (e.g., at the time m+l), for example, after the BWP switching. The BWP inactivity timer may expire (e.g., at a time o), for example, if the wireless device 1604 does not perform reception or transmission for a period of time (e.g., a period from the time m+l to the time o). The wireless device 1604 may switch the DL BWP 2 to the DL BWP 0 (e.g., a default BWP). The fallback to the DL BWP 0 may occur (e.g., at a time o+q), for example, after the BWP inactivity timer expires. There may be a delay (e.g., a gap) between the BWP inactivity timer expiration (e.g., at a time o) and the wireless device 1604 switching to the DL BWP 0 (e.g., at a time o+q). BWPs are described as example resources, and any wireless resource may be applicable to one or more procedures described herein.

Figure 17:
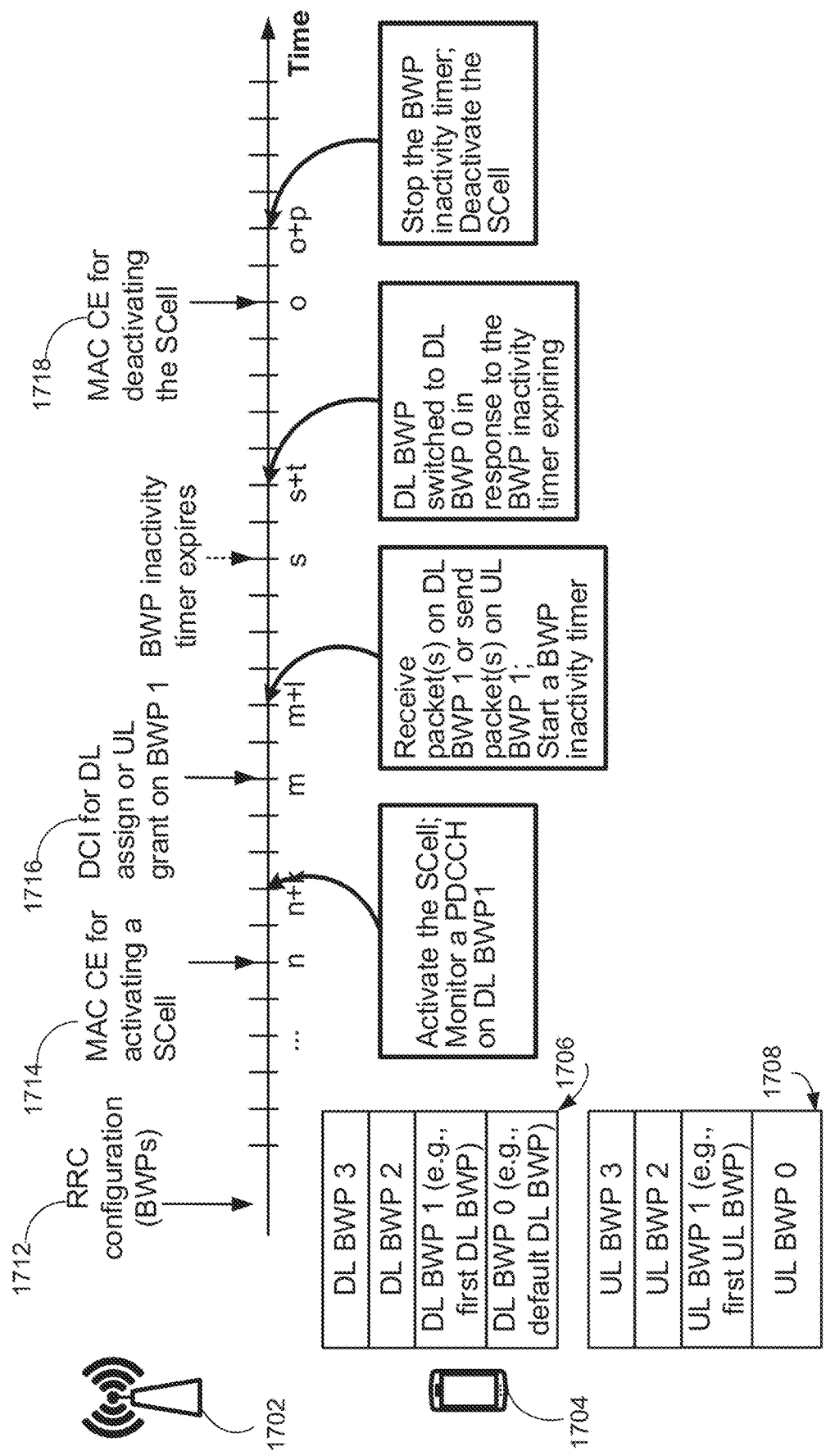
FIG. 17 shows an example of BWP switching.

FIG. 17 shows an example of BWP switching. The BWP switching may be performed on an SCell. A base station 1702 may send (e.g., transmit) one or more messages (e.g., one or more RRC messages) 1712 for configuring multiple BWPs (e.g., multiple BWPs comprising a DL BWP 0, a DL BWP 1, a DL BWP 2, a DL BWP 3, an UL BWP 0, an UL BWP 1, an UL BWP 2, and an UL BWP 3 shown in tables 1706 and 1708, respectively). The multiple BWPs may be BWPs of an SCell. The DL (and/or UL) BWP 0 may be a default BWP. The DL (and/or UL) BWP 1 may be a first (or initial) active BWP (e.g., a first DL BWP or a first UL BWP). A wireless device 1704 may determine the multiple BWPs configured for the wireless device 1704, for example, based on the one or more messages 1712. The base station 1702 may send, to the wireless device 1704, a MAC CE 1714 for activating the SCell (e.g., at a time n). The wireless device 1704 may activate the SCell (e.g., at a time n+k). The wireless device 1704 may start to monitor a PDCCH on (e.g., sent via) the DL BWP 1. The base station 1702 may send DCI 1716 for a DL assignment (e.g., at a time m). The DCI 1716 may be sent via the DL BWP 1 (e.g., a first DL BWP). The wireless device 1704 may receive a packet via the DL BWP 1 or via another active DL BWP (e.g., at a time m+l), for example, based on the DL assignment. The wireless device 1704 may start a BWP inactivity timer (e.g., at the time m+l). The wireless device 1704 may start the BWP inactivity timer, for example, after receiving scheduled downlink packets. The base station 1702 may send DCI 1716 for an UL grant (e.g., at the time m). The DCI 1716 may be sent via the DL BWP 1 (e.g., a first DL BWP or an initial DL BWP). The wireless device 1704 may send a packet via an UL BWP 1 (e.g., via a first UL BWP or an initial UL BWP at a time m+l), for example, based on the UL grant. The wireless device 1704 may start a BWP inactivity timer (e.g., at the time m+l). The wireless device 1704 may start the BWP inactivity timer, for example, after sending scheduled uplink packets.

The BWP inactivity timer may expire (e.g., at a time s). The BWP inactivity may expire, for example, if the wireless device 1704 does not perform reception or transmission for a period of time (e.g., a period from the time m+l to the time s). The wireless device 1704 may switch the DL BWP 1 to the DL BWP 0 (e.g., a default BWP). The fallback to the DL BWP 0 may occur (e.g., at a time s+t), for example, after the BWP inactivity timer expires. The base station 1702 may send, to the wireless device 1704, a MAC CE 1718 for deactivating the SCell (e.g., at a time o). The wireless device 1704 may deactivate the SCell and/or stop the BWP inactivity timer (e.g., at a time o+p). The wireless device 1704 may deactivate the SCell and/or stop the BWP inactivity timer, for example, after receiving and/or checking an indication of the MAC CE 1718.

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) DCI via a PDCCH for at least one of: a scheduling assignment and/or grant; a slot format notification; a preemption indication; and/or a power-control command. The DCI may comprise at least one of: an identifier of a DCI format; a downlink scheduling assignment(s); an uplink scheduling grant(s); a slot format indicator; a preemption indication; a power-control for PUCCH/PUSCH; and/or a power-control for SRS.

A downlink scheduling assignment DCI may comprise parameters indicating at least one of: an identifier of a DCI format; a PDSCH resource indication; a transport format; HARQ information; control information related to multiple antenna schemes; and/or a command for power control of the PUCCH. An uplink scheduling grant DCI may comprise parameters indicating at least one of: an identifier of a DCI format; a PUSCH resource indication; a transport format; HARQ related information; and/or a power control command of the PUSCH.

Different types of control information may correspond to different DCI message sizes. Supporting multiple beams, spatial multiplexing in the spatial domain, and/or noncontiguous allocation of RBs in the frequency domain, may require a larger scheduling message, in comparison with an uplink grant allowing for frequency-contiguous allocation. DCI may be categorized into different DCI formats. A DCI format may correspond to a certain message size and/or usage.

A wireless device may monitor (e.g., in common search space or wireless device-specific search space) one or more PDCCH for detecting one or more DCI with one or more DCI format. A wireless device may monitor a PDCCH with a limited set of DCI formats, for example, which may reduce power consumption. The more DCI formats that are to be detected, the more power may be consumed by the wireless device.

The information in the DCI formats for downlink scheduling may comprise at least one of: an identifier of a DCI format; a carrier indicator; a frequency domain resource assignment; a time domain resource assignment; a time resource allocation; a bandwidth part indicator; a HARQ process number; one or more MCS; one or more NDI; one or more RV; MIMO related information; a downlink assignment index (DAI); PUCCH resource indicator; PDSCH-to-HARQ feedback timing indicator; a TPC for PUCCH; an SRS request; and/or padding (e.g., if necessary). The MIMO related information may comprise at least one of: a PMI; precoding information; a transport block swap flag; a power offset between PDSCH and a reference signal; a referencesignal scrambling sequence; a number of layers; antenna ports for the transmission; and/or a transmission configuration indication (TCI).

The information in the DCI formats used for uplink scheduling may comprise at least one of: an identifier of a DCI format; a carrier indicator; a bandwidth part indication; a resource allocation type; a frequency domain resource assignment; a time domain resource assignment; a time resource allocation; an MCS; an NDI; a phase rotation of the uplink DM-RS; precoding information; a CSI request; an SRS request; an uplink index/DAI; a TPC for PUSCH; and/or padding (e.g., if necessary).

A base station may perform CRC scrambling for DCI, for example, before transmitting the DCI via a PDCCH. The base station may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, and/or TPC-SRS-RNTI) and the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may send (e.g., transmit) one or more PDCCH in different CORESETs, for example, to support a wide bandwidth operation. A base station may transmit one or more RRC messages comprising configuration parameters of one or more CORESETs. A CORESET may comprise at least one of: a first OFDM symbol; a number of consecutive OFDM symbols; a set of resource blocks; and/or a CCE-to-REG mapping. A base station may send (e.g., transmit) a PDCCH in a dedicated CORESET for particular purpose, for example, for beam failure recovery confirmation. A wireless device may monitor a PDCCH for detecting DCI in one or more configured CORESETs, for example, to reduce the power consumption.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; an L field with multiple bits in length, for example, if the MAC subheader corresponds to a MAC SDU, a variable-sized MAC CE, and/or padding.

A MAC subheader may comprise an eight-bit L field. The LCID field may have six bits in length, and the L field may have eight bits in length. A MAC subheader may comprise a sixteen-bit L field. The LCID field may be six bits in length, and the L field may be sixteen bits in length.

A MAC subheader may comprise: an R field with two bits in length; and an LCID field with multiple bits in length, when the MAC subheader corresponds to a fixed sized MAC CE, or padding. The LCID field may have six bits in length, and the R field may have two bits in length.

DL MAC PDU, multiple MAC CEs may be placed together. A MAC subPDU comprising MAC CE may be placed before any MAC subPDU comprising a MAC SDU, or a MAC subPDU comprising padding.

UL MAC PDU, multiple MAC CEs may be placed together. A MAC subPDU comprising MAC CE may be placed after all MAC subPDU comprising a MAC SDU. The MAC subPDU may be placed before a MAC subPDU comprising padding.

A MAC entity of a base station may send (e.g., transmit) to a MAC entity of a wireless device one or more MAC CEs. The one or more MAC CEs may comprise at least one of: an SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate a MAC CE associated with the MAC subheader is a long DRX command MAC CE.

The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a PCell. A base station may send (e.g., transmit), to a wireless device, one or more messages comprising configuration parameters of a plurality of one or more SCells, for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may stop a BWP inactivity timer associated with the activated SCell, for example, after or in response to deactivating the activated SCell. The wireless device may deactivate any active BWP associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, for example, after or in response to deactivating the activated SCell. The wireless device may flush HARQ buffers associated with the activated SCell.

A wireless device may not perform certain operations, for example, if an SCell is deactivated. The wireless device may not perform one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

An SCell activation/deactivation MAC CE may comprise, for example, one octet. A first MAC PDU subheader comprising a first LCID may identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

An SCell Activation/Deactivation MAC CE may comprise, for example, any size such as any quantity of octets (e.g., four octets). A second MAC PDU subheader with a second LCID may identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A base station may configure a wireless device with control information (e.g., TCI) associated with a downlink channel and/or an uplink channel. The control information may be used, for example, by the wireless device to receive data via the downlink channel. The control information may be transmitted via a channel that may be different from the downlink channel.

A base station may configure a wireless device with a list of one or more TCI state configurations (e.g., TCI-States) using and/or via a higher layer parameter, for example, PDSCH-Config for a serving cell. A number (e.g., quantity, plurality, etc.) of the one or more TCI-States may depend on a capability of the wireless device. The wireless device may use the one or more TCI-States to decode a PDSCH based on a detected PDCCH with a DCI. The DCI may be intended, for example, for the wireless device and/or the serving cell. Each of the one or more TCI-States state may contain one or more parameters. The wireless device may use the one or more parameters, for example, to configure a quasi-co-location relationship between one or more downlink reference signals (e.g., a first DL RS and/or a second DL RS) and the DM-RS ports of the PDSCH. The quasi-co-location relationship may be configured by a higher layer parameter QCL-Type1 for the first DL RS. The quasi-co-location relationship may be configured by a higher layer parameter QCL-Type2 for the second DL RS, for example, if the second DL RS is configured.

A first QCL type of a first DL RS and a second QCL type of a second a second DL RS may not be the same, for example, if the wireless device configures a quasi co-location relationship between the two DL RSs. The first DL RS and the second DL RS may be the same. The first DL RS and the second DL RS may be different.

A quasi co-location type (e.g., the first QCL type, the second QCL type) of a DL RS (e.g., the first DL RS, the second DL RS) may be provided to the wireless device by a higher layer parameter (e.g., QCL-Type in QCL-Info). The higher layer parameter QCL-Type may be at least one of: QCL-TypeA: {Doppler shift, Doppler spread, average delay, delay spread}, QCL-TypeB: {Doppler shift, Doppler spread}, QCL-TypeC: {average delay, Doppler shift} and QCL-TypeD: {Spatial Rx parameter}.

A wireless device may receive an activation command. The activation command may be used to map one or more TCI states (e.g., 8 states) to one or more codepoints of a TCI field in DCI. Mapping between one or more TCI states and one or more codepoints of the TCI field in DCI may be applied starting from slot $n+3N_{slot}^{subframe,\mu}+1$, for example, if a HARQ-ACK corresponding to a PDSCH carrying the activation command is sent (e.g., transmitted) in slot n. The wireless device may determine (e.g., assume) that one or more DM-RS ports of a PDSCH of a serving cell are quasi-co-located with an SSB/PBCH block, for example, (i) before the wireless device receives the activation command and/or (ii) after the wireless device receives a higher layer configuration of TCI-States. The SSB/PBCH block may be determined in an initial access procedure with respect to one or more of QCL-TypeA' and QCL-TypeD', for example, if applicable.

A wireless device may be configured by a base station, with a higher layer parameter TCI-PresentInDCI. The wireless device may determine (e.g., assume) that a TCI field is present in a DCI format (e.g., DCI format 1_1) of a PDCCH transmitted on the CORESET, for example, if the higher layer parameter TCI-PresentInDCI is set as 'Enabled' for a CORESET scheduling a PDSCH.

A base station and/or a wireless device may configure one or more wireless resources for communications between the base station and the wireless device. The wireless resources may comprise, for example, one or more CORESETS. The base station may configure the one or more CORESETS for the wireless device. A base station may (or may not) configure a CORESET with a higher layer parameter (e.g., TCI-PresentInDCI). The CORESET may schedule a PDSCH. A time offset between a reception of DCI (e.g., DCI format 1_1, DCI format 1_0) in the CORESET and a corresponding PDSCH may be equal to or greater than a threshold (e.g., Threshold-Sched-Offset). The threshold may be based on a reported capability of the wireless device. The wireless device may apply/associate a second TCI state for/with the CORESET used for a PDCCH transmission of the DCI. The wireless device may apply/associate a second QCL assumption for/with the CORESET used for a PDCCH transmission of the DCI. The wireless device may assume, to determine antenna port quasi co-location of the PDSCH, that a first TCI state and/or a first QCL assumption for the PDSCH is identical to (or substantially the same as) the second TCI state and/or the second QCL assumption applied/associated for/with the CORESET. The wireless device may assume/determine that a first TCI state and/or a first QCL assumption for the PDSCH is identical to (or substantially the same as) the second TCI state and/or the second QCL assumption applied for the CORESET, for example, based on one or more of: the base station not configuring the CORESET with a higher layer parameter (e.g., TCI-PresentInDCI), and/or the time offset between the reception of the DCI and the PDSCH being equal to or greater than the threshold.

A base station may configure a CORESET with a higher layer parameter (e.g., TCI-PresentInDCI). The higher layer parameter (e.g., TCI-PresentInDCI) may be set as enabled (e.g., 1 or other value). The CORESET may schedule a PDSCH with DCI (e.g., DCI format 1_0). The DCI may or may not comprise a TCI field. A time offset between a reception of the DCI in the CORESET and a corresponding PDSCH may be equal to or greater than a threshold (e.g., Threshold-Sched-Offset). The threshold may be based on a capability or reported capability of the wireless device. The wireless device may apply/associate a second TCI state for/with the CORESET used for a PDCCH transmission of the DCI. The wireless device may apply/associate a second QCL assumption for the CORESET used for a PDCCH transmission of the DCI. The wireless device may determine (e.g., assume), to determine an antenna port quasi co-location of the PDSCH, that a first TCI state and/or a first QCL assumption for the PDSCH is identical to (or substantially the same as) the second TCI state and/or the second QCL assumption applied for/associated with the CORESET. The wireless device may determine (e.g., assume) that a first TCI state and/or a first QCL assumption for the PDSCH is identical to (or substantially the same as) the second TCI state and/or the second QCL assumption applied for the CORESET, for example, based on one or more of: the base station scheduling the PDSCH with the DCI not comprising the TCI field, and/or the time offset between the reception of the DCI and the PDSCH being equal or greater than the threshold. As described herein, the terms "TCI state" and "QCL assumption" may be used interchangeably. "TCI state" and/or "QCL assumption" may indicate a beam used for reception of data (e.g., reception of PDSCH data).

A base station may configure a CORESET with a higher layer parameter (e.g., TCI-PresentInDCI). The higher layer parameter (e.g., TCI-PresentInDCI) may be set as enabled (e.g., 1 or other value). The wireless device may receive DCI in the CORESET of a scheduling component carrier. The DCI may comprise a TCI field. The TCI field in the DCI in the scheduling component carrier may indicate one or more activated TCI states (e.g., after receiving the activation command) in a scheduled component carrier or in a DL BWP, for example, based on the higher layer parameter (e.g., TCI-PresentInDCI) being set as enabled (e.g., 1 or other value).

A base station may configure a CORESET with a higher layer parameter (e.g., TCI-PresentInDCI). The higher layer parameter (e.g., TCI-PresentInDCI) may be set as enabled (e.g., 1 or other value). The wireless device may receive DCI (e.g., DCI format 1_1) in the CORESET. The DCI may schedule a PDSCH of a wireless device. The DCI may comprise a TCI field. The value of the TCI field may indicate the TCI state. A time offset between a reception of the DCI and the corresponding scheduled PDSCH may be equal to or greater than a threshold (e.g., Threshold-Sched-Offset). The threshold may be based on a capability or reported capability of the wireless device. The wireless device may use a TCI state according to a value of the TCI field (e.g., in a detected PDCCH with the DCI) to determine antenna port quasi co-location for the PDSCH. The wireless device may determine antenna port quasi co-location for the PDSCH, for example, based on one or more of: the TCI field being present in the DCI scheduling the PDSCH, and/or a higher layer parameter (e.g., TCI-PresentInDCI) being set as enabled for the CORESET. Using the TCI state according to the value of the TCI field may comprise the wireless device determining/assuming that one or more DM-RS ports of the PDSCH of a serving cell are quasi co-located with one or more RS(s) in the TCI state with respect to one or more QCL type parameter(s) given by the TCI state, for example, if the time offset between the reception of the DCI and the PDSCH is equal or greater than the threshold.

A base station may configure a wireless device with a single slot PDSCH (e.g., and/or any other quantity of slot PDSCH). The single slot PDSCH may be scheduled in a slot. The base station may activate one or more TCI states in the slot. A TCI state (e.g., indicated by a TCI field in DCI scheduling the single slot PDSCH) may be based on the one or more activated TCI states in the slot with the scheduled single slot PDSCH. The TCI state may be one of the one or more activated TCI states in the slot. The TCI field in the DCI may indicate a TCI state of the one or more activated TCI states in the slot.

A wireless device may be configured with a CORESET. The CORESET may be associated with a search space set for cross-carrier scheduling. The wireless device may determine/expect/assume that a higher layer parameter (e.g., TCI-PresentInDCI) is set as enabled for the CORESET, for example, based on the CORESET being associated with the search space set for cross-carrier scheduling. A base station may configure a serving cell with one or more TCI states. The wireless device may detect, in the search space set, a PDCCH (e.g., comprising DCI) for scheduling a PDSCH. A TCI field in the DCI may indicate at least one of the one or more TCI states. The at least one of the one more TCI states (e.g., scheduled by the search space set) may comprise a QCL type (e.g., QCL-TypeD). The wireless device may determine/expect/assume that a time offset between a reception of the PDCCH detected in the search space set and the PDSCH is greater than or equal to a threshold (e.g., Threshold-Sched-Offset), for example, based on at least one of the one or more TCI states scheduled by the search space set containing the QCL type.

A base station may configure a CORESET with a higher layer parameter (e.g., TCI-PresentInDCI). The higher layer parameter (e.g., TCI-PresentInDCI) may be set as enabled. An offset between a reception of DCI in the CORESET and a PDSCH scheduled by the DCI may be less than a threshold (e.g., Threshold-Sched-Offset), for example, if the higher layer parameter (e.g., TCI-PresentInDCI) is set to be enabled for the CORESET.

A base station may or may not configure a CORESET with a higher layer parameter (e.g., TCI-PresentInDCI). The wireless device may be, for example, in an RRC connected mode. The wireless device may be, for example, in an RRC idle mode. The wireless device may be, for example, in an RRC inactive mode. An offset between a reception of DCI in the CORESET and a PDSCH scheduled by the DCI may be less than a threshold (e.g., Threshold-Sched-Offset), for example, if the higher layer parameter (e.g., TCI-PresentIn-DCI) is not configured for the CORESET.

A wireless device may monitor one or more CORESETs and/or one or more search spaces within/in an active BWP (e.g., an active downlink BWP) of a serving cell in one or more slots (e.g., one or more time slots). Monitoring the one or more CORESETs within/in the active BWP of the serving cell in the one or more slots may comprise monitoring at least one CORESET within/in the active BWP of the serving cell in each slot of the one or more slots. A latest slot of the one or more slots may be a most recent slot. The wireless device may monitor, within/in the active BWP of the serving cell, one or more second CORESETs of the one or more CORESETs in the latest slot. The wireless device may determine the latest slot, for example, based on monitoring the one or more second CORESETs in the latest slot. Each CORESET of the one or more second CORESETs may be indicated/identified by a CORESET-specific index (e.g., indicated by a higher layer parameter, such as CORESET-ID). A CORESET specific index of a CORESET of the one or more second CORESETs may be least among the CORESET specific indices of the one or more second CORESETs. The wireless device may monitor a search space associated with the CORESET (e.g., in the latest slot). The wireless device may select the CORESET of the one or more second CORESETs, for example, based on one or more of: the CORESET-specific index of the CORESET being the least, and/or the monitoring the search space associated with the CORESET in the latest slot (or any other slot). The wireless device may determine/assume that one or more DM-RS ports of the PDSCH of the serving cell are quasi co-located with one or more RSs in a TCI state with respect to one or more QCL type parameter(s), for example, if an offset between the reception of the DCI in the CORESET and the PDSCH scheduled by the DCI is less than a threshold (e.g., Threshold-Sched-Offset). The one or more RSs in the TCI state may be used for PDCCH quasi co-location indication of the CORESET of the one or more second CORESETs, based on or in response to the selecting the CORESET.

A wireless device may receive DCI via a PDCCH in a CORESET. The DCI may schedule a PDSCH. An offset between a reception of the DCI and the PDSCH may be less than a threshold (e.g., Threshold-Sched-Offset). A first QCL type (e.g., QCL-TypeD) of one or more DM-RS ports of the PDSCH may be different from a second QCL type (e.g., QCL-TypeA) of one or more second DM-RS ports of the PDCCH. The PDSCH and the PDCCH may overlap in at least one symbol. The wireless device may prioritize a reception of the PDCCH associated with the CORESET, for example, based on one or more of: the PDSCH and the PDCCH overlapping in at least one symbol, and/or the first QCL type being different from the second QCL type. The prioritizing may apply to an intra-band CA case, for example, if the PDSCH and the CORESET are in different component carriers. The prioritizing the reception of the PDCCH may comprise receiving the PDSCH with the second QCL type of one or more second DM-RS ports of the PDCCH. The prioritizing the reception of the PDCCH may comprise overwriting the first QCL type of the one or more DM-RS ports of the PDSCH with the second QCL type of the one or more second DM-RS ports of the PDCCH. The prioritizing the reception of the PDCCH may comprise assuming a spatial QCL of the PDCCH (e.g., the second QCL type), for the simultaneous reception of the PDCCH and the PDSCH. The prioritizing the reception of the PDCCH may comprise applying a spatial QCL of the PDCCH (e.g., the second QCL type), for the simultaneous reception of the PDCCH and the PDSCH.

The configured TCI states may or may not comprise an indication of a QCL type (e.g., none of the configured TCI states may comprise an indication of a QCL type, none of the configured TCI states may comprise an indication of a QCL-TypeD). The wireless device may determine assume QCL assumptions for the configured TCI states, for example, based on indicated TCI states for one or more scheduled PDSCH transmissions, for example, if none of the configured TCI states comprise the indication of the QCL type. The wireless device may determine QCL assumptions for the configured TCI states, for example, irrespective of the time offset between the reception of the DCI and the corresponding PDSCH.

A wireless device may use a CSI-RS for at least one of: time/frequency tracking, CSI computation, L1-RSRP computation, and/or mobility. A base station may configure a wireless device to monitor a CORESET on one or more symbols (e.g., OFDM symbols). A CSI-RS resource may be associated with a resource set parameter (e.g., non-zero power CSI-RS resource set, NZP-CSI-RS-ResourceSet). A higher layer parameter repetition of the NZP-CSI-RS-ResourceSet may be set to 'on' or another indication/value (e.g., 1, enabled, etc.). The wireless device may not determine/expect to be configured with a CSI-RS of the CSI-RS resource over the one or more symbols, for example, based on or in response to the CSI-RS resource being associated with the NZP-CSI-RS-ResourceSet with the higher layer parameter repetition set to 'on' or another indication/value (e.g., 1, enabled, etc.).

A higher layer parameter repetition of the NZP-CSI-RS-ResourceSet may not be set to 'on' or another indication/value (e.g., 1, enabled, etc.). A base station may configure a CSI-RS resource and/or one or more search space sets associated with a CORESET in the same (or different) one or more symbols (e.g., OFDM symbols). The wireless device may determine/assume that a CSI-RS of the CSI-RS resource and one or more DM-RS ports of a PDCCH are quasi co-located with QCL-TypeD, for example, based on one or more of: the higher layer parameter repetition of the NZP-CSI-RS-ResourceSet not being set to 'on' or another indication/value (e.g., 1, enabled, etc.), and/or the CSI-RS resource and the one or more search space sets associated with the CORESET being configured in the same one or more symbols. The base station may send (e.g., transmit_the PDCCH in the one or more search space sets associated with the CORESET.

A higher layer parameter repetition of the NZP-CSI-RS-ResourceSet may not be set to 'on' or another indication/value (e.g., may be set to 0, disabled, etc.). In A base station may configure a CSI-RS resource of a first cell and one or more search space sets associated with a CORESET of a second cell in the same (or different) one or more symbols (e.g., OFDM symbols). The wireless device may determine/assume that a CSI-RS of the CSI-RS resource and one or more DM-RS ports of a PDCCH are quasi co-located with QCL-TypeD, for example, based on one or more of: the higher layer parameter repetition of the NZP-CSI-RS-ResourceSet not being set to 'on' or another indication/value (e.g., 1, enabled, etc.), and/or the CSI-RS resource and the one or more search space sets associated with the CORESET being configured in the same one or more symbols. The base station may send (e.g., transmit) the PDCCH in the one or more search space sets associated with the CORESET. The first cell and the second cell may be in different intra-band component carriers.

A base station may configure a wireless device with a CSI-RS in a first set of PRBs. The base station may configure the wireless device with one or more search space sets associated with a CORESET in one or more symbols (e.g., OFDM symbols) and/or in a second set of PRBs. The wireless device may not determine/expect that the first set of PRBs and the second set of PRBs overlap in the one or more symbols.

A base station may configure a wireless device with a CSI-RS resource and an SS/PBCH block in the same (or different) one or more symbols (e.g., OFDM symbols). The wireless device may determine/assume that the CSI-RS resource and the SS/PBCH block are quasi co-located with a QCL type (e.g., QCL-TypeD), for example, based on the CSI-RS resource and the SS/PBCH block being configured in the same one or more symbols.

The base station may configure the CSI-RS resource in a first set of PRBs for the wireless device. The base station may configure the SS/PBCH block in a second set of PRBs for the wireless device. The wireless device may not determine/expect that the first set of PRBs overlap with the second set of PRBs.

The base station may configure the CSI-RS resource with a first subcarrier spacing for the wireless device. The base station may configure the SS/PBCH block with a second subcarrier spacing for the wireless device. The wireless device may determine/expect that the first subcarrier spacing and the second subcarrier spacing are the same.

A base station may configure a wireless device with an NZP-CSI-RS-ResourceSet. The NZP-CSI-RS-ResourceSet may be configured with a higher layer parameter repetition set to 'on' or another indication/value (e.g., 1, enabled, etc.). The wireless device may determine/assume that the base station may send (e.g., transmit) one or more CSI-RS resources within the NZP-CSI-RS-ResourceSet with a same downlink spatial domain transmission filter, for example, based on the NZP-CSI-RS-ResourceSet being configured with the higher layer parameter repetition set to 'on' or another indication/value (e.g., 1, enabled, etc.). The base station may send (e.g., transmit) each CSI-RS resource of the one or more CSI-RS resources in different symbols (e.g., OFDM symbols).

The NZP-CSI-RS-ResourceSet may be configured with a higher layer parameter repetition set to 'off' or another indication/value (e.g., 0, disabled, etc.). The wireless device may not determine/assume that the base station may send (e.g., transmit) one or more CSI-RS resources within the NZP-CSI-RS-ResourceSet with a same downlink spatial domain transmission filter, for example, based on the NZP-CSI-RS-ResourceSet being configured with the higher layer parameter repetition set to 'off' or another indication/value (e.g., 0, disabled, etc.).

A base station may configure a wireless device with a higher layer parameter (e.g., groupBasedBeamReporting). The base station may set the higher layer parameter (e.g., groupBasedBeamReporting) to enabled or another indication/value (e.g., 1, on, etc.). The wireless device may report at least two different resource indicators (e.g., CRI, SSBR1) in a single reporting instance to report setting of one or more report settings, for example, based on the higher layer parameter groupBasedBeamReporting being set to enabled or another indication/value (e.g., 1, on, etc.). The wireless device may receive at least two RSs (e.g., CSI-RS, SSB) indicated by the at least two different resource indicators simultaneously. The wireless device may receive (e.g., simultaneously receive) the at least two RSs with a single spatial domain receive filter. The wireless device may receive (e.g., simultaneously receive) the at least two RSs with a plurality of simultaneous spatial domain receive filters.

A wireless device may be configured, by a base station, with one or more serving cells. The base station may activate one or more second serving cells of the one or more serving cells. The base station may configure each activated serving cell, of the one or more second serving cells, with a respective PDCCH monitoring configuration. The wireless device may monitor a set of PDCCH candidates, in one or more CORESETs, on an active DL BWP of each activated serving cell that is configured with the respective PDCCH monitoring configuration. The wireless device may monitor the set of PDCCH candidates in the one or more CORESETs based on or according to corresponding search space sets. The monitoring may comprise decoding each PDCCH candidate of the set of PDCCH candidates according to monitored DCI formats.

A set of PDCCH candidates that are monitored by a wireless device may be defined in terms of PDCCH search space sets. A search space set may be a common search space (CSS) set or a wireless device-specific search space set (e.g., a UE-specific search space (USS) set).

One or more PDCCH monitoring occasions may be associated with a SS/PBCH block. The SS/PBCH block may be quasi-co-located with a CSI-RS. A TCI state of an active BWP may comprise the CSI-RS. The active BWP may comprise a CORESET that is indicated (e.g., identified) by an index that is equal to zero (e.g., CORESET zero). The wireless device may determine the TCI state by one or more of (e.g., the most recent of): an indication by a MAC CE activation command, and/or an RA procedure that is not initiated by a PDCCH order that triggers a non-contention based RA procedure. A wireless device may monitor, for a DCI format with CRCs scrambled by a C-RNTI, corresponding PDCCH candidates at the one or more PDCCH monitoring occasions, for example, based on the one or more PDCCH monitoring occasions being associated with the SS/PBCH block.

A base station may configure a wireless device with one or more DL BWPs in a serving cell. The wireless device may be configured/provided, by a higher layer signaling, with one or more (e.g., 2, 3, or any other quantity of) CORESETs for a DL BWP of the one or more DL BWPs. The base station may send/provide, a higher layer parameter (e.g., ControlResourceSet) to the wireless device. The higher layer parameter may be for a CORESET of the one or more CORESETs, and/or may indicate/provide at least one of: a CORESET index (e.g., provided by higher layer parameter, controlResourceSetId), a DM-RS scrambling sequence initialization value (e.g., indicated/provided by a higher layer parameter, pdcch-DM-RS-ScramblingID), a quantity of consecutive symbols (e.g., indicated/provided by a higher layer parameter, duration), a set of resource blocks (e.g., indicated/provided by higher layer parameter, frequencyDomainResources), CCE-to-REG mapping parameters (e.g., indicated/provided by higher layer parameter, cce-REG-MappingType), an antenna port quasi co-location (e.g., from a set of antenna port quasi co-locations indicated/provided by a first higher layer parameter, tci-StatesPDCCH-ToAddList, and a second higher layer parameter, tci-StatesPDCCH-ToReleaseList), and/or an indication for a presence or absence of a TCI field for a DCI format (e.g., DCI format 1_1) transmitted by a PDCCH in the CORESET (e.g., indicated/provided by higher layer parameter, TCI-PresentInDCI). The antenna port quasi co-location may indicate a quasi co-location information of one or more DMRS antenna ports for a PDCCH reception in the CORESET. The CORESET index may be unique among the one or more DL BWPs of the serving cell. The wireless device may determine/consider that a TCI field is absent/disabled in the DCI format, for example, if the higher layer parameter (e.g., TCI-PresentInDCI) is absent.

A first higher layer parameter (e.g., tci-StatesPDCCH-ToAddList) and a second higher layer parameter (e.g., tci-StatesPDCCH-ToReleaseList) may indicate/provide a subset of TCI states, such as defined by a third higher layer parameter (e.g., PDSCH-Config). The wireless device may use the subset of the TCI states to indicate/provide one or more QCL relationships between one or more RS in a TCI state of the subset of the TCI states and one or more DM-RS ports of a PDCCH reception in the CORESET.

A base station may configure a CORESET, for a wireless device, with a corresponding CORESET index (e.g., indicated/provided by higher layer parameter, controlResourceSetId) that is non-zero. The base station may or may not configure the wireless device with a configuration of one or more TCI states for the CORESET (e.g., may or may not indicate/provide a first higher layer parameter, tci-StatesPDCCH-ToAddList, and/or a second higher layer parameter, tci-StatesPDCCH-ToReleaseList). The wireless device may determine/assume that one or more DMRS antenna ports for a PDCCH reception in the CORESET is quasi co-located with an RS (e.g., SS/PBCH block), for example, based on not being configured with the configuration of the one or more TCI states for the CORESET. The wireless device may indicate/identify the RS during an initial access procedure.

A base station may configure a CORESET for a wireless device with a corresponding CORESET index i (e.g., indicated/provided by higher layer parameter, controlResourceSetId) that is non-zero. The base station may configure the wireless device with an initial configuration of at least two TCI states, for the CORESET (e.g., using a first higher layer parameter, tci-StatesPDCCH-ToAddList and/or a second higher layer parameter, tci-StatesPDCCH-ToReleaseList). The wireless device may receive the initial configuration of the at least two TCI states from the base station. The wireless device may or may not receive a MAC CE activation command for at least one of the at least two TCI states for the CORESET. The wireless device may determine/assume that one or more DM-RS antenna ports for a PDCCH reception in the CORESET is quasi co-located with an RS (e.g., SS/PBCH block), for example, based on being configured with the initial configuration for the CORESET and not receiving the MAC CE activation command for the CORESET. The wireless device may indicate/identify the RS during an initial access procedure.

A base station may configure a CORESET for a wireless device with a corresponding CORESET index (e.g., indicated/provided by higher layer parameter controlResourceSetId) that is equal to zero. The wireless device may not receive a MAC CE activation command for a TCI state for the CORESET. The wireless device may determine/assume that one or more DM-RS antenna ports for a PDCCH reception in the CORESET is quasi co-located with an RS (e.g., SS/PBCH block), for example, based on not receiving the MAC CE activation command. The wireless device may indicate/identify the RS during an initial access procedure. The wireless device may indicate/identify the RS from a most recent RA procedure. The wireless device may not initiate (e.g., refrain from initiating) the most recent RA procedure based on or in response to receiving a PDCCH order triggering a non-contention based RA procedure.

A base station may configure a wireless device with a single TCI state for a CORESET. The base station may indicate/provide the single TCI state using a first higher layer parameter (e.g., tci-StatesPDCCH-ToAddList) and/or a second higher layer parameter (e.g., tci-StatesPDCCH-ToReleaseList). The wireless device may determine/assume that one or more DM-RS antenna ports for a PDCCH reception in the CORESET is quasi co-located with one or more DL RSs configured by the single TCI state, for example, based on being configured with the single TCI state for the CORESET.

A base station may configure a CORESET for a wireless device. The base station may configure the wireless device with a configuration of at least two TCI states for the CORESET (e.g., using a first higher layer parameter, tci-StatesPDCCH-ToAddList, and/or a second higher layer parameter tci-StatesPDCCH-ToReleaseList). The wireless device may receive the configuration of the at least two TCI states from the base station. The wireless device may receive a MAC CE activation command for at least one of the at least two TCI states for the CORESET. The wireless device may determine/assume that one or more DM-RS antenna ports for a PDCCH reception in the CORESET is quasi co-located with one or more DL RSs configured by the single TCI state, for example, based on the receiving the MAC CE activation command for the at least one of the at least two TCI states.

A base station may configure a CORESET for a wireless device with a corresponding CORESET index (e.g., indicated/provided by higher layer, parameter controlResourceSetId) that is equal to zero. The base station may configure the wireless device with a configuration of at least two TCI states for the CORESET. The wireless device may receive the configuration of the at least two TCI states from the base station. The wireless device may receive a MAC CE activation command for at least one of the at least two TCI states for the CORESET. The wireless device may determine/expect that a QCL type (e.g., QCL-TypeD) of a first RS (e.g., CSI-RS) in the at least one of the at least two TCI states is indicated/provided by a second RS (e.g., SS/PBCH block), for example, based on the CORESET index being equal to zero. The wireless device may determine/expect that a QCL type (e.g., QCL-TypeD) of a first RS (e.g., CSI-RS) in the at least one of the at least two TCI states is spatially QCL-ed with a second RS (e.g., SS/PBCH block), for example, based on the CORESET index being equal to zero.

A wireless device may receive a MAC CE activation command for at least one of at least two TCI states for a CORESET. A PDSCH transmission may comprise the MAC CE activation command. The wireless device may send (e.g., transmit) a HARQ-ACK information for the PDSCH in a slot. The wireless device may apply the MAC CE activation command a time duration (e.g., 3 ms, 5 ms, or any other quantity of time duration) after the slot, for example, if the wireless device receives the MAC CE activation command for the at least one of the at least two TCI states for the CORESET, and/or based on (e.g., after or in response to) the transmitting HARQ-ACK information in the slot. A first BWP may be active in a second/other slot, for example, if the wireless device applies the MAC CE activation command in the second/other slot. The first BWP may be an active BWP, for example, based on the first BWP being active in the second/other slot.

A base station may configure a wireless device with one or more DL BWPs in a serving cell. The wireless device may be configured/provided (e.g., by higher layers) with one or more (e.g., 3, 5, 10, or any other quantity of) search space sets for a DL BWP of the one or more DL BWPs. The wireless device may be configured/provided by a higher layer parameter (e.g., SearchSpace), for a search space set of the one or more search space sets, at least one of: a search space set index (e.g., provided by a higher layer parameter searchSpaceId); an association between the search space set and a CORESET (e.g., indicated/provided by a higher layer parameter controlResourceSetId); a PDCCH monitoring periodicity of a first number of slots and a PDCCH monitoring offset of a second number of slots (e.g., indicated/provided by a higher layer parameter monitoringSlotPeriodicityAndOffset); a PDCCH monitoring pattern within a slot, indicating first symbol(s) of the CORESET within the slot for PDCCH monitoring, (e.g., indicated/provided by a higher layer parameter monitoringSymbolsWithinSlot); a duration of a third number of slots (e.g., indicated/provided by a higher layer parameter duration); a number of PDCCH candidates; and/or an indication that the search space set is either a common search space set or a wireless device-specific search space set (e.g., indicated/provided by a higher layer parameter searchSpaceType). The duration may indicate a quantity of slots comprising the search space set.

The wireless device may determine a PDCCH monitoring occasion, on an active DL BWP, for example, based on the PDCCH monitoring periodicity, the PDCCH monitoring offset, and/or the PDCCH monitoring pattern within a slot. The wireless device may determine, for the search space set, that a PDCCH monitoring occasion exists in a slot. The wireless device may monitor at least one PDCCH for the search space set for the duration of third number of slots (e.g., consecutive slots) starting from the slot.

A wireless device may monitor one or more PDCCH candidates in a USS set on an active DL BWP of a serving cell. A base station may not configure the wireless device with a carrier indicator field. The wireless device may monitor the one or more PDCCH candidates without the carrier indicator field, for example, if the base station does not configure the wireless device with the carrier indicator field.

A wireless device may monitor one or more PDCCH candidates in a USS set on an active DL BWP of a serving cell. A base station may configure the wireless device with a carrier indicator field. The wireless device may monitor the one or more PDCCH candidates with the carrier indicator field, for example, if the base station configures the wireless device with the carrier indicator field.

A base station may configure a wireless device to monitor one or more PDCCH candidates with a carrier indicator field in a first cell. The carrier indicator field may indicate a second cell. The carrier indicator field may correspond to a second cell. The wireless device may not determine/expect to monitor the one or more PDCCH candidates on an active DL BWP of the second cell, for example, based on monitoring the one or more PDCCH candidates, in the first cell, with the carrier indicator field indicating the second cell.

A wireless device may monitor one or more PDCCH candidates on an active DL BWP of a serving cell. The wireless device may monitor the one or more PDCCH candidates for the serving cell, for example, based on monitoring the one or more PDCCH candidates on the active DL BWP of the serving cell.

A wireless device may monitor one or more PDCCH candidates on an active DL BWP of a serving cell. The wireless device may monitor the one or more PDCCH candidates at least for the serving cell, for example, based on monitoring the one or more PDCCH candidates on the active DL BWP of the serving cell. The wireless device may monitor the one or more PDCCH candidates for the serving cell and/or at least a second serving cell.

A base station may configure a wireless device with one or more cells. The base station may configure the wireless device for a single-cell operation, for example, if a quantity of the one or more cells is one. The base station may configure the wireless device for an operation with a carrier aggregation in a same frequency band (e.g., intra-band), for example, if a quantity of the one or more cells is more than one.

The wireless device may monitor one or more PDCCH candidates in overlapping PDCCH monitoring occasions in a plurality of CORESETs on active DL BWP(s) of the one or more cells. The plurality of the CORESETs may have different QCL-TypeD properties.

The plurality of CORESETs may comprise a first CORESET and/or a second CORESET. A first PDCCH monitoring occasion in the first CORESET of a first cell (e.g., of the one or more cells) may overlap with a second PDCCH monitoring occasion in a second CORESET of the first cell. The wireless device may monitor at least one first PDCCH candidate in the first PDCCH monitoring occasion on an active DL BWP (e.g., of the active DL BWP(s)) of the first cell. The wireless device may monitor at least one second PDCCH candidate in the second PDCCH monitoring occasion on the active DL BWP of the first cell.

The one or more cells may comprise a first cell and a second cell. A first PDCCH monitoring occasion in a first CORESET of a first cell may overlap with a second PDCCH monitoring occasion in a second CORESET of a second cell. The wireless device may monitor at least one first PDCCH candidate in the first PDCCH monitoring occasion on a first active DL BWP (e.g., of the active DL BWP(s)) of the first cell. The wireless device may monitor at least one second PDCCH candidate in the second PDCCH monitoring occasion on a second active DL BWP (e.g., of the active DL BWP(s)) of the second cell.

A first QCL type property (e.g., QCL-TypeD) of the first CORESET may be different from a second QCL type property (e.g., QCL-TypeD) of the second CORESET. The wireless device may use a CORESET determination rule. For example, the wireless device may use a CORESET determination rule to determine a selected CORESET, of the plurality of the CORESETs, of a cell of one or more cells. The wireless device may determine the selected CORESET, for example, based on the monitoring the one or more PDCCH candidates in the overlapping PDCCH monitoring occasions in a first plurality of CORESETs and a second plurality of the CORESETs having the different QCL type properties. The wireless device may monitor at least one PDCCH candidate, in the overlapping PDCCH monitoring occasions, in the selected CORESET on an active DL BWP of the cell, for example, based on determining the selected CORESET. The selected CORESET may be associated with a search space set. The association may be indicated/provided by a higher layer parameter (e.g., controlResourceSetId).

One or more CORESETs of the plurality of CORESETs may be associated with a CSS set. The association of the one or more CORESETs of the plurality of CORESETs with the CSS set may comprise that at least one search space set of a CORESET of the one or more CORESETs has at least one PDCCH candidate in the overlapping PDCCH monitoring occasions and/or is a CSS set. The association between the at least one search space set and the CORESET may be indicated/provided by a higher layer parameter (e.g., controlResourceSetId).

A first CORESET may be associated with a first CSS set. The first CORESET may be associated with a first USS set. A second CORESET may be associated with a second CSS set. The second CORESET may be associated with a second USS set. Association of a CORESET (e.g., the first CORESET, the second CORESET) with a CSS set (e.g., first CSS set, second CSS set) may comprise that at least one search space of the CORESET is the CSS set. Association of CORESET (e.g., the first CORESET, the second CORESET) with an USS set (e.g., first USS set, second USS set) may comprise that at least one search space of the CORESET is the USS set. The one or more CORESETs may comprise the first CORESET and the second CORESET, for example, if the first CORESET is associated with the first CSS set and the second CORESET is associated with the second CSS set.

One or more selected cells may comprise the first cell and the second cell, for example, if the first CORESET is configured in the first cell and the second CORESET is configured in the second cell. The one or more selected cells may comprise the first cell, for example, if the first CORESET is configured in the first cell and the second CORESET is configured in the first cell. At least one CORESET may comprise the first CORESET and the second CORESET. A first search space set of the first CORESET of the at least one CORESET may be indicated/identified by a first search space set specific index (e.g., indicated/provided by a higher layer parameter searchSpaceId). The wireless device may monitor the at least one first PDCCH candidate in the first PDCCH monitoring occasion in the first CORESET associated with the first search space set. The association may be indicated/provided by a higher layer parameter (e.g., controlResourceSetId). A second search space set of the second CORESET of the at least one CORESET may be indicated/identified by a second search space set specific index (e.g., indicated/provided by a higher layer parameter searchSpaceId). The wireless device may monitor the at least one second PDCCH candidate in the second PDCCH monitoring occasion in the second CORESET associated with the second search space set. The association may be indicated/provided by a higher layer parameter (e.g., controlResourceSetId). The first search space set specific index may be lower than the second search space set specific index. The wireless device may select the first search space set (e.g., for a CORESET determination rule), for example, if the first search space set specific index is lower than the second search space set specific index. The wireless device may monitor the at least one first PDCCH candidate in the first PDCCH monitoring occasion in the first CORESET on the active DL BWP of the first cell, for example, based on determining/selecting the first search space set. The wireless device may stop monitoring the at least one second PDCCH candidate in the second PDCCH monitoring occasion in the second CORESET on the active DL BWP of the first cell, for example, based on determining/selecting the first search space set. The wireless device may stop/drop monitoring the at least one second PDCCH candidate in the second PDCCH monitoring occasion in the second CORESET on the active DL BWP of the first cell, for example, based on determining/selecting the first search space set.

The first cell may be indicated/identified by a first cell-specific index and the second cell may be indicated/identified by a second cell-specific index. The first cell-specific index may be less than the second cell-specific index. The wireless device may select the first cell, based on or in response to the first cell-specific index being less than the second cell-specific index, for example, if the one or more selected cells comprises the first cell and the second cell.

The one or more CORESETs may comprise the first CORESET, for example, if the first CORESET is associated with the first CSS set and the second CORESET is associated with the second USS set. The one or more selected cells may comprise the first cell, for example, if the one or more CORESETS comprises the first CORESET and the first CORESET is configured in the first cell.

The one or more CORESETs may comprise the second CORESET. The one or more selected cells may comprise the first cell, for example, if the one or more CORESETs comprises the second CORESET and the second CORESET is configured in the first cell. The one or more selected cells may comprise the second cell, for example, if the one or more CORESETs comprises the second CORESET and the second CORESET is configured in the second cell.

The wireless device may determine that the one or more CORESETs are associated with one or more selected cells of the one or more cells. The base station may configure a first CORESET and a second CORESET of the one or more CORESETs in a first cell of the one or more selected cells. The base station may configure a third CORESET of the one or more CORESETs in a second cell of the one or more selected cells. The first cell and the second cell may be different (or the same).

The wireless device may receive, from the base station, one or more configuration parameters. The one or more configuration parameters may indicate, for example, cell-specific indices (e.g., indicated/provided by a higher layer parameter servCellIndex) for the one or more cells. Each cell of the one or more cells may be indicated/identified by a respective one cell-specific index of the cell-specific indices. A cell-specific index of a cell of the one or more selected cells may be least among the cell-specific indices of the one or more selected cells.

The wireless device may select (e.g., for the CORESET determination rule) the cell, for example, if the cell-specific index of the cell is least among the cell-specific indices of the one or more selected cells. The base station may configure at least one CORESET of the one or more CORESETs in the selected cell. At least one search space set of the at least one CORESET may have at least one PDCCH candidate in the overlapping PDCCH monitoring occasions and/or may be a CSS set.

The one or more configuration parameters may indicate search space set specific indices for the at least one search space set of the cell. The indices may be indicated/provided by a higher layer parameter (e.g., searchSpaceId). Each search space set of the at least one search space set may be indicated/identified by a respective search space set specific index of the search space set specific indices. The wireless device may determine that a search space specific index of a search space set of the at least one search space set may be least among the search space set specific indices of the at least one search space set. The wireless device may determine/select, for the CORESET determination rule, the search space set, for example, if the search space specific index of the search space set specific index is least among the search space set specific indices of the at least one search space set. The search space set may be associated with a selectedCORESET of the at least one CORESET. The association may be indicated/provided by a higher layer parameter (e.g., controlResourceSetId).

The wireless device may monitor at least one PDCCH in the selected CORESET of the plurality of the CORESETs on an active DL BWP of the cell of the one or more cells, for example, based on selecting the cell and/or the selecting the search space set associated with the selected CORESET. The wireless device may monitor the at least one PDCCH, for example, if the wireless device monitors the one or more PDCCH candidates in the overlapping PDCCH monitoring occasions in the plurality of CORESETs, and CORESETs in the plurality of the CORESETs have different QCL-Type (e.g. QCLTypeD) properties. The wireless device may determine/select, based on the CORESET determination rule, the determined/selected CORESET associated with the search space set and the cell.

The selected CORESET may have a first QCL-TypeD property. A second CORESET of the plurality of the CORESETs may have a second QCL-TypeD property. The selected CORESET and the second CORESET may be different. The first QCL-TypeD property and the second QCL-TypeD property may be same. The wireless device may monitor at least one second PDCCH candidate (e.g., in the overlapping PDCCH monitoring occasions) in the second CORESET of the plurality of the CORESETs, for example, if the first QCL-TypeD property of the selected CORESET and the second QCL-TypeD property of the second CORESET are the same.

The first QCL-TypeD property and the second QCL-TypeD property may be different. The wireless device may stop/drop monitoring at least one second PDCCH candidate (e.g., in the overlapping PDCCH monitoring occasions) in the second CORESET of the plurality of the CORESETs, for example, if the first QCL-TypeD property of the selected CORESET and the second QCL-TypeD property of the second CORESET are different. The wireless device may stop/drop monitoring at least one second PDCCH candidate (e.g., in the overlapping PDCCH monitoring occasions) in the second CORESET of the plurality of the CORESETs, for example, if the first QCL-TypeD property of the determined/selected CORESET and the second QCL-TypeD property of the second CORESET are different. The wireless device may determine a quantity of active TCI states from the plurality of CORESETs.

A wireless device may determine/consider, for a CORESET determination rule, that a first QCL type (e.g., QCL TypeD) property of a first RS (e.g., SS/PBCH block) is different from a second QCL type (e.g., QCL TypeD) property of a second RS (CSI-RS). A first RS (e.g., CSI-RS) may be associated (e.g., QCL-ed) with an RS (e.g., SS/PBCH block) in a first cell, for example, for the CORESET determination rule. A second RS (e.g., CSI-RS) may be associated (e.g., QCL-ed) with the RS in a second cell. The wireless device may consider that a first QCL type (e.g., QCL TypeD) property of the first RS and a second QCL type (e.g., QCL TypeD) property of the second RS are the same, for example, if the first RS and the second RS are associated with the RS.

A wireless device may monitor a search space set, or multiple search space sets associated with different CORESETs for one or more cells. The wireless device may monitor multiple search space sets, for example, for a single cell operation or for an operation with carrier aggregation in a same frequency band. At least two monitoring occasions of at least two search space sets of the multiple search space sets may overlap in time (e.g., at least one symbol, at least one slot, subframe, etc.). The at least two search space sets may be associated with at least two first CORESETs. The at least two first CORESETs may have different QCL-TypeD properties. The wireless device may monitor at least one search space set associated with a selected CORESET in an active DL BWP of a cell, for example, based on a CORESET determination rule. The at least one search space set may be a CSS set. A cell-specific index of the cell may be lowest among cell-specific indices of the one or more cells comprising the cell. At least two second CORESETs of the cell may comprise a CSS set. The wireless device may determine/select a CORESET (e.g., determined/selected CORESET) of the at least two second CORESETs, for example, if a search space specific index of a search space set associated with the determined/selected CORESET is the least among search space specific indices of search space sets associated with the at least two second CORESETs. The wireless device may monitor the search space set in the at least two monitoring occasions.

The wireless device may determine that the at least two first CORESETs may or may not be associated with a CSS set. The wireless device may determine, for example, that each CORESET of the at least two first CORESETs may not be associated with a CSS set. The wireless device may monitor at least one search space set associated with a selected CORESET in an active DL BWP of a cell, for example, based on the CORESET determination rule and/or based on the determining that the at least two first CORESETs are not associated with a CSS set. The at least one search space set may be a USS set. A cell-specific index of the cell may be least among cell-specific indices of the one or more cells comprising the cell. At least two second CORESETs of the cell may comprise a USS set. The wireless device may determine/select a CORESET (e.g., determined/selected CORESET) of the at least two second CORESETs, for example, if a search space specific index of a search space set associated with the selected CORESET is the least among search space specific indices of search space sets associated with the at least two second CORESETs. The wireless device may monitor the search space set in the at least two monitoring occasions.

A base station may indicate to a wireless device, a TCI state for a CORESET of a serving cell, for example, by sending a TCI state indication for wireless device-specific (e.g., UE-specific) PDCCH MAC CE. The base station may indicate the TCI state for a PDCCH reception. The wireless device (e.g., a MAC entity of the wireless device) may indicate to lower layers (e.g., a PHY entity) information regarding the TCI state indication for the wireless device-specific PDCCH MAC CE, for example, if the wireless device (e.g., the MAC entity) receives a TCI state indication for the wireless device-specific PDCCH MAC CE on/for a serving cell.

A TCI state indication for a wireless device-specific PDCCH MAC CE may be indicated/identified by a MAC PDU subheader with LCID. The TCI state indication for a wireless device-specific PDCCH MAC CE may have a fixed size of a quantity of bits such as 16 bits (or any other quantity of bits) and may comprise one or more fields. The one or more fields may comprise a serving cell ID, CORESET ID, TCI state ID, and/or a reserved bit.

The serving cell ID may indicate an identity of the serving cell for which the TCI state indication applies. The length of the serving cell ID may be n bits (e.g., n may be 5 bits, or any other quantity of bits). The CORESET ID may indicate a control resource set. The control resource set may be indicated/identified with a control resource set ID (e.g., ControlResourceSetId). The length of the CORESET ID may be n3 bits (e.g., n3 may be 4 bits, or any other quantity of bits). The TCI state ID (e.g., TCI-StateId) may indicate a TCI state. The TCI state may be applicable to the control resource set indicated/identified by the CORESET ID. The length of the TCI state ID may be n4 bits (e.g., n4=6 bits, or any other quantity of bits). An information element (e.g., ControlResourceSet) may be used to configure a time/frequency control resource set (CORESET) in which to search for DCI.

An information element (e.g., TCI-State) may associate one or two DL reference signals with a corresponding QCL type. The TCI-State may comprise one or more fields (e.g., TCI-StateId and QCL-Info). The TCI-StateID may indicate (e.g., identify) a configuration of a TCI state. The QCL-Info may comprise one or more second fields. The one or more second fields may comprise serving cell index, BWP indicator (e.g., identifier), a reference signal indicator (e.g., SSB-index, NZP-CSI-RS-ResourceID), and/or a QCL Type indicator (e.g., QCL-typeA, QCL-typeB, QCL-typeC, QCL-typeD).

A reference signal may be located in a serving cell. The reference signal indicator (e.g., index) may indicate the reference signal. The serving cell index may indicate the serving cell. An information element TCI-State may apply to a serving cell in which the information element TCI-State is configured, for example, if a serving cell index is absent in the information element TCI-State. The reference signal may be located on a second serving cell other than the serving cell in which the information element TCI-State is configured only if the QCL-Type is configured as a first type (e.g., TypeD, TypeA, TypeB). The BWP ID may indicate a downlink BWP of the serving cell in which the reference signal is located in.

An information element (e.g., SearchSpace) may define how/where to search for PDCCH candidates in a search space. The search space may be indicated/identified by an indicator (e.g., searchSpaceId) field in the information element SearchSpace. Each search space may be associated with a CORESET (e.g., ControlResourceSet). The CORESET may be indicated, for example, by a controlResourceSetId field in the information element SearchSpace. The controlResourceSetId field may indicate the CORESET applicable for the SearchSpace.

A base station may need/request radio access capability information of a wireless device. The base station may initiate a procedure to request the radio access capability information. The base station may use, for example, an information element (e.g., UECapabilityEnquiry). The wireless device may use an information element (e.g., UECapabilityInformation) to transfer wireless device radio access capability information requested by the base station. The wireless device may indicate/provide, for example, a parameter (e.g., timeDurationForQCL) in a message (e.g., FeatureSetDownlink) indicating a set of features that the wireless device supports.

A wireless device may indicate (e.g., report), to a base station, an RF capability of the wireless device via a capability signaling of the wireless device. The RF capability may be reception capability and/or transmission capability. The base station may determine whether the wireless device may receive (and/or transmit) simultaneous physical channels and/or RSs via different receiving (and/or transmitting) beams from one or more component carriers in the downlink (and/or uplink) at the same time instant, for example, based on the capability signaling.

A base station may configure (e.g., in intra-band CA) one or more component carriers in the same band. The one or more component carriers may be powered by a same and a single RF chain. The wireless device may apply a single and a same set of TX/RX spatial parameters to the one or more component carriers in the same band at a same (or substantially the same) time instant. Applying the single and the same set of TX/RX spatial parameters may impose limitations on flexibility of multiplexing physical channels (e.g., PDSCH/PUSCH, PDCCH/PUCCH, SRS, PRACH, etc.) and/or reference signals (RSs) (e.g., CSI-RS, SSB, etc.), for example, within and/or across the one or more component carriers.

A first channel/RS of a first serving cell (e.g., PCell, BWP) and a second channel/RS of a second serving cell (e.g., SCell, BWP) may be multiplexed in the same OFDM symbols, for example if the first channel/RS is associated with a second channel/RS (e.g., QCL-ed with QCL type as QCL TypeD). A wireless device may transmit/receive (e.g., simultaneously transmit/receive) the multiplexed first channel/RS and the second channel/RS in the uplink/downlink.

One or more first antenna ports of a first serving cell and one or more second antenna ports of a second serving cell may not be associated (e.g., may not be QCL-ed with QCL type as QCL-TypeD). A wireless device may not determine (e.g., may not infer) one or more channel properties of the one or more first antenna ports of the first serving cell from the one or more second antenna ports of the second serving cell.

The first channel/RS (e.g., PDSCH/PUSCH, PDCCH/PUCCH, SRS, PRACH, CSI-RS, SSB, etc.) and the second channel/RS (e.g., PDSCH/PUSCH, PDCCH/PUCCH, SRS, PRACH, CSI-RS, SSB, etc.) may not be associated (e.g., may not be QCL-ed with QCL type as QCL-TypeD). A base station may configure the first channel/RS may with a first QCL assumption and the second channel/RS with a second QCL assumption. A first transmission/reception of the first channel/RS and a second transmission/reception of the second channel/RS may overlap (e.g., in at least one OFDM symbol). The wireless device may not perform the first transmission/reception and the second transmission/reception simultaneously, for example, if the first QCL assumption and the second QCL assumption are not the same.

Figure 18A:
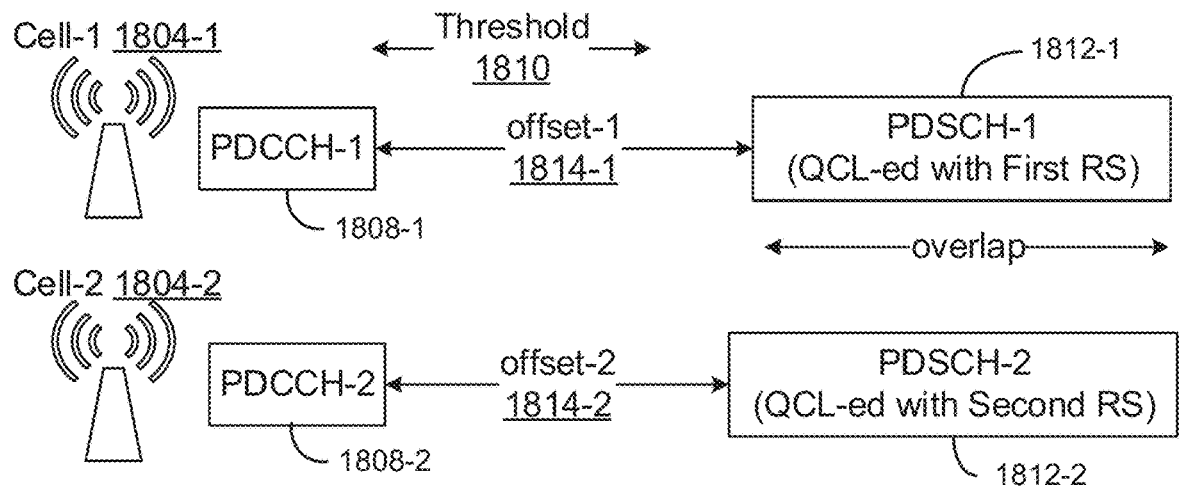
FIG. 18A, FIG. 18B and FIG. 18C show examples of downlink beam management procedures in a communication system comprising at least two cells.
Figure 18B:
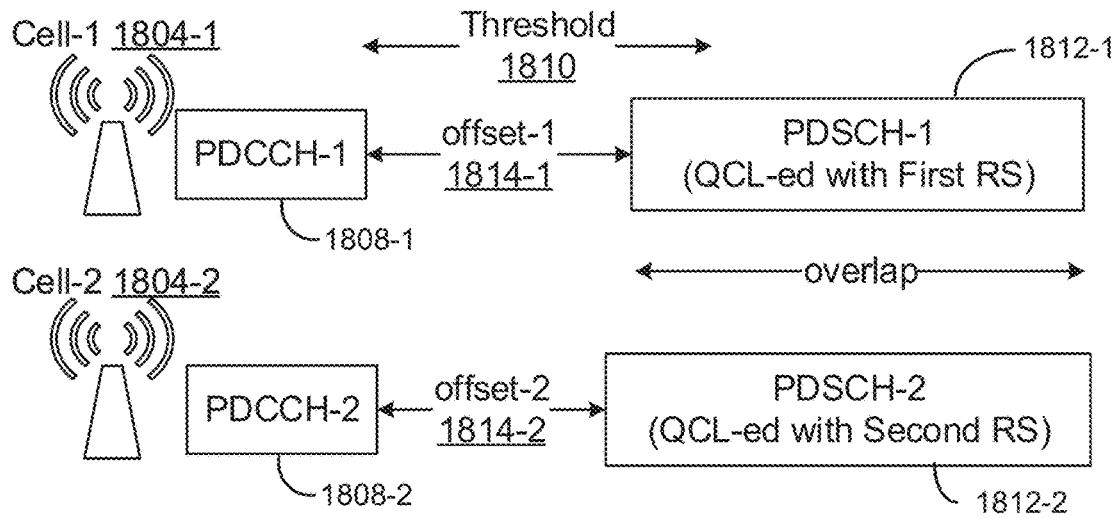
Figure 18C:
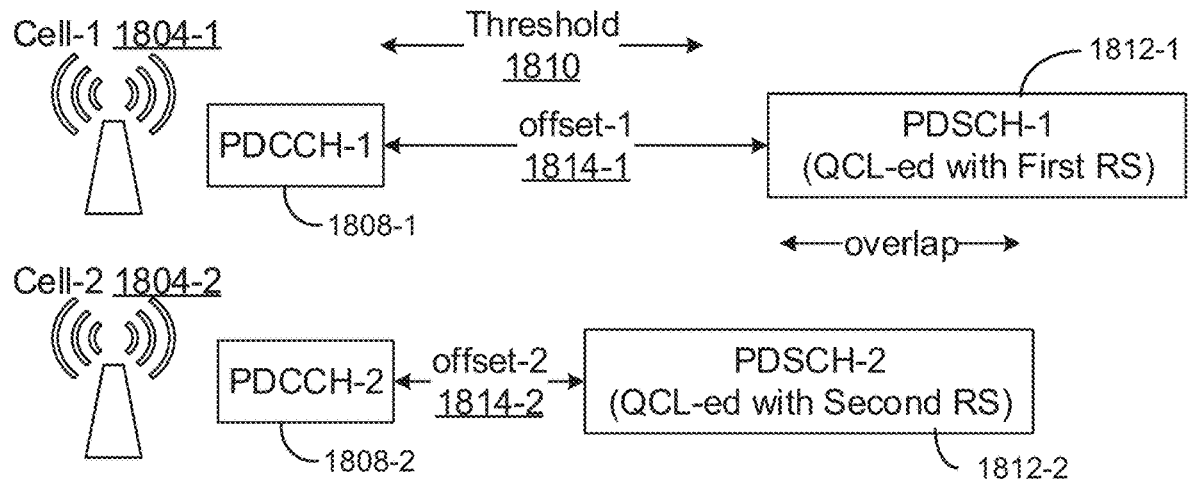

FIG. 18A, FIG. 18B and FIG. 18C show examples of downlink beam management. The example downlink beam management procedures may be used, for example, to receive data from multiple cells. The downlink beam management procedures may be used, for example, if a wireless device is configured to use only a single QCL assumption (e.g., a single beam), for receiving data (e.g., one or more PDSCHs), at a given instant of time. A wireless device may detect a first PDCCH (e.g., PDCCH-1 1808-1), for a first cell (e.g., Cell-1 1804-1). The PDCCH-1 1808-1 may comprise first DCI. The wireless device may receive the first DCI, for example, based on monitoring the PDCCH-1 1808-1. The first DCI may schedule a first PDSCH (e.g., PDSCH-1 1812-1) for the first cell. The first cell may be indicated/identified by a first cell-specific index (e.g., indicated/provided by a higher layer parameter such as a servCellIndex). One or more TRPs of the cell-1 1804-1 may send (e.g., transmit) the first DCI in/via the PDCCH-1 1808-1 and send (e.g., transmit) data in/via the PDSCH-1 1812-1.

A first QCL assumption (e.g., a TCI state) may indicate at least one first RS (e.g., SS/PBCH block, CSI-RS). The first QCL assumption may indicate a first QCL type (e.g., QCL-TypeD). The PDSCH-1 1812-1 may be associated with the first QCL assumption. The PDSCH-1 1812-1 being associated with the first QCL assumption may comprise that at least one first DM-RS port of the PDSCH-1 1812-1 is quasi co-located with the at least one first RS (e.g., first RS in FIG. 18A, FIG. 18B, FIG. 18C) with respect to the first QCL type. The wireless device may determine/assume that at least one first DM-RS port of the PDSCH-1 1812-1 is quasi co-located with the at least one first RS with respect to the first QCL type, for example, based on the PDSCH-1 1812-1 being associated with the first QCL assumption. The first QCL assumption may be associated with the at least one first DM-RS port of the PDSCH-1 1812-1. The first QCL assumption being associated with the at least one first DM-RS port of the PDSCH-1 1812-1 may comprise that the at least one first DM-RS port of the PDSCH-1 1812-1 is quasi co-located with the at least one first RS with respect to the first QCL type. The wireless device may determine/assume that at least one first DM-RS port of the PDSCH-1 1812-1 is quasi co-located with the at least one first RS with respect to the first QCL type, for example, based on the first QCL assumption being associated with the at least one first DM-RS port of the PDSCH-1 1812-1.

A wireless device may detect a second PDCCH (e.g., PDCCH-2 1808-2), for a second cell (e.g., Cell-2 1804-2). The PDCCH-2 1808-2 may comprise second DCI. The wireless device may receive the second DCI, for example, based on monitoring the PDCCH-2 1808-2. The second DCI may schedule a second PDSCH transmission (e.g., PDSCH-2 1812-2) for the second cell. The second cell may be indicated/identified by a second cell-specific index (e.g., indicated/provided by a higher layer parameter such as servCellIndex). One or more TRPs of the cell-2 1804-2 may send (e.g., transmit) the second DCI in/via the PDCCH-2 1808-2 and/or send (e.g., transmit) data in/via the PDSCH-2 1812-2. The first cell and the second cell may operate using intra-band CA.

A second QCL assumption (e.g., TCI state) may indicate at least one second RS (e.g., SS/PBCH block, CSI-RS). The second QCL assumption may indicate a second QCL type (e.g., QCL-TypeD). The PDSCH-2 1812-2 may be associated with the second QCL assumption. The PDSCH-2 1812-2 being associated with the second QCL assumption may comprise that at least one second DM-RS port of the PDSCH-2 1812-2 is quasi co-located with the at least one second RS (e.g., second RS in FIG. 18A, FIG. 18B, FIG. 18C) with respect to the second QCL type. The wireless device may determine/assume that at least one second DM-RS port of the PDSCH-2 1812-2 is quasi co-located with the at least one second RS with respect to the second QCL type, for example, based on the PDSCH 1812-2 being associated with the second QCL assumption. The second QCL assumption may be associated with the at least one second DM-RS port of the PDSCH-2 1812-2. The second QCL assumption being associated with the at least one second DM-RS port of the PDSCH-2 1812-2 may comprise that the at least one second DM-RS port of the PDSCH-2 1812-2 is quasi co-located with the at least one second RS with respect to the second QCL type. The wireless device may determine/assume that at least one second DM-RS port of the PDSCH-2 1812-2 is quasi co-located with the at least one second RS with respect to the second QCL type, for example, based on the PDSCH-2 1812-2 being associated with the second QCL assumption.

The wireless may determine that the first PDSCH and the second PDSCH overlaps in a time duration (e.g., overlap in FIG. 18A, FIG. 18B, FIG. 18C). The time duration may be at least one symbol (or any other quantity of symbols). The time duration may be at least one slot (or any other quantity of slots). The time duration may be at least one subframe (or any other quantity of subframes). The time duration may be at least one frame (or any other quantity of frames).

The first QCL assumption and the second QCL assumption may be the same or different. The first QCL assumption and the second QCL assumption being different may comprise that the first PDSCH and the second PDSCH correspond to different time durations. The first QCL assumption and the second QCL assumption being different may comprise that the wireless device may not receive the first PDSCH and the second PDSCH in the time duration simultaneously. The first QCL assumption and the second QCL assumption being different may comprise that the at least one first RS and the at least one second RS are different. The first QCL assumption and the second QCL assumption being different may comprise that the at least one first RS and the at least one second RS are not QCL-ed.

A first time offset (offset-1 1814-1) may be a time duration between a reception of the first DCI (e.g., in/via PDCCH-1), at the wireless device, and a first reception of the PDSCH-1 1812-1 at the wireless device. A second time offset (offset-2 1814-2) may be a time duration between a reception of the second DCI (e.g., in/via PDCCH-2), at the wireless device, and a second reception of the PDSCH-2 1812-2 at the wireless device.

FIG. 18A shows an example operation where the offset-1 1814-1 may be equal to or greater than a threshold 1810 (e.g., timeDurationForQCL, Threshold-Sched-Offset) and the offset-2 1814-2 may be equal to or greater than the threshold. The first cell-specific index (corresponding to cell-1 1804-1) may be less than the second cell-specific index (corresponding to cell-2 1804-2). The wireless device may be configured to prioritize only one QCL assumption of the first QCL assumption and the second QCL assumption, for example, based on determining that the first PDSCH and the second PDSCH overlap in the time duration, and the first QCL assumption and the second QCL assumption are different. The wireless device may prioritize the first QCL assumption with the first QCL type associated with the at least one first DM-RS port of the PDSCH-1 1812-1 on the cell-1 1804-1, for example, based on the first cell-specific index being less than the second cell-specific index. The wireless device may use the first QCL assumption, for example, to receive data in/via both PDSCH-1 1812-1 and PDSCH-2 1812-2. The wireless device may use a beam based on the first QCL assumption, for example, to receive data in/via both PDSCH-1 1812-1 and PDSCH-2 1812-2. The wireless device may assume that DM-RS ports of PDSCH 1812-1 and PDSCH 1812-2 (e.g., the at least one first DM-RS ports and the at least one second DM-RS ports) are quasi co-located with RS(s) in the first QCL assumption (e.g., the at least one first RS) with respect to the QCL type parameter(s) given by the first QCL assumption.

FIG. 18B shows an example operation where the offset-1 1814-1 may be lower than the threshold 1810 (e.g., timeDurationForQCL, Threshold-Sched-Offset) and the offset-2 1814-2 may be lower than the threshold. The first cell-specific index (corresponding to cell-1 1804-1) may be less than the second cell-specific index (corresponding to cell-2 1804-2). The wireless device may be configured to prioritize only one QCL assumption of the first QCL assumption and the second QCL assumption, for example, based on determining that the PDSCH-1 1812-1 and the PDSCH-2 1812-2 overlap in time, and the first QCL assumption and the second QCL assumption are different. The wireless device may prioritize the first QCL assumption with the first QCL type associated with the at least one first DM-RS port of the PDSCH-1 1812-1 on the cell-1 1804-1, for example, based on the first cell-specific index being less than the second cell-specific index. The wireless device may, for example, use the first QCL assumption to receive data in/via both PDSCH-1 1812-1 and PDSCH-2 1812-2. The wireless device may, for example, use a beam based on the first QCL assumption to receive data in/via both PDSCH-1 1812-1 and PDSCH-2 1812-2. The wireless device may assume that DM-RS ports of PDSCH 1812-1 and PDSCH 1812-2 (e.g., the at least one first DM-RS ports and the at least one second DM-RS ports) are quasi co-located with RS(s) in the first QCL assumption (e.g., the at least one first RS) with respect to the QCL type parameter(s) given by the first QCL assumption.

FIG. 18C shows an example operation where the offset-1 1814-1 may be equal to or larger than the threshold 1810 (e.g., timeDurationForQCL, Threshold-Sched-Offset) and the offset-2 1814-2 may be less than the threshold. The wireless device may be configured to prioritize only one QCL assumption of the first QCL assumption and the second QCL assumption, for example, based on determining that the PDSCH-1 1812-1 and the PDSCH-2 1812-2 overlap in time, and the first QCL assumption and the second QCL assumption are different. The wireless device may prioritize a QCL assumption associated with a PDSCH that has a larger offset with respect to a corresponding PDCCH. The wireless device may prioritize the first QCL assumption with the first QCL type associated with the at least one first DM-RS port of the PDSCH-1 1812-1 on the cell-1 1804-1, for example, based on the offset-1 1814-1 being equal to or greater than the threshold and the offset-2 1814-2 being less than the threshold. The wireless device may, for example, use the first QCL assumption to receive data in/via both PDSCH-1 1812-1 and PDSCH-2 1812-2. The wireless device may, for example, use a beam based on the first QCL assumption to receive data in/via both PDSCH-1 1812-1 and PDSCH-2 1812-2. The wireless device may assume that DM-RS ports of PDSCH 1812-1 and PDSCH 1812-2 (e.g., the at least one first DM-RS ports and the at least one second DM-RS ports) are quasi co-located with RS(s) in the first QCL assumption (e.g., the at least one first RS) with respect to the QCL type parameter(s) given by the first QCL assumption.

A time offset (e.g., the time offset 1814-1, the time offset 1814-2) between a reception (e.g., first reception, second reception) of a DCI (e.g., first DCI, second DCI) and a first reception of a PDSCH (e.g., PDSCH-1 1182-1, PDSCH-2 1812-2) scheduled by the DCI may be equal to or larger than a threshold (e.g., timeDurationForQCL, Threshold-Sched-Offset). The time offset being equal to or larger than the threshold may comprise that the PDSCH is scheduled after the threshold. A time offset (e.g., the time offset 1814-1, the time offset 1814-2) between a reception (e.g., first reception, second reception) of a DCI (e.g., first DCI, second DCI) and a first reception of a PDSCH (e.g., the PDSCH-1 1812-1, the PDSCH 1812-2) scheduled by the DCI may be less than a threshold (e.g., timeDurationForQCL, Threshold-Sched-Offset). The time offset being less than the threshold may comprise that the PDSCH is scheduled before the threshold.

The prioritizing the first QCL assumption with the first QCL type may comprise that the at least one second DM-RS port of the PDSCH-2 1812-2 is quasi co-located with the at least one first RS with respect to the first QCL type (e.g., indicated by the first QCL assumption) in the time duration. The wireless device may determine/assume that the at least one second DM-RS port of the PDSCH-2 1812-2 is quasi co-located with the at least one first RS with respect to the first QCL type based on prioritizing the first QCL assumption. The prioritizing the first QCL assumption with the first QCL type may comprise that the wireless device may receive the PDSCH-2 1812-2 with the at least one first RS with respect to the first QCL type in the time duration. The prioritizing the first QCL assumption with the first QCL type may comprise that the wireless device may apply the at least one first RS with respect to the first QCL type (e.g., indicated by the first QCL assumption) for the second reception of the PDSCH-2 1812-2 in the time duration.

The prioritizing the first QCL assumption with the first QCL type may comprise that the first QCL assumption with the first QCL type overrides the second QCL assumption with the second QCL type in the time duration. The first QCL type and the second QCL type may or may not be the same (e.g., QCL-TypeD).

The prioritizing the first QCL assumption with the first QCL type may comprise that the at least one second DM-RS port of the PDSCH-2 1812-2 is quasi co-located with the at least one second RS with respect to the second QCL type (e.g., indicated by the second QCL assumption) outside of the time duration (e.g., in non-overlapped portions of the second PDSCH). The wireless device may determine/assume that the at least one second DM-RS port of the PDSCH-2 1812-2 is quasi co-located with the at least one second RS with respect to the second QCL type (e.g., indicated by the second QCL assumption) outside of the time duration.

A downlink channel (e.g., a PDSCH) that is associated with a procedure (e.g., beam failure recovery (BFR) procedure) may overlap (e.g., in time) with one or more other downlink channels (e.g., other PDSCHs) that may not be associated with the procedure. A wireless device receiving a downlink transmission associated with the procedure may use a beam that is not associated with the procedure (e.g., based on downlink beam management procedures described in FIGS. 18A-18C). The wireless device may fail to successfully complete the procedure in such circumstances. The wireless device may not receive all data associated with the procedure. Some procedures, such as the beam failure recovery procedure, may be important for communication between the wireless device and a base station. Failure of important/critical procedures may result in failure of a communication link, reduced channel throughput, and/or additional overhead.

The wireless device may, for example, prioritize (e.g., based on downlink beam management procedures described in FIGS. 18A-18C) a QCL assumption of a PDSCH that is not associated with a BFR procedure. The wireless device may use a beam, for example, based on the QCL assumption that is not associated with that BFR procedure, to receive PDSCH associated with the BFR procedure. Prioritizing the QCL assumption of the PDSCH that is not associated with the BFR procedure may result in the wireless device failing to receive parameters (e.g., reconfiguration parameters) associated with BFR. This may result in failure of the BFR procedure. Failure of a BFR procedure may negatively impact data transmission and/or reception.

Various examples herein describe prioritizing a beam (e.g., a QCL assumption) that is associated with a procedure (e.g., a BFR procedure) over other beams (e.g., other QCL assumptions) that are not associated with the procedure. The wireless device may use, for example, a beam that is associated with a critical procedure to receive overlapping data that is not associated with the critical procedure. The wireless device may prioritize a QCL assumption, for example, of a PDSCH associated with the BFR procedure in downlink beam management procedures. Prioritizing a QCL assumption of a PDSCH associated with the BFR procedure may enable successful completion of a BFR procedure.

Figure 19:
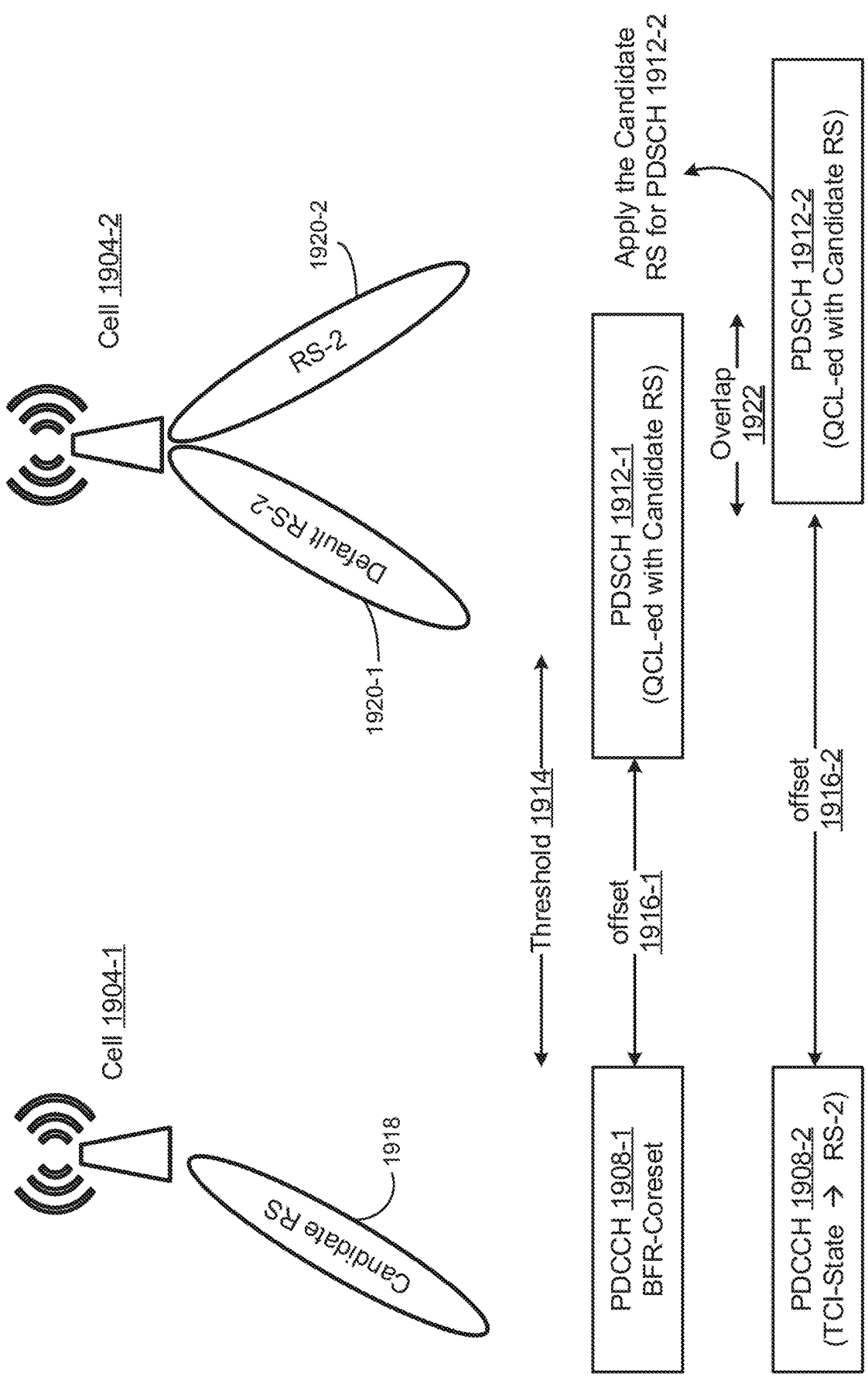
FIG. 19 shows an example downlink beam management procedure for a beam failure recovery procedure.

FIG. 19 shows an example downlink beam management procedure. A wireless device may receive, from a base station, one or more messages. The one or more messages may comprise one or more configuration parameters of a plurality of cells. The plurality of cells may comprise a first cell (e.g., cell 1904-1) and a second cell (e.g., cell 1904-2).

The one or more configuration parameters may indicate cell-specific indices (e.g., indicated/provided by a higher layer parameter such as servCellIndex) for the plurality of cells. Each cell of the plurality of cells may be indicated/identified by a respective one cell-specific index of the cell-specific indices. The cell 1904-1 may be indicated/identified by a first cell-specific index and the cell 1904-2 may be indicated/identified by a second cell-specific index.

The one or more configuration parameters may indicate a CORESET for a procedure (e.g., a BFR procedure) associated with the cell 1904-1. The one or more configuration parameters may indicate one or more RSs for the BFR procedure of the cell 1904-1. The CORESET may be dedicated to the BFR procedure of the cell 1904-1. The wireless device may measure/monitor the one or more RSs for a candidate RS (or beam) selection for the BFR procedure of the cell 1904-1.

The wireless device may initiate a BFR procedure for the cell 1904-1. The wireless device may select a candidate RS 1918 among the one or more RSs for the BFR procedure. The wireless device may transmit an uplink signal (e.g., preamble, PUCCH signal, SR transmission) via an uplink channel (e.g., RACH resource, PUCCH resource) for the BFR procedure, for example, based on determining/selecting the candidate RS. The uplink signal and the uplink channel may be associated with the candidate RS 1918. The association between the uplink signal/the uplink channel and the candidate RS 1918 may be indicated/provided to the wireless device via the one or more configuration parameters (e.g., by a higher parameter BeamFailureRecoveryConfig). The base station may determine that the wireless device selected the candidate RS 1918 for the BFR procedure of the cell 1904-1, for example, based on one or more of: the base station receiving the uplink signal via the uplink channel, and/or the association between the uplink signal/the uplink channel and the candidate RS 1918.

The wireless device may monitor, for DCI, at least one PDCCH in the CORESET, for example, based on transmitting the uplink signal. The wireless device may complete the BFR procedure of the cell 1904-1 successfully, for example, based on receiving the DCI. The DCI may be addressed to an indicator/identifier of the wireless device (e.g., C-RNTI). The wireless device may determine/assume that one or more DM-RS ports of a reception of the at least one PDCCH in the CORESET may be quasi co-located (QCL-ed) with the candidate RS 1918. The one or more DM-RS ports of the reception of the at least one PDCCH in the CORESET may be quasi co-located (QCL-ed) with the candidate RS 1918 with a QCL type (e.g., QCL-TypeD).

The wireless device may detect a first PDCCH (e.g., PDCCH 1908-1) with first DCI in the CORESET (e.g., a BFR-CORESET) for the cell 1904-1. The wireless device may receive the first DCI in the CORESET, for example, if (e.g., when) the wireless device is monitoring the PDCCH 1908-1. The first DCI may schedule a first PDSCH transmission (e.g., PDSCH 1912-1). The wireless device may determine/determine/assume that at least one first DM-RS port of the PDSCH 1912-1 is quasi co-located with the candidate RS 1918. A time offset 1916-1 between an end of the PDCCH 1908-1 and a start of the PDSCH 1912-1 may be less than a threshold 1914.

The wireless device may receive the PDSCH 1912-1 based on a first QCL assumption. The wireless device may receive the PDSCH 1912-1 using a beam that is based on a first QCL assumption. The receiving the PDSCH 1912-1 based on the first QCL assumption may comprise that the at least one first DM-RS port of the PDSCH 1912-1 is quasi co-located with the candidate RS 1918 (e.g., with respect to a first QCL type such as QCL-TypeD).

The wireless device may detect a second PDCCH (e.g., PDCCH 1908-2) with second DCI for the cell 1904-2. The wireless device may receive the second DCI during monitoring of the PDCCH 1908-2. The second DCI may schedule the PDSCH 1912-2.

A second QCL assumption may indicate at least one second RS (e.g., Default RS-21920-1 and/or RS-2 1920-2). The second QCL assumption may indicate a second QCL type (e.g., QCL-TypeD). The wireless device may receive the PDSCH 1912-2 based on the second QCL assumption. The PDSCH 1912-2 may be associated with the second QCL assumption. The wireless device may determine/assume that at least one second DM-RS port of the second PDSCH 1912-2 is quasi co-located with the at least one second RS with respect to the second QCL type (e.g., QCL-TypeD), for example, based on the association between the PDSCH 1912-2 and the second QCL assumption.

The second DCI may comprise a TCI field indicating the at least one second RS (e.g., RS-2 1920-2). The wireless device may determine the at least one second RS (e.g. Default RS-2 1920-2) based on a default PDSCH RS selection. The wireless device may perform default PDSCH RS selection, for example, if time offset 1916-2 is less than the threshold 1914, or the second DCI is received on a second CORESET, where (i) the second CORESET is not configured with a TCI-PresentInDCI field, and/or (ii) the second DCI is a DCI format that does not comprise a TCI field (e.g., DCI format 1_0).

The wireless may determine that the PDSCH 1912-1 and the PDSCH 1912-2 overlap in a time duration (e.g., overlap 1922). The time duration may be at least one symbol (or any other quantity of symbols). The time duration may be at least one slot (or any other quantity of slots). The time duration may be at least one subframe (or any other quantity of subframes). The time duration may be at least one frame (or any other quantity of frames).

The first QCL assumption and the second QCL assumption may be the same or different (e.g., in the time duration). The first QCL assumption and the second QCL assumption being different may comprise that the wireless device may not receive the PDSCH 1912-1 and the PDSCH 1912-2 simultaneously (e.g., in the time duration) or substantially simultaneously. The first QCL assumption and the second QCL assumption being different may comprise the candidate RS 1918 and the at least one second RS are different. The first QCL assumption and the second QCL assumption being different may comprise the candidate RS 1918 and the at least one second RS are not QCL-ed.

The time offset 1916-1 between a reception of the first DCI and a first reception the PDSCH 1912-1 may be less than a threshold (e.g., timeDurationForQCL, Threshold-Sched-Offset). The second time offset 1916-2 between a reception of the second DCI and a second reception of the second PDSCH may be equal to or greater than the threshold. A first cell-specific index (e.g., corresponding to the cell 1904-1) may be greater than a second cell-specific index (e.g., corresponding to the cell 1904-2). The first cell-specific index may be less than the second cell-specific index.

The time offset 1916-1 between a reception of the first DCI and a first reception the PDSCH 1912-1 may be less than a threshold 1914 (e.g., timeDurationForQCL, Threshold-Sched-Offset). The time offset 1916-2 between a reception of the second DCI and a second reception of the PDSCH 1912-2 may be less than the threshold 1914. The first cell-specific index may be greater than the second cell-specific index.

The time offset 1916-1 between a reception of the first DCI and a first reception the first PDSCH may be equal to or greater than a threshold (e.g., timeDurationForQCL, Threshold-Sched-Offset). The time offset 1916-2 between a reception of the second DCI and a second reception of the second PDSCH may be equal to or greater than the threshold. The first cell 1904-1-specific index may be greater than the second cell-specific index.

The wireless device may not receive the PDSCH 1912-1 reliably and/or may receive the PDSCH 1912-1 with an error, for example, if the wireless device prioritizes the PDSCH 1912-2 (or the second QCL assumption). The PDSCH 1912-1 may comprise (re-)configuration parameters (e.g., for downlink control channels) for the first cell 1904-1 (e.g., after the BFR procedure is completed). Receiving the (re-)configuration parameters may be more important for a reliable and robust communication for the cell 1904-1. Various examples described herein enable prioritization of a PDSCH associated with a BFR procedure (e.g., PDSCH 1912-1).

The wireless device may prioritize the first QCL assumption (e.g., with the first QCL type) associated with the at least one first DM-RS port of the PDSCH 1912-1, for example, based on the PDSCH 1912-1 being scheduled by the first DCI received in the CORESET. The wireless device may prioritize the first QCL assumption, for example, based on the determining that the PDSCH 1912-1 and the PDSCH 1912-2 overlap in the time duration, and/or the first QCL assumption and the second QCL assumption are different. The wireless device may use the first QCL assumption, for example, to receive data in/via both PDSCH 1912-1 and PDSCH 1912-2. The wireless device may use a beam based on the first QCL assumption, for example, to receive data in/via both PDSCH 1912-1 and PDSCH 1912-2. The beam may be determined based on the first QCL assumption. Prioritizing the first QCL assumption may result in the wireless device reliably receiving the PDSCH 1912-1. The PDSCH 1912-1 may comprise, for example, (re-)configuration parameters based on a BFR procedure (e.g., for downlink control channels).

The prioritizing the first QCL assumption with the first QCL type may comprise that the at least one second DM-RS port of the PDSCH 1912-2 is quasi co-located with the candidate RS 1918 with respect to the first QCL type (e.g., indicated by the first QCL assumption) in the time duration. The wireless device may determine/assume that the at least one second DM-RS port of the PDSCH 1912-2 is quasi co-located with the candidate RS 1918 with respect to the first QCL type, for example, based on prioritizing the first QCL assumption with the first QCL type. The prioritizing the first QCL assumption with the first QCL type may comprise that the wireless device receives the PDSCH 1912-2 with the candidate RS 1918 with respect to the first QCL type (e.g., indicated by the first QCL assumption) in the time duration. The prioritizing the first QCL assumption (e.g., with the first QCL type) may comprise that the wireless device applies the candidate RS 1918 with respect to the first QCL type for the second reception of the PDSCH 1912-2 in the time duration. The prioritizing the first QCL assumption (e.g., with the first QCL type) may comprise that the first QCL assumption with the first QCL type overrides the second QCL assumption with the second QCL type in the time duration. The first QCL type and the second QCL type may be the same (e.g., QCL-TypeD).

The prioritizing the first QCL assumption with the first QCL type may comprise that the wireless device drops the second reception of the PDSCH 1912-2. The wireless device may drop the second reception of the PDSCH 1912-2 at least during the time duration. The dropping the second reception may comprise that the wireless device stops the second reception of the PDSCH 1912-2.

The prioritizing the first QCL assumption with the first QCL type (e.g., associated with the at least one first DM-RS port of the PDSCH 1912-1 in the time duration) may comprise that the wireless device may receive the PDSCH 1912-2 with the at least one second RS (e.g., default RS-2 1920-1 and/or RS-2 1920-2) outside of the time duration (e.g., in portions of the PDSCH 1912-2 that do not overlap with PDSCH 1912-1). The at least one second DM-RS port of the PDSCH 1912-2 being quasi co-located with the candidate RS 1918 in the time duration may comprise that the at least one second DM-RS port of the PDSCH 1912-2 is quasi co-located with the at least one second RS (e.g., default RS-2 1920-1 and/or RS-2 1920-2) with respect to the second QCL type outside of the time duration (in portions of the PDSCH 1912-2 that do not overlap with PDSCH 1912-1).

The BFR procedure for the cell 1904-1 may have a higher priority. The PDSCH 1912-1 may have a higher priority if the PDSCH 1912-1 for the cell 1904-1, scheduled in the CORESET, overlaps with the PDSCH 1912-2 for the cell 1904-2, for example, based on the BFR procedure for the cell 1904-1 having a higher priority.

A first device (e.g., a base station) may send (e.g., transmit) data to a second device (e.g., a wireless device) in multiple slots (e.g., consecutive slots), mini-slots, intervals (e.g., transmission time intervals), frames, subframes, and/or any other time duration. This configuration may improve communication reliability and improve coverage (e.g., at edges of a cell), for example, by enabling transmission redundancy. A base station may send/transmit, for example, high reliability data that may be repeated over multiple time durations (e.g., slots, mini-slots, intervals (e.g., transmission time intervals), frames, subframes, and/or any other time duration). High reliability data sent (e.g., transmitted) over multiple time durations (e.g., slots, mini-slots, intervals (e.g., transmission time intervals), frames, subframes, and/or any other time duration) may use a first channel (e.g. a first PDSCH) that may overlap with a second channel (e.g., a second PDSCH) in at least some time durations (e.g., slots, mini-slots, intervals (e.g., transmission time intervals), frames, subframes, and/or any other time duration. The second channel may be used for transmission of regular data (e.g., non-high reliability data). The wireless device may use a first beam for receiving first data via the first channel in at least a first quantity of slots or any other time duration. The wireless device may use a second beam for receiving second data via the second channel. The wireless device may switch beams (e.g., based on downlink beam management procedures described in FIGS. 18A-18C) and/or use the second beam for receiving the first data in at least a second quantity of slots and/or any other time duration. Switching beams for receiving the first data may result in increased probability of errors during data reception.

Various examples herein describe prioritizing the first beam (e.g., a QCL assumption) associated with the first channel in downlink beam management procedures. Prioritizing the first beam may comprise using the first beam to receive first data in all slots associated with the first data. Using the same beam may avoid switching of beams between slots and/or may enable successful reception of high reliability data. The wireless device may use the first beam to receive the second data.

Figure 20:
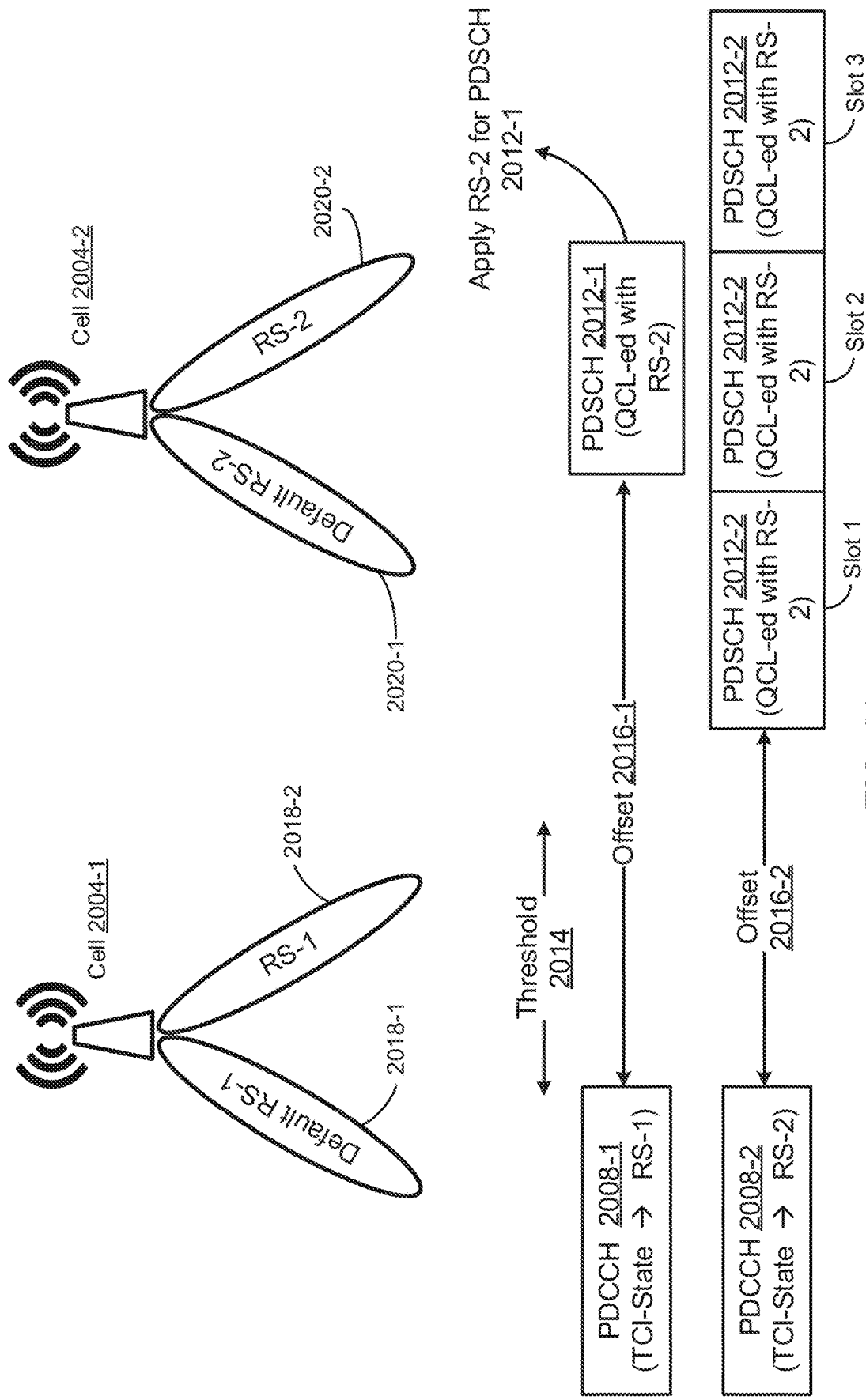
FIG. 20 shows an example downlink beam management procedure for high-reliability data transmission.

FIG. 20 shows an example downlink beam management procedure. A wireless device may receive, from a base station, one or more messages. The one or more messages may comprise one or more configuration parameters of a plurality of cells. The plurality of cells may comprise a first cell (e.g., Cell 2004-1) and a second cell (e.g., Cell 2004-2).

The one or more configuration parameters may indicate cell-specific indices (e.g., provided by a higher layer parameter, servCellIndex) for the plurality of cells. Each cell of the plurality of cells may be indicated/identified by a respective one cell-specific index of the cell-specific indices. The cell 2004-1 may be indicated/identified by a first cell-specific index. The cell 2004-2 may be indicated/identified by a second cell-specific index.

The wireless device may detect a first PDCCH (e.g., PDCCH 2008-1), with first DCI, for the cell 2004-1. The wireless device may receive the first DCI when monitoring the PDCCH 2008-1. The first DCI may schedule a PDSCH 2012-1. A first time duration of the PDSCH 2012-1 may comprise a first time slot. The first time slot may be a single time slot (e.g., in single-slot scheduling). A time offset 2016-1 between an end of the PDCCH 2008-1 and a start of the PDSCH 2012-1 may be greater than a threshold 2014.

A first QCL assumption (e.g., a TCI state) may indicate at least one first RS (e.g., SS/PBCH block, CSI-RS). The first QCL assumption may indicate a first QCL type (e.g., QCL-TypeD). The PDSCH 2012-1 may be associated with the first QCL assumption. The wireless device may determine (e.g., assume) that at least one first DM-RS port of the PDSCH 2012-1 is quasi co-located with at least one first RS (e.g., Default RS-1 2018-1 or RS-1 2018-2) with respect to the first QCL type. The wireless device may receive the PDSCH 2012-1 based on the first QCL assumption.

The first DCI may comprise a TCI field indicating the at least one first RS (e.g., Default RS-1 2018-1 or RS-1 2018-2). The wireless device may determine the at least one first RS based on a default PDSCH RS selection. The wireless device may perform the default PDSCH RS selection, for example, if the time offset 2016-1 is less than a threshold 2014, or the first DCI scheduling the PDSCH 2012-1 is received on a first CORESET, where (i) the first CORESET is not configured with a TCI-PresentInDCI field, or (ii) the first DCI is a DCI format that does not comprise a TCI field (e.g., DCI format 1_0).

The wireless device may detect a second PDCCH (e.g., PDCCH 2008-2), with second DCI, for the cell 2004-2. The wireless device may receive the second DCI, for example, if monitoring the PDCCH 2008-2 for the cell 2004-2. The second DCI may schedule a PDSCH 2012-2 for the cell 2004-2. A second time duration of the PDSCH 2012-2 may comprise one or more second time slots or any other time duration. FIG. 20 shows an example in which the PDSCH 2012-2 may comprise three time slots (e.g., slot 1, slot 2, slot 3) or any other time duration. The PDSCH 2012-2 may comprise any other quantity of time slots or any other time duration.

A second QCL assumption (e.g., a TCI state) may indicate at least one second RS (e.g., SS/PBCH block, CSI-RS). The second QCL assumption may indicate a second QCL type (e.g., QCL-TypeD). The PDSCH 2012-2 may be associated with the second QCL assumption. The wireless device may determine (e.g., assume) that at least one second DM-RS port of the PDSCH 2012-2 is quasi co-located with at least one second RS (e.g., Default RS-2 2020-1 or RS-2 2020-2) with respect to the second QCL type. The wireless device may receive the PDSCH 2012-2 based on the second QCL assumption.

The second DCI may comprise a TCI field indicating the at least one second RS (e.g., RS-2 2020-2). The wireless device may determine the at least one second RS (e.g. Default RS-22020-1) based on a default PDSCH RS selection. The wireless device may perform the default PDSCH RS selection if the offset 2016-2 is less than the threshold, and/or if the second DCI scheduling the PDSCH 2012-2 is received on a second CORESET, in which: (i) the second CORESET is not configured with a TCI-PresentInDCI field, and/or (ii) the second DCI is in a DCI format that does not comprise a TCI field (e.g., DCI format 1_0).

A first time offset (e.g., the offset 2016-1) between a reception of the first DCI and a first reception of the PDSCH 2012-1 may be equal to or greater than a threshold (e.g., timeDurationForQCL, Threshold-Sched-Offset). A second time offset (e.g., the offset 2016-2) between a reception of the second DCI and a second reception of the PDSCH 2012-2 may be equal to or greater than the threshold. The first cell-specific index may be lower than the second cell-specific index.

A first time offset (e.g., the offset 2016-1) between a reception of the first DCI and a first reception of the PDSCH 2012-1 may be less than a threshold (e.g., timeDuration-ForQCL, Threshold-Sched-Offset). A second time offset (e.g., the offset 2016-2) between a reception of the second DCI and a second reception of the PDSCH 2012-2 may be lower than the threshold. The first cell-specific index may be less than the second cell-specific index.

A first time offset (e.g., the offset 2016-1) between a reception of the first DCI and a first reception of the PDSCH 2012-1 may be equal to or higher than a threshold (e.g., timeDurationForQCL, Threshold-Sched-Offset). A second time offset (e.g., the offset 2016-2) between a reception of the second DCI and a second reception of the PDSCH 2012-2 may be less than the threshold.

The wireless device may determine that the PDSCH 2012-1 and the PDSCH 2012-2 overlap in a time duration. The time duration may be at least one symbol (or any other quantity of symbols). The time duration may be at least one slot (or any other quantity of slots). The time duration may be at least one subframe (or any other quantity of subframes). The time duration may be at least one frame (or any other quantity of frames).

The first QCL assumption and the second QCL assumption may be the same or different (e.g., in the time duration). The first QCL assumption and the second QCL assumption being different may comprise that the wireless device may not receive the PDSCH 2012-1 and the PDSCH 2012-2 simultaneously (or substantially simultaneously) in the time duration. The first QCL assumption and the second QCL assumption being different may comprise the at least one first RS and the at least one second RS are different. The first QCL assumption and the second QCL assumption being different may comprise the at least one first RS and the at least one second RS are not QCL-ed.

Some downlink beam management procedures may result in different slots of a PDSCH having different QCL assumptions. With reference to FIG. 20, for example, the wireless device may (e.g., based on procedures described with reference FIG. 18A) use the second QCL assumption to receive data in slot 1 of PDSCH 2012-2, use the first QCL assumption to receive data in slot 2 of PDSCH 2012-2, and/or use the second QCL assumption to receive data in slot 3 of PDSCH 2012-2. The wireless device may need to change QCL slots to receive data in consecutive PDSCH slots. This may result in lower signal quality.

Applying a same beam (e.g., a same RS, QCL assumption, etc.) to each slot of a multi-slot channel (e.g., PDSCH) may enhance coverage and/or increase signal reliability and robustness. Applying a same beam may prevent different slots of a PDSCH being associated with different QCL assumptions. Various examples described herein enable a higher priority to a multi-slot channel (e.g., PDSCH 2012-2). The PDSCH 2012-2 scheduled with multi-slot scheduling may have a higher priority, for example, if the PDSCH 2012-2 overlaps with a PDSCH 2012-1 (e.g., scheduled with single-slot scheduling).

The wireless device may prioritize a QCL assumption associated with a PDSCH that may comprise more than one slot. The wireless device may prioritize PDCCH 2012-2, for example, based on determining that (i) the PDSCH 2012-1 and the PDSCH 2012-2 overlap in time, (ii) the first QCL assumption the second QCL assumption are different, and/or (iii) the PDSCH 2012-2 comprises more than one slot. The wireless device may prioritize the second QCL assumption (e.g., with the second QCL type) associated with the at least one second DM-RS port of the PDSCH 2012-2 (e.g., on the second cell), for example, if the second time duration of the PDSCH 2012-2 comprises at least two time slots. The wireless device may use the second QCL assumption, for example, to receive data in/via both PDSCH 2012-1 and PDSCH 2012-2 (e.g., slots 1, 2, and 3 of PDSCH 2012-2). The wireless device may use a beam based on the second QCL assumption, for example, to receive data in/via both PDSCH 2012-1 and PDSCH 2012-2 (e.g., slots 1, 2, and 3 of PDSCH 2012-2). The beam may be determined based on the first QCL assumption. Prioritizing the second QCL assumption may result in the wireless device not switching beams between different slots of the PDSCH 2012-2 and/or may result in higher data reliability. The wireless device may prioritize the second QCL assumption (e.g., with the second QCL type) associated with the at least one second DM-RS port of the PDSCH 2012-2 (e.g., on the second cell), for example, if the second time duration of the PDSCH 2012-2 comprises at least two time slots and the first time duration of the PDSCH 2012-1 comprises a single time slot.

Prioritizing the second QCL assumption (e.g., with the second QCL type) may comprise that the at least one first DM-RS port of the PDSCH 2012-1 is quasi co-located with the at least one second RS with respect to the second QCL type (e.g., indicated by the second QCL assumption) in the time duration. The wireless device may determine/assume that the at least one first DM-RS port of the PDSCH 2012-1 is quasi co-located with the at least one second RS with respect to the second QCL type (e.g., indicated by the second QCL assumption) in the time duration, for example, based on prioritizing the second QCL assumption. The prioritizing the second QCL assumption with the second QCL type may comprise that the wireless device receives the PDSCH 2012-1 with the at least one second RS with respect to the second QCL type (e.g., indicated by the second QCL assumption) in the time duration. The prioritizing the second QCL assumption with the second QCL type may comprise that the wireless device applies the at least one second RS with respect to the second QCL type (e.g., indicated by the second QCL assumption) for the first reception of the PDSCH 2012-1 in the time duration. The prioritizing the second QCL assumption with the second QCL type may comprise that the second QCL assumption with the second QCL type (e.g., QCL-TypeD) overrides the first QCL assumption with the first QCL type (e.g., QCL-TypeD) in the time duration.

FIG. 21 shows an example information element (IE) for a downlink beam management procedure. The example information element may be a TCI state IE.

A base station may configure a wireless device with one or more TCI state configurations (e.g., TCI-States), for example, using a higher layer configuration parameter (e.g., PDSCH-Config) for a serving cell (e.g., PCell, SCell). The wireless device may detect a scheduled PDCCH transmission based on receiving DCI for the serving cell. The wireless device may use the one or more TCI state configurations to decode a PDSCH transmission scheduled by the PDCCH. The DCI may be intended for the wireless device and/or the serving cell of the wireless device.

A TCI state configuration may comprise one or more parameters (e.g., qcl-Type1, qcl-Type2, referenceSignal, etc.). The TCI state configuration may be indicated/identified by a TCI state index (e.g., tci-StateId in FIG. 21). The wireless device may use the one or more parameters in the TCI state configuration to configure one or more quasi co-location relationships between at least one downlink reference signal, DL RS (e.g., SS/PBCH block, CSI-RS, etc.) and DM-RS ports of the PDSCH. A first quasi co-location relationship of the one or more quasi co-location relationships may be configured by a higher layer parameter (e.g., qcl-Type1) for a first DL RS of the at least one downlink reference signal. A second quasi co-location relationship of the one or more quasi co-location relationships may be configured by a higher layer parameter qcl-Type2 for, if configured, a second DL RS (e.g., indicated by the referenceSignal in FIG. 21) of the at least one downlink reference signal. The first quasi co-location relationship and the second quasi co-location relationship may be indicated by a reference signal parameter (e.g., referenceSignal).

At least one quasi co-location type of the at least one downlink reference signal (e.g., the first DL RS, the second DL RS) may be indicated/provided to the wireless device by a higher layer parameter (e.g., qcl-Type in QCL-Info). The first QCL type (e.g., QCL-TypeA, QCL-TypeB) of a first DL RS of the at least two downlink reference signals and the second QCL type (e.g., QCL-TypeC, QCL-TypeD) of a second DL RS of the at least two downlink reference signals may be the same, or may not be the same, for example, if at least two quasi co-location relationships, comprising a first QCL type and a second QCL type, between at least two downlink reference signals and DM-RS ports of a PDSCH are configured. The first DL RS and the second DL RS may be the same. The first DL RS and the second DL RS may be different.

FIG. 22 shows an example information element (IE) for a downlink beam management procedure. The example information element may be a TCI state IE. The TCI state IE in FIG. 22 may be similar to the TCI state IE in FIG. 21, for example, except the TCI state IE in FIG. 22 may configure TCI state configurations for multiple TRPs. The wireless device may use the one or more TCI state configurations to decode a PDSCH transmission, scheduled by the PDCCH, that may comprise data streams/layers from multiple TRPs.

Figure 23:
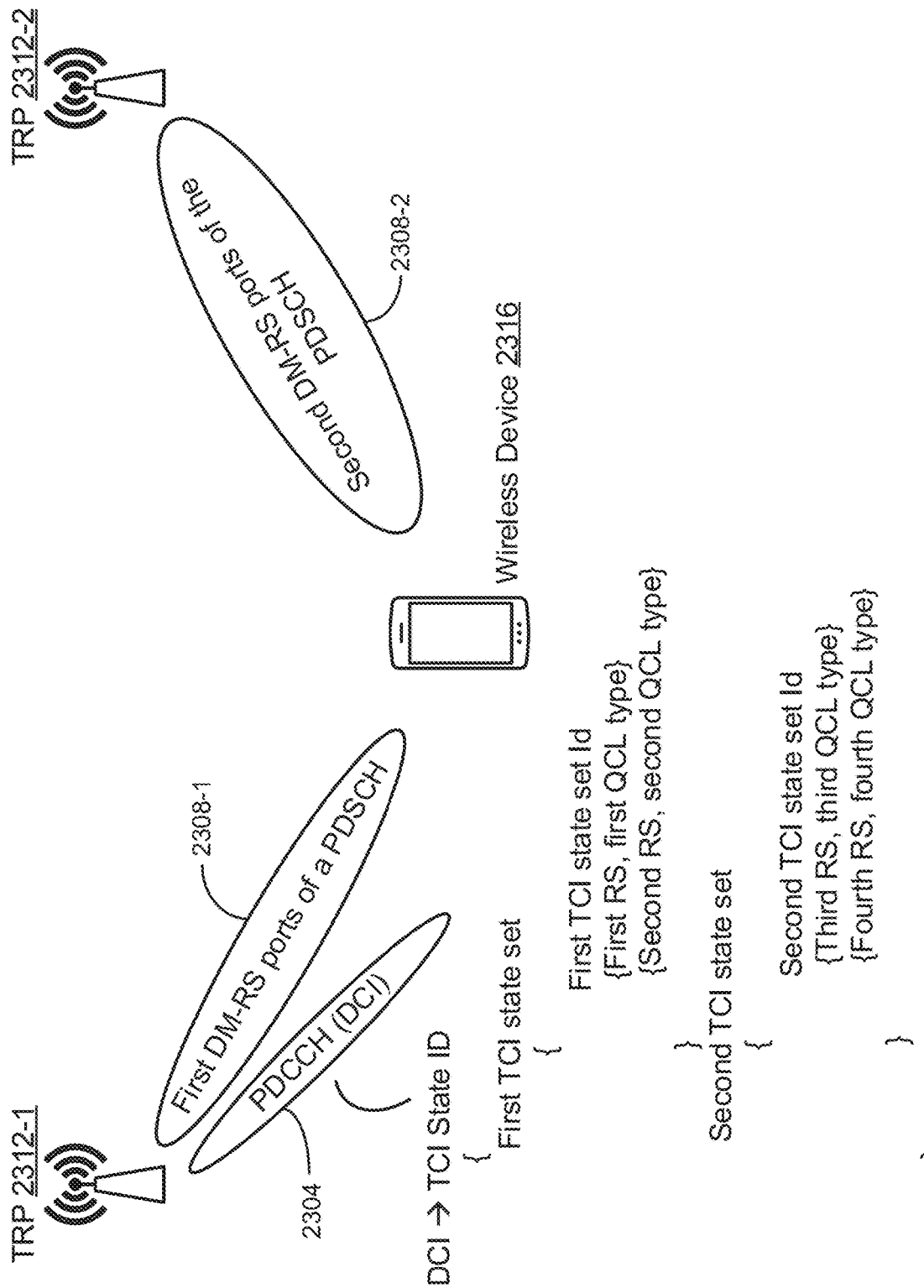
FIG. 23 shows an example downlink beam management procedure.

FIG. 23 shows an example downlink beam management procedure. A base station may configure a wireless device 2316 with one or more TCI state configurations for a serving cell (e.g., PCell, SCell). The one or more TCI state configurations may be configured using a higher layer configuration parameter (e.g., PDSCH-Config). The wireless device 2316 may detect a PDCCH 2304 (e.g., sent by a TRP 2312-1) with a DCI. The DCI may schedule a PDSCH transmission. The wireless device 2316 may use the one or more TCI states configurations to decode the PDSCH. The DCI may be intended for (e.g., addressed to) the wireless device 2316. The DCI may be intended for the serving cell of the wireless device 2316.

A TCI state of the one or more TCI state configurations may be indicated/identified by a TCI state index (e.g., tci-StateId in FIG. 22, tci-StateId in FIG. 23). The DCI (or a TCI field in the DCI) may indicate the TCI state index. The TCI state of the one or more TCI state configurations may comprise one or more TCI state sets (e.g., TCI-StateSets in FIG. 22, first TCI state set and second TCI state set in FIG. 23).

A quantity/number of the one or more TCI state sets (e.g., maxNrofTRPs in FIG. 22) may depend on a capability of the wireless device 2316. The wireless device 2316 may be equipped with multiple transmitting antenna panels and/or receiving antenna panels. The quantity/number of the one or more TCI state sets may be equal to a quantity/number of the multiple transmitting antenna panels and/or receiving antenna panels. The wireless device 2316 may receive (or simultaneously receive), for example, at least two channels/signals (e.g., PDSCH, PDCCH, CSI-RS, SS/PBCH block, etc.) with different QCL assumptions. The wireless device 2316 may be served by multiple TRPs (e.g., TRP 2312-1, TRP 2312-2). The quantity/number of the one or more TCI state sets may be equal to a quantity/number of the multiple TRPs (e.g., two in FIG. 23).

A first TCI state set (e.g., first TCI state set in FIG. 23) of the one or more TCI state sets may be indicated/identified by a first TCI set index (e.g., indicated/provided by TCI-StateSetId in FIG. 22, first TCI state set Id in FIG. 23). The first TCI state set may comprise one or more first parameters (e.g., qcl-Type1, qcl-Type2, referenceSignal, etc.). The wireless device 2316 may use the one or more first parameters in the first TCI state set to configure one or more first quasi co-location relationships between at least one first DL RS and at least one first DM-RS port of the PDSCH (e.g., first DM-RS ports of a PDSCH 2308-1) scheduled by the DCI. A first quasi co-location relationship of the one or more first quasi co-location relationships may be configured for a first DL RS (e.g., first RS in FIG. 23) of the at least one first DL RS (e.g., by a higher layer parameter, such as qcl-Type1 in FIG. 22). The first DL RS may have a first QCL type (e.g., QCL-TypeA, QCL-TypeB, etc., indicated/provided by a higher layer parameter qcl-Type in QCL-Info in FIG. 22). A second quasi co-location relationship of the one or more first quasi co-location relationships may be configured for (e.g., if configured) a second DL RS (e.g., second RS in FIG. 23) of the at least one first DL RS (e.g., by a higher layer parameter qcl-Type2). The second DL RS may have a second QCL type (e.g., QCL-TypeC, QCL-TypeD, etc., indicated/provided by a higher layer parameter, such as qcl-Type in QCL-Info in FIG. 22).

The base station may configure a CORESET with a higher layer parameter (e.g., TCI-PresentInDCI) for the serving cell. The wireless device 2316 may receive the DCI (e.g., with a DCI format 1_1) in the CORESET. A time offset between a first reception of the DCI received in the CORESET and a second reception of the PDSCH may be equal to or greater than a threshold (e.g., timeDurationForQCL, Threshold-Sched-Offset). The wireless device 2316 may determine/assume that the at least one first DM-RS port of the PDSCH is quasi co-located with the first DL RS with respect to the first QCL type, for example, if the time offset is equal to or greater than the threshold. The wireless device 2316 may determine/assume that the at least one first DM-RS port of the PDSCH is quasi co-located with the second DL RS with respect to the second QCL type, for example, if the time offset is equal to or greater than the threshold.

A second TCI state set (e.g., second TCI state set in FIG. 23) of the one or more TCI state sets may be indicated/identified by a second TCI set index (e.g., indicated/provided by TCI-StateSetId in FIG. 22, second TCI state set Id in FIG. 23). The second TCI state set may comprise one or more second parameters (e.g., qcl-Type1, qcl-Type2, referenceSignal, etc.). The wireless device 2316 may use the one or more second parameters in the second TCI state set to configure one or more second quasi co-location relationships between at least one second DL RS and at least one second DM-RS port of the PDSCH (e.g., second DM-RS ports of the PDSCH 2308-2) scheduled by the DCI. A third quasi co-location relationship of the one or more second quasi co-location relationships may be configured for a third DL RS (e.g., third RS in FIG. 23) of the at least one second DL RS (e.g., by a higher layer parameter, such as qcl-Type1). The third DL RS may have a third QCL type (e.g., QCL-TypeA, QCL-TypeB, etc., indicated/provided by a higher layer parameter qcl-Type in QCL-Info in FIG. 22). A fourth quasi co-location relationship of the one or more second quasi co-location relationships may be configured for, if configured, a fourth DL RS (e.g., fourth RS in FIG. 23) of the at least one second DL RS (e.g., by a higher layer parameter such as qcl-Type2). The fourth DL RS may have a fourth QCL type (e.g., QCL-TypeA, QCL-TypeB, etc., indicated/provided by a higher layer parameter qcl-Type in QCL-Info in FIG. 22).

The base station may configure the CORESET with a higher layer parameter (e.g., TCI-PresentInDCI) for the serving cell. The wireless device 2316 may receive the DCI (e.g., with a DCI format 1_1) in the CORESET. The time offset between a first reception of the DCI received in the CORESET and a second reception of the PDSCH may be equal to or greater than a threshold (e.g., timeDuration-ForQCL, Threshold-Sched-Offset). The wireless device 2316 may determine/assume that the at least one second DM-RS port of the PDSCH is quasi co-located with the third DL RS with respect to the third QCL type, for example, if the time offset is equal to or greater than the threshold. The wireless device 2316 may determine/assume that the at least one first DM-RS port of the PDSCH is quasi co-located with the fourth DL RS with respect to the fourth QCL type, for example, if the time offset is equal to or greater than the threshold.

One or more TRPs may serve the wireless device 2316. The wireless device 2316 may receive the DCI from, for example, a first TRP (e.g., the TRP 2312-1) of the one or more TRPs. The wireless device 2316 may receive the at least one first DM-RS port of the PDSCH from the first TRP. The wireless device 2316 may receive the at least one second DM-RS port of the PDSCH from a second TRP (e.g., the TRP 2312-2) of the one or more TRPs.

The wireless device 2316 may receive, from the base station, one or more configuration parameters. The one or more configuration parameters may indicate TRP-specific indices (e.g., indicated/provided by a higher layer parameter) for the one or more TRPs. Each TRP of the one or more TRPs may be indicated/identified by a respective one TRP-specific index of the TRP-specific indices. The first TRP (e.g., the TRP 2312-1) may be indicated/identified by a first TRP-specific index. The second TRP (e.g., TRP 2312-2) may be indicated/identified by a second TRP-specific index.

The PDSCH may comprise one or more DM-RS groups. The one or more DM-RS groups may comprise a first DM-RS group and a second DM-RS group. The first DM-RS group may comprise the at least one first DM-RS port of the PDSCH (e.g., first DM-RS ports 2308-1). The second DM-RS group may comprise the at least one second DM-RS port of the PDSCH (e.g., second DM-RS ports 2308-2).

The one or more configuration parameters may indicate DM-RS group-specific indices (e.g., indicated/provided by a higher layer parameter) for the one or more DM-RS groups. Each DM-RS group of the one or more DM-RS groups may be indicated/identified by a respective one DM-RS-group-specific index of the DM-RS-group-specific indices. The first DM-RS group may be indicated/identified by a first DM-RS-group-specific index. The second DM-RS group may be indicated/identified by a second DM-RS-group-specific index.

Various communication protocols may facilitate use of a default beam to receive data (e.g., downlink data, such as data via a PDSCH). A wireless device may receive (e.g., from a TRP) control information (e.g., DCI) scheduling a downlink transmission. The wireless device may apply a default beam, for example, if the control information does not comprise configuration information (e.g., TCI state indication), if a time interval between reception of control information and a reception of the downlink data is less than a threshold, and/or if the control information is transmitted using/via a wireless resource (e.g., CORESET) that is not configured to indicate the configuration information. The default beam may be a beam, for example, that was used to receive the control information.

A first TRP may transmit control information scheduling a downlink transmission, and downlink data may be transmitted by both the first TRP and a second TRP. A first data stream and a second data stream of the downlink data may be transmitted, for example, by the first TRP (e.g., using/via a first beam); and/or the third data stream and the fourth data stream of the PDSCH may be transmitted by the second TRP (e.g., using/via a second beam). The wireless device may not be able to receive entirety of the downlink data, for example, if the wireless device applies a single default beam (e.g., a beam steered in the direction of the first beam, a beam that was used to receive the control information). The wireless device may be unable to properly decode, for example, the third data stream and the fourth data stream transmitted by the second TRP. This may result in decoding errors, reduced data rate, increased retransmissions, and/or other issues.

As described herein, a communication protocol may designate at least two default beams for reception of downlink data (e.g., PDSCH data) transmitted by at least two TRPs. A first default beam may be selected based on received control information from a first TRP. The first default beam may be a beam used to receive the control information. The first default beam may be used to receive a first portion of the downlink data from the first TRP (e.g., the first data stream and the second data stream). A second default beam may be selected based on beam(s) used in a previous slot for downlink data reception and/or based on control information transmitted in previous time slots. The wireless device may use, for example, a beam used for a prior reception of downlink data (e.g., in a previous slot) from the second TRP. The second default beam may be used to receive a second portion of the downlink data from the second TRP (e.g., the third data stream and the fourth data stream).

Figure 24:
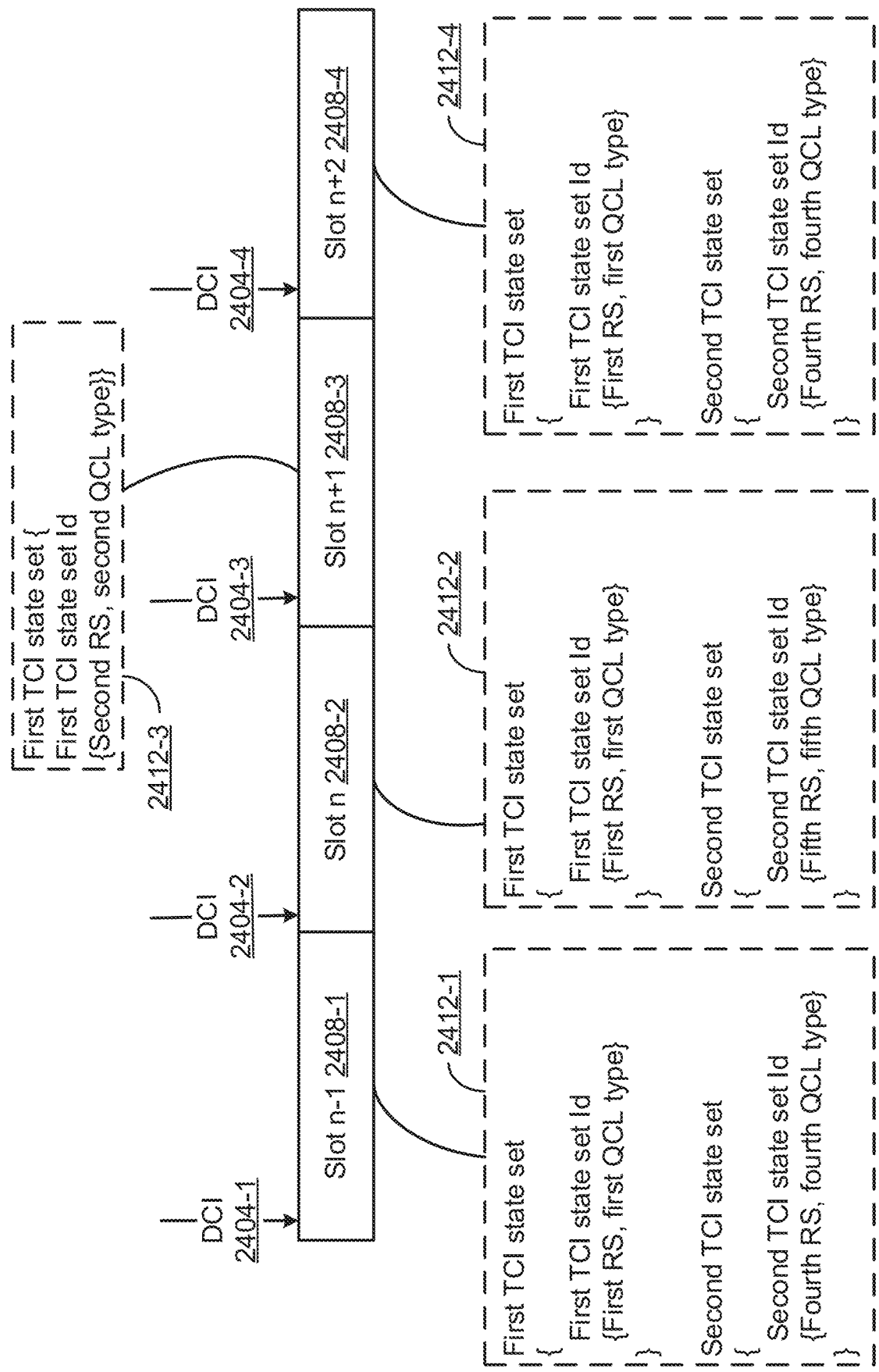
FIG. 24 shows an example downlink beam management procedure for selection of multiple beams.

FIG. 24 shows an example downlink beam management procedure. The downlink beam management procedure of FIG. 24 is described with reference to the TRP 2312-1, the TRP 2312-2, and the wireless device 2316 described above (regarding FIG. 23). The downlink beam management procedure of FIG. 24 may be used for other network configurations. The downlink beam management procedure may comprise time slot n−1 2402-1, time slot n 2408-3, time slot n+1 2408-3, and/or time slot n+2 2408-4. A base station may send (e.g., transmit) DCI 2404 in the time slots 2408. DCI 2404-1 may be sent (e.g., transmitted) in time slot 2408-1, DCI 2404-2 may be sent (e.g., transmitted) in time slot 2408-2, DCI 2404-3 may be sent (e.g., transmitted) in time slot 2408-3, and DCI 2404-4 may be sent (e.g., transmitted) in time slot 2408-4. A base station may not configure a CORESET with a higher layer parameter (e.g., TCI-PresentInDCI) for a serving cell (e.g., PCell, SCell). The wireless device 2316 may receive DCI (e.g., with DCI format 1_1, or with DCI format 1_0) in the CORESET. The DCI may schedule a PDSCH for the serving cell. The DCI may be DCI-4 received in Slot n+2.

The PDSCH may comprise at least two DM-RS ports comprising at least one first DM-RS port and at least one second DM-RS port. The at least one first DM-RS port and the at least one second DM-RS port may be sent (e.g., transmitted) by a first TRP (e.g., TRP 2312-1) indicated/ identified by a first TRP-specific index and/or a second TRP (e.g., TRP 2312-2) indicated/identified by a second TRP-specific index, respectively.

The PDSCH may comprise at least two DM-RS groups comprising a first DM-RS group and a second DM-RS group. The first DM-RS group may comprise at least one first DM-RS port of the PDSCH. The second DM-RS group may comprise at least one second DM-RS port of the PDSCH. The first DM-RS group may be indicated/identified by a first DM-RS-group-specific index. The second DM-RS group may be indicated/identified by a second DM-RS-group-specific index.

The base station may configure the CORESET with a second TCI state for the serving cell (e.g., using a first higher layer parameter such as tci-StatesPDCCH-ToAddList, a second higher layer parameter such as tci-StatesPDCCH-ToReleaseList, wireless device-specific PDCCH MAC CE). The wireless device 2316 may monitor, for DCI, at least one PDCCH in the CORESET based on the second TCI state. The wireless device 2316 may detect the at least one PDCCH, in the CORESET, with the DCI based on the second TCI state. The second TCI state may comprise one or more third parameters (e.g., qcl-Type1, qcl-Type2, referenceSignal, etc.). The second TCI state may indicate at least one third DL RS. The second TCI state may indicate at least one third QCL type. The wireless device 2316 may use the one or more third parameters to configure one or more third quasi co-location relationships between the at least one third DL RS and at least one third DM-RS port of the at least one PDCCH. The monitoring the at least one PDCCH based on the second TCI state may comprise that the at least one third DM-RS port of the PDCCH being quasi co-located with the at least one third DL RS with respect to the at least one third QCL type indicated by the second TCI state.

The base station may or may not configure/provide the wireless device 2316 with a second TCI state for the CORESET (e.g., CORESET zero). The wireless device 2316 may apply a second QCL assumption for the CORESET, for example, based on or in response to not being configured with the second TCI state. The wireless device 2316 may monitor, for DCI, at least one PDCCH in the CORESET based on the second QCL assumption. The wireless device 2316 may detect the at least one PDCCH, in the CORESET, with the DCI based on the second QCL assumption. The monitoring the at least one PDCCH in the CORESET based on the second QCL assumption may comprise that at least one third DM-RS port of the at least one PDCCH in the CORESET is quasi co-located with at least one third DL RS (e.g., SS/PBCH block). The wireless device may indicate/ identify the at least one third DL RS for an RA procedure (e.g., initial-access RA procedure, contention-based RA procedure).

The DCI (e.g., DCI 2404-4) received in the CORESET (e.g., at time slot n+2 2408-4) may indicate a TCI state index of a TCI state of TCI state configurations 2412-4. The TCI state may comprise at least two TCI state sets (e.g., first TCI state set and second TCI state set). The first TCI state set may be indicated/identified by a first TCI set index (e.g., indicated/provided by TCI-StateSetId in FIG. 22, first TCI state set Id in FIG. 23). The second TCI state set may be indicated/identified by a second TCI set index (e.g., provided by TCI-StateSetId in FIG. 22, second TCI state set Id in FIG. 23).

A time offset between a first reception of the DCI 2404-4 received in the CORESET and a second reception of the PDSCH may be equal to or greater than a threshold (e.g., timeDurationForQCL, Threshold-Sched-Offset). The threshold may be based on a reported capability of the wireless device 2316. The wireless device 2316 may determine antenna port quasi co-location of the PDSCH. The wireless device 2316 may determine that the first TCI state set for the PDSCH is identical to the second TCI state applied for a CORESET based on one or more criteria). The wireless device 2316 may determine that the first TCI state set for the PDSCH is identical to a second TCI state applied for a CORESET, for example, if the base station has not configured the CORESET with a higher layer parameter (e.g., TCI-PresentInDCI) and/or a time offset is equal to or greater than the threshold. The wireless device 2316 may determine that the first TCI state set for the PDSCH is identical to a second TCI state applied for a CORESET, for example, if the DCI 2404-4 does not comprise TCI state configurations and/or a time offset is equal to or greater than the threshold. The wireless device 2316 may determine that the first TCI state set for the PDSCH is identical or substantially similar to a second TCI state applied for a CORESET, for example, if a time offset is less than the threshold. The first TCI state set being identical to the second TCI state may comprise that the wireless device 2316 may use the one or more third parameters in the second TCI state of the CORESET to configure one or more first quasi co-location relationships for the at least one first DM-RS port of the PDSCH (e.g., first DM-RS ports of the PDSCH 2308-1). The using the one or more third parameters may comprise that the at least one first DM-RS port of the PDSCH 2308-1 being quasi co-located with the at least one third downlink RS with respect to the at least one third QCL type indicated/ configured by the second TCI state. The wireless device may determine/assume that the at least one first DM-RS port of the PDSCH 2308-1 is quasi co-located with the at least one third downlink RS with respect to the at least one third QCL type indicated/configured by the second TCI state, for example, based on using the one or more third parameters. The one or more criteria may comprise the first TCI set index of the first TCI state set being less/greater than the second TCI set index of the second TCI state set. The one or more criteria may comprise the first TRP-specific index of the TRP 2312-1 (e.g., transmitting the at least one first DM-RS port) being less/greater than the second TRP-specific index of the TRP 2312-2 (e.g., transmitting the at least one second DM-RS port). The one or more criteria may comprise the first DM-RS-group-specific index of the first DM-RS group (e.g., comprising the at least one first DM-RS port) being less/greater than the second DM-RS-group-specific index of the second DM-RS group (e.g., comprising the at least one second DM-RS port). The one or more criteria may comprise determining a TRP among the one or more TRPs (e.g., TRP, second TRP) transmitting the PDCCH transmission.

The wireless device 2316 may determine an antenna port quasi co-location of the PDSCH. The wireless device 2316 may determine, that the first TCI state set for the PDSCH is identical to the second QCL assumption applied for the CORESET, for example, based on one or more criteria. The wireless device 2316 may determine that the first TCI state set for the PDSCH is identical to the second QCL assumption applied for the CORESET, for example, based on the base station not configuring the CORESET with a higher layer parameter (e.g., TCI-PresentInDCI) and/or based on a time offset being equal to or greater than the threshold. The wireless device 2316 may determine that the first TCI state set for the PDSCH is identical to a second QCL assumption applied for the CORESET, for example, if the DCI 2404-4 does not comprise a TCI state indication and/or a time offset is equal to or greater than the threshold. The wireless device 2316 may determine that the first TCI state set for the PDSCH is identical to a second QCL assumption applied for the CORESET, for example, if a time offset is less than the threshold. The first TCI state set being identical to the second QCL assumption may comprise that the wireless device 2316 may apply the second QCL assumption of the CORESET to configure one or more first quasi co-location relationships for the at least one first DM-RS port of the PDSCH (e.g., first DM-RS ports of the PDSCH 2308-1). The applying the second QCL assumption may comprise that the at least one first DM-RS port of the PDSCH is quasi co-located with the at least one third DL RS used for the second QCL assumption. The wireless device 2316 may determine/assume that the at least one first DM-RS port of the PDSCH is quasi co-located with the at least one third DL RS used for the second QCL assumption, for example, based on applying the second QCL assumption. The one or more criteria may comprise the first TCI set index of the first TCI state set being less/greater than the second TCI set index of the second TCI state set. The one or more criteria may comprise the first TRP-specific index of the TRP 2312-1 (e.g., transmitting the at least one first DM-RS port) being less/greater than the second TRP-specific index of the TRP 2312-2 (e.g., transmitting the at least one second DM-RS port). The one or more criteria may comprise the first DM-RS-group-specific index of the first DM-RS group (e.g., comprising the at least one first DM-RS port) being less/greater than the second DM-RS-group-specific index of the second DM-RS group (e.g., comprising the at least one second DM-RS port). The one or more criteria may comprise determining a TRP among the one or more TRPs (e.g., TRP 2312-1, second TRP 2312-2) transmitting the PDCCH transmission.

The wireless device 2316 may receive DCI (e.g., one or more DCI messages) in one or more time slots. The wireless device 2316 may receive the DCI (e.g., DCI 2404-4) scheduling the PDSCH in a time slot (e.g., slot n+2 2408-4). The wireless device 2316 may receive first DCI (e.g., DCI 2408-1) of the DCI (e.g., one or more DCI messages) in a first time slot (slot n−1 2408-1) of the one or more time slots. The wireless device 2316 may receive second DCI (e.g., DCI 2404-2) of the DCI (e.g., one or more DCI messages) in a second time slot (slot n 2408-2) of the one or more time slots. The wireless device 2316 may receive third DCI (e.g., DCI 2408-3) of the DCI (e.g., one or more DCI messages) in a third time slot (slot n+1 2408-3) of the one or more time slots. The wireless device 2316 may receive fourth DCI (e.g., DCI 2404-4) of the DCI (e.g., one or more DCI messages) in a fourth time slot (slot n+2 2408-4) of the one or more time slots. At least one DCI message (e.g., DCI-1, DCI-2) of the DCI (e.g., one or more DCI messages) may indicate at least one selected TCI state set indicated/identified by at least one TCI set index. The at least one TCI set index of the at least one selected TCI state set and the second TCI set index of the second TCI state set may (or may not) be the same. The at least one DCI may not comprise the DCI (e.g., DCI 2404-4) scheduling the PDSCH transmission.

The wireless device 2316 may receive the at least one DCI message (e.g., DCI-1, DCI-2) in at least one CORESET configured with a second higher layer parameter TCI-PresentInDCI. The at least one DCI message may schedule at least one PDSCH. A time offset between a reception of the at least one DCI message and the at least one scheduled PDSCH transmission may be equal or greater than the threshold. The wireless device 2316 may receive, based on the at least one selected TCI state set, the at least one scheduled PDSCH transmission. The wireless device 2316 may use one or more selected parameters in the at least one selected TCI state set to configure one or more quasi co-location relationships for at least one DM-RS port of the at least one PDSCH.

A reception time of a selected DCI of the at least one DCI may be a latest (e.g., most recent) among at least one reception time of the at least one DCI. The first DCI (e.g., DCI-1) and the second DCI (e.g., DCI-2) may indicate the second TCI state set (e.g., the second TCI state set Id). The at least one DCI may comprise the first DCI and the second DCI, for example, based on the indicating the second TCI state set. The wireless device 2316 may receive the second DCI (e.g., DCI-2) later in time than the first DCI (e.g., DCI-1) (e.g., slot n 2412-2 occurs after slot n−1 2412-1). The wireless device 2316 may determine/select the second DCI (e.g., DCI-2) as the selected DCI, for example, based on receiving the second DCI later in time than the first DCI. The wireless device 2316 may determine/select the selected DCI (e.g., DCI-2) of the at least one DCI message, for example, based on the reception time of the selected DCI being latest among reception time(s) of the one or more DCI messages.

The selected DCI (e.g., DCI-2 in FIG. 24) may indicate a selected second TCI state set (e.g., second TCI state set). The selected second TCI state set may be indicated/identified by the second TCI set index (e.g., second TCI state set Id in FIG. 24). The selected second TCI state set may indicate at least one fourth downlink RS (e.g., fifth RS in FIG. 24). The selected second TCI state set may indicate at least one fourth QCL type (e.g., fifth QCL type in FIG. 24).

A selected DCI of the at least one DCI may be DCI: (i) that is latest (e.g., most recent) received DCI among the at least one DCI message, and/or (ii) that comprises information corresponding to a beam that was used to receive data from the TRP 2312-2. The wireless device 2316 may determine/select the selected second TCI state set and/or the selected DCI, for example, based on determining that the selected second TCI state set comprises information corresponding to a beam that was used to receive data from the TRP 2312-2. The wireless device 2316 may not select the DCI 2404-3, for example, based on determining that TCI states indicated by the DCI 2404-3 does not comprise information corresponding to a beam that was used to receive data from the TRP 2312-2.

The wireless device 2316 may determine an antenna port quasi co-location of the PDSCH. The wireless device may determine (e.g., based on one or more criteria) that the second TCI state set for the PDSCH is identical to the selected second TCI state set, for example, if the base station does not configure the CORESET with the higher layer parameter (e.g., TCI-PresentInDCI), and/or if the time offset is equal to or greater than the threshold. The wireless device 2316 may determine that the second TCI state set for the PDSCH is identical to the selected second TCI state set, for example, if the DCI 2404-4 does not comprise a TCI state indication and/or if a time offset is equal to or greater than the threshold. The wireless device 2316 may determine that the second TCI state set for the PDSCH is identical to the selected second TCI state set applied for a CORESET, for example, if a time offset is less than the threshold. The second TCI state set being identical to the selected second TCI state set may comprise that the wireless device 2316 may use one or more parameters in the selected second TCI state set to configure one or more second quasi co-location relationships for the at least one second DM-RS port of the PDSCH (e.g., second DM-RS ports of the PDSCH 2308-2). The using the one or more parameters may comprise that the at least one second DM-RS port of the PDSCH is quasi co-located with the at least one fourth DL RS with respect to the at least one fourth QCL type (e.g., fifth QCL type in FIG. 24) indicated/configured by the selected second TCI state set. The wireless device may determine/assume that the at least one second DM-RS port of the PDSCH is quasi co-located with the at least one fourth DL RS with respect to the at least one fourth QCL type (e.g., fifth QCL type in FIG. 24) indicated/configured by the selected second TCI state set, for example, based on using the one or more parameters. The one or more criteria may comprise that the first TCI set index of the first TCI state set is less/greater than the second TCI set index of the second TCI state set. The one or more criteria may comprise the first TRP-specific index of the TRP 2312-1 (e.g., transmitting the at least one first DM-RS port) being less/greater than the second TRP-specific index of the TRP 2312-2 (e.g., transmitting the at least one second DM-RS port). The one or more criteria may comprise the first DM-RS-group-specific index of the first DM-RS group (e.g., comprising the at least one first DM-RS port) being less/greater than the second DM-RS-group-specific index of the second DM-RS group (e.g., comprising the at least one second DM-RS port). The one or more criteria may comprise determining a TRP among the one or more TRPs (e.g., TRP 2312-1, second TRP 2312-2) transmitting the PDCCH transmission.

A base station may configure a CORESET with a higher layer parameter (e.g., TCI-PresentInDCI) for a serving cell. A base station may not configure a CORESET with a higher layer parameter (e.g., TCI-PresentInDCI) for a serving cell. The wireless device may receive DCI (e.g., DCI format 1_1) in the CORESET for the serving cell. A time offset between a first reception of the DCI (e.g., DCI 2404-4) received in the CORESET and a second reception of the PDSCH may be less than a threshold (e.g., timeDurationForQCL, Threshold-Sched-Offset). The wireless device may determine a default PDSCH RS, for example, based on the time offset being less than the threshold and/or one or more criteria. The wireless device may determine, for the at least one first DM-RS port of the PDSCH, a second TCI state, for example, based on the default PDSCH RS selection. The wireless device may determine the second TCI state for the at least one first DM-RS port of the PDSCH, for example, based on the time offset being less than the threshold and/or one or more criteria. The wireless device 2316 may determine the second TCI state for the at least one first DM-RS port of the PDSCH, for example, based on the base station not configuring the CORESET with a higher layer parameter (e.g., TCI-PresentInDCI). The wireless device 2316 may determine the second TCI state for the at least one first DM-RS port of the PDSCH, for example, if the DCI 2404-4 does not comprise a TCI state indication.

The second TCI state may comprise one or more third parameters (e.g., qcl-Type1, qcl-Type2, referenceSignal, etc.). The second TCI state may indicate at least one third DL RS. The second TCI state may indicate at least one third QCL type. The wireless device may use the one or more third parameters to configure one or more first quasi co-location relationships between the at least one third DL RS and the at least one first DM-RS port of the PDSCH, for example, based on the determining the second TCI state. The using the one or more third parameters may comprise that (the at least one first DM-RS port of the PDSCH is quasi co-located with the at least one third downlink RS with respect to the at least one third QCL type indicated/configured by the second TCI state. The wireless device 2316 may determine (e.g., assume) that the at least one first DM-RS port of the PDSCH is quasi co-located with the at least one third downlink RS with respect to the at least one third QCL type indicated/configured by the second TCI state, for example, based on using the one or more third parameters. The first TCI state set for the PDSCH may be identical to the second TCI state, for example, based on the determining. The one or more criteria may comprise the first TCI set index of the first TCI state set being less/greater than the second tci set index of the second TCI state set. The one or more criteria may comprise the first TRP-specific index of the TRP 2312-1 (e.g., transmitting the at least one first DM-RS port) being less/greater than the second TRP-specific index of the TRP 2312-2 (transmitting the at least one second DM-RS port). The one or more criteria may comprise the first DM-RS-group-specific index of the first DM-RS group (e.g., comprising the at least one first DM-RS port) being less/greater than the second DM-RS-group-specific index of the second DM-RS group (e.g., comprising the at least one second DM-RS port). The one or more criteria may comprise determining a TRP among the one or more TRPs (e.g., first TRP, second TRP) transmitting the PDCCH transmission.

A base station may configure a CORESET with a higher layer parameter (e.g., TCI-PresentInDCI) for a serving cell. A base station may not configure a CORESET with a higher layer parameter (e.g., TCI-PresentInDCI) for a serving cell. The wireless device may receive DCI (e.g., DCI format 1_1) in the CORESET for the serving cell. The TCI state may comprise the at least two TCI state sets (e.g., first TCI state set and second TCI state set in FIG. 24). A time offset between a first reception of the DCI received in the CORESET and a second reception of the PDSCH may be less than a threshold (e.g., timeDurationForQCL, Threshold-Sched-Offset). The wireless device may determine the selected second TCI state set for the at least one second DM-RS port of the PDSCH, for example, based on the time offset being less than the threshold and/or one or more criteria. The wireless device 2316 may determine the selected second TCI state for the at least one second DM-RS port of the PDSCH, for example, based on the base station not configuring the CORESET with a higher layer parameter (e.g., TCI-PresentInDCI). The wireless device 2316 may determine the second TCI state for the at least one first DM-RS port of the PDSCH, for example, if the DCI 2404-4 does not comprise a TCI state configuration.

The determining the selected second TCI state set may comprise that the wireless device determines (e.g., in order to determine antenna port quasi co-location of the PDSCH) that the second TCI state set for the PDSCH is identical to the selected second TCI state set. The second TCI state set being identical to the selected second TCI state set may comprise that the wireless device may use one or more parameters in the selected second TCI state set to configure one or more second quasi co-location relationships for the at least one second DM-RS port of the PDSCH (e.g., second DM-RS ports of the PDSCH in FIG. 23). The using the one or more parameters may comprise that the at least one second DM-RS port of the PDSCH is quasi co-located with the at least one fourth DL RS with respect to the at least one fourth QCL type (e.g., fifth QCL type in FIG. 24) indicated/configured by the selected second TCI state set. The wireless device may determine/assume that the at least one second DM-RS port of the PDSCH is quasi co-located with the at least one fourth DL RS with respect to the at least one fourth QCL type (e.g., fifth QCL type in FIG. 24) indicated/configured by the selected second TCI state set, for example, based on the using the one or more parameters. The one or more criteria may comprise the first TCI set index of the first TCI state set being less/greater than the second TCI set index of the second TCI state set. The one or more criteria may comprise the first TRP-specific index of the TRP 2312-1 (e.g., transmitting the at least one first DM-RS port) being less/greater than the second TRP-specific index of the second TRP 2312-2 (e.g., transmitting the at least one second DM-RS port). The one or more criteria may comprise the first DM-RS-group-specific index of the first DM-RS group (e.g., comprising the at least one first DM-RS port) being lower/higher than the second DM-RS-group-specific index of the second DM-RS group (e.g., comprising the at least one second DM-RS port). The one or more criteria may comprise determining a TRP among the one or more TRPs (e.g., TRP 2312-1, second TRP 2312-2) transmitting the PDCCH. The one or more criteria may comprise the TCI state comprising the at least two TCI state sets.

An offset between a first reception (e.g., of the DCI) and a second reception (e.g., of PDSCH) being less than a threshold may comprise the offset between the first reception and the second reception being lower than the threshold. An offset between a first reception and a second reception being less than a threshold may comprise the offset between the first reception and the second reception being smaller than the threshold.

Figure 25:
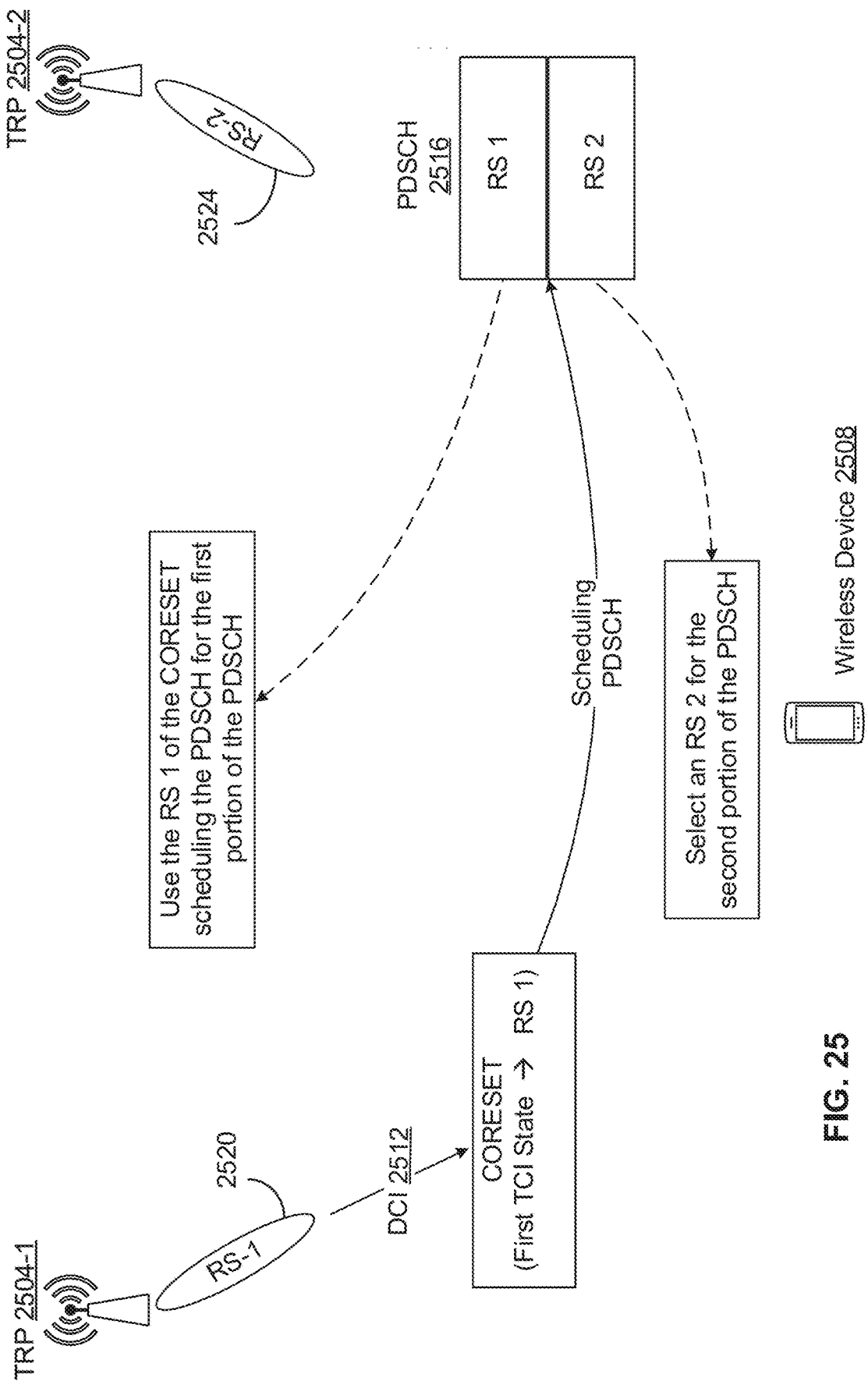
FIG. 25 shows an example downlink beam management procedure for selection of multiple beams.

FIG. 25 shows an example downlink beam management procedure. A base station may configure a CORESET with a TCI state. The wireless device 2508 may monitor, for DCI, at least one PDCCH in the CORESET, for example, based on the TCI state. The wireless device 2316 may detect DCI 2512, for example, based on the TCI state. The TCI state may indicate at least one DL RS (e.g., RS-1 2520). The wireless device 2316 may configure one or more QCL relationships between the RS 1 and at least one DM-RS port of the at least one PDCCH. The monitoring the at least one PDCCH based on the TCI state may comprise that the at least one DM-RS port of the PDCCH is quasi co-located with the at least one RS-1 2520 with respect to at least one QCL type indicated by the TCI state.

A time offset between a reception of the DCI 2512 and a reception of a PDSCH 2516 may be less than a threshold (e.g., timeDurationForQCL, Threshold-Sched-Offset). The wireless device may receive a first portion of the PDSCH 2516 (e.g., from the TRP 2504-1) based on the RS-1 2520. Receiving the first portion of the PDSCH based on the RS-1 2520 comprises that at least one first DM-RS port of the PDSCH 2516 is quasi co-located with the RS-1 2520 with respect to a quasi colocation type indicated by the TCI state. The wireless device may receive a second portion of the PDSCH 2516 (e.g., from the TRP 2504-2) based on a second RS. Receiving the second portion of the PDSCH based on the second RS may comprise that at least one second DM-RS port of the PDSCH 2526 is quasi co-located with the second RS with respect to a quasi colocation type. The second RS and the quasi colocation type may be indicated by another TCI state (e.g., indicated in DCI transmitted in a previous time slot).

A wireless device may be configured to receive, simultaneously and via different beams, data from multiple TRPs in a cell. A wireless device may receive, from a first TRP in a first cell, first data via a first downlink channel. The wireless device may receive, from a second TRP in the first cell, second data via a second downlink channel. The wireless device may use a first beam to receive the first data. The wireless device may use a second beam to receive the second data. A second cell may transmit third data, via a third downlink channel, that may overlap (e.g., in time) with the first data and the second data. The wireless device may need to select a beam among the first beam and the second beam to receive the third data via the third downlink channel.

The wireless device may use, to select a beam for receiving downlink data (e.g. PDSCH data) from multiple cells, indicators (e.g., indices) associated with the beams and/or antenna panel indicators (e.g., indices) at the wireless device. The wireless device may select a beam, among a plurality of beams, with a TCI state that has a lowest/least TCI state indicator (e.g., index) among TCI state indicators associated with the plurality of beams). With reference to the above example, the wireless device may select the first beam to receive the data via the second cell, for example, if the TCI state index of the first beam is a lowest/least TCI index among TCI state indices of the first beam and the second beam.

The wireless device may select an antenna panel that has a lowest/least antenna panel indicator (e.g., index) among a plurality of antenna panels used to receive data in a cell. With reference to the above example, the wireless device may use a first antenna panel to receive data in the first PDSCH transmission and a second antenna panel to receive data in a second PDSCH transmission. The wireless device may select the first antenna panel to receive data in the third PDSCH transmission, for example, if the first antenna panel index is a lowest/least antenna panel index among antenna panel indices of the first antenna panel and the second antenna panel.

Figure 26A:
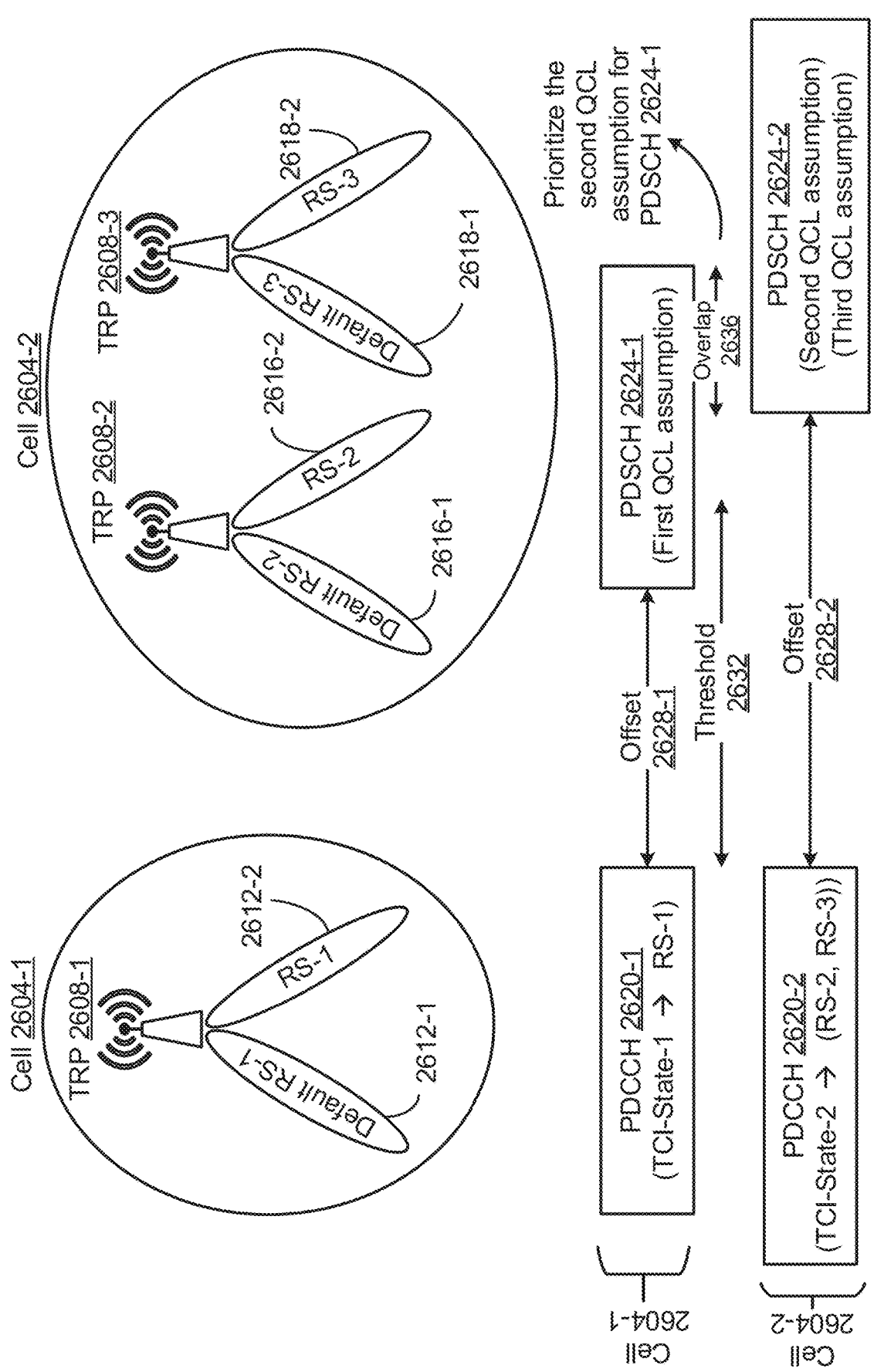
FIGS. 26A-26C show example downlink beam management procedures in a communication system comprising at least two cells.
Figure 26B:
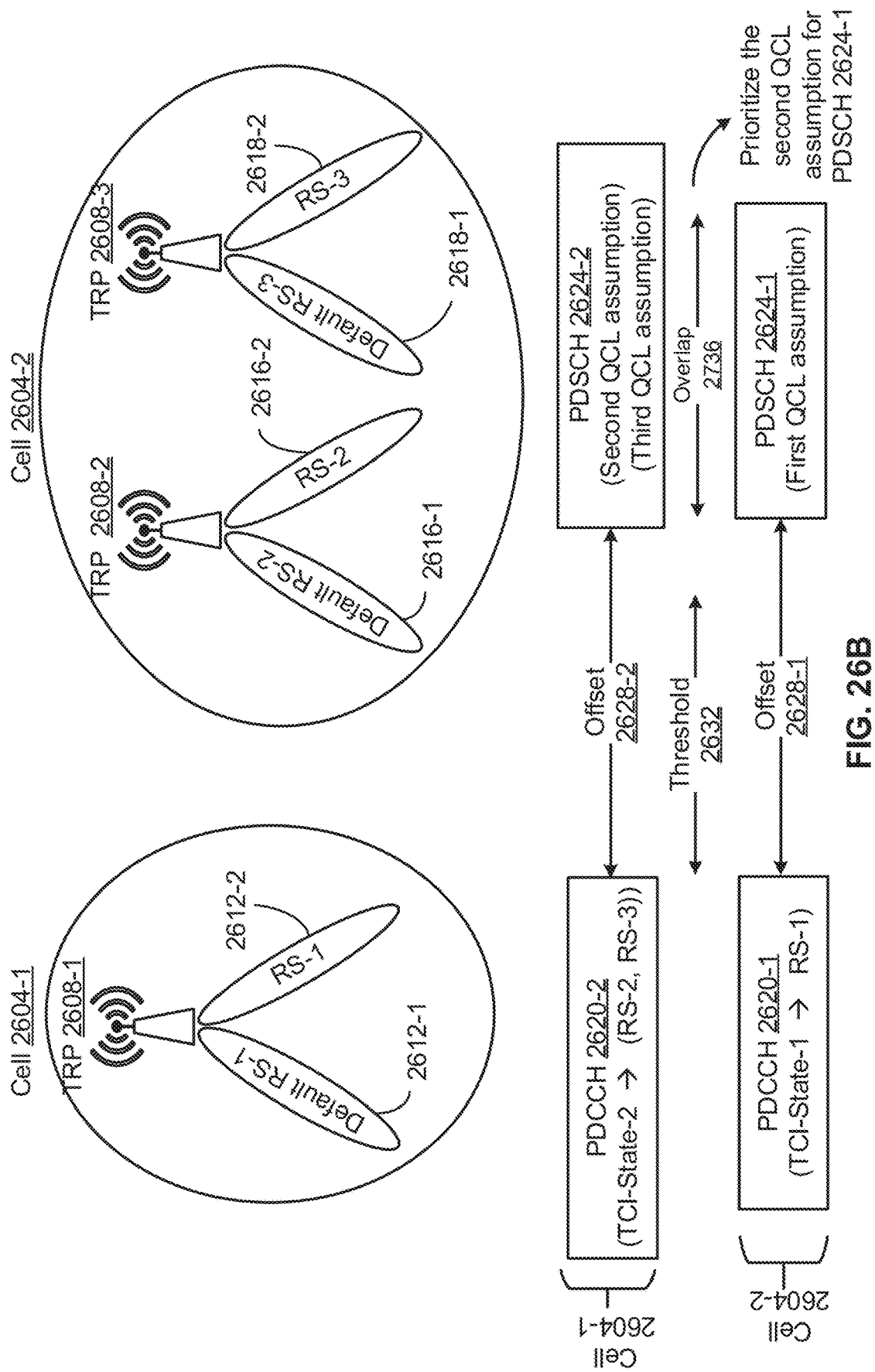
Figure 26C:
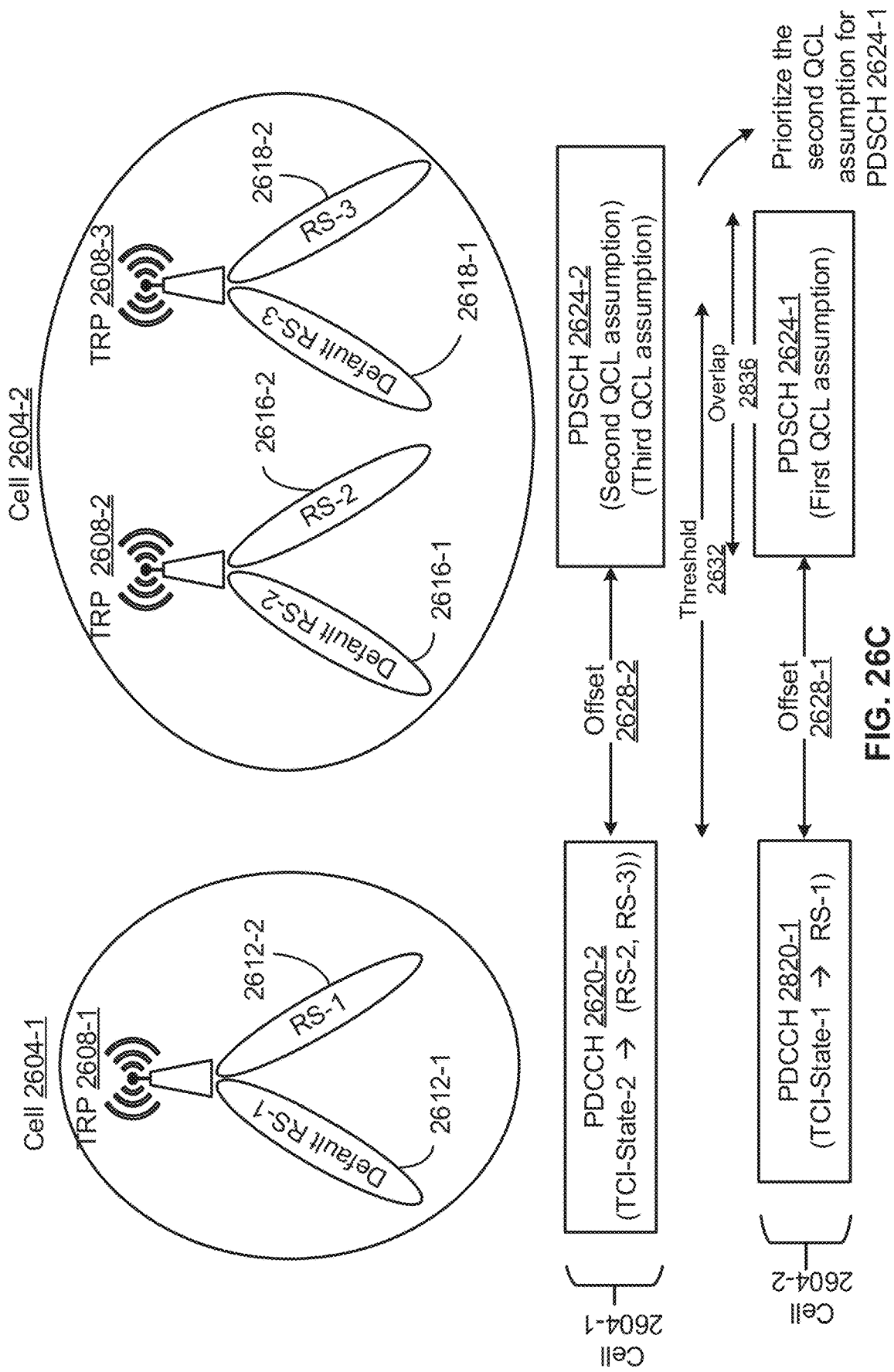

FIGS. 26A-26C show example downlink beam management procedures. A wireless device may receive, from a base station, one or more messages. The one or more messages may comprise one or more configuration parameters of a plurality of cells. The plurality of cells may comprise a first cell (e.g., Cell 2604-1 and a second cell (e.g., Cell 2604-2).

The one or more configuration parameters may indicate cell-specific indices (e.g., indicated/provided by a higher layer parameter, servCellIndex) for the plurality of cells. Each cell of the plurality of cells may be indicated/identified by a respective one cell-specific index of the cell-specific indices. The first cell may be indicated/identified by a first cell-specific index. The second cell may be indicated/identified by a second cell-specific index.

The wireless device may detect a first PDCCH transmission (e.g., PDCCH 2620-1) with (e.g., based on receiving) a first DCI for the first cell. The wireless device may receive the first DCI, for example, based on/during monitoring the first PDCCH for the first cell. The first DCI may schedule a first PDSCH transmission (e.g., PDSCH 2624-1) for the first cell.

A first QCL assumption (e.g., a TCI state, default PDSCH RS selection) may indicate at least one first RS (e.g., SS/PBCH block, CSI-RS). The first QCL assumption may indicate a first QCL type (e.g., QCL-TypeD). The PDSCH 2624-1 may be associated with the first QCL assumption. The wireless device may determine/assume that at least one first DM-RS port of the PDSCH 2624-1 is quasi co-located with the at least one first RS (e.g., RS-1 2612-2 or Default RS-1 2612-1) with respect to the first QCL type, for example, based on the association. The wireless device may receive the PDSCH 2624-1, for example, based on the association and/or based on the first QCL assumption.

Figure 27:
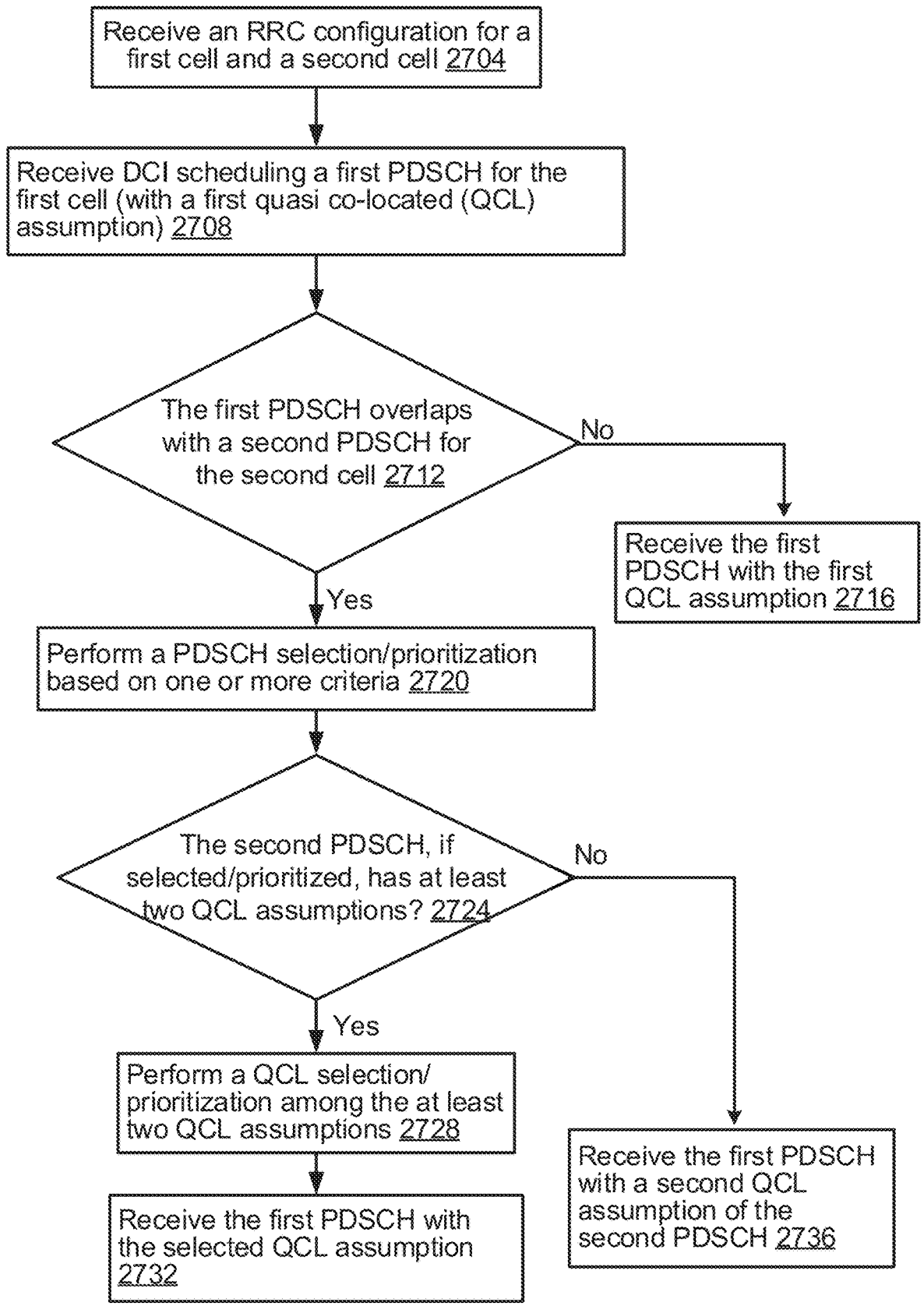
FIG. 27 shows an example method for downlink beam management.

The first DCI may comprise a first TCI field indicating a first TCI state (e.g., TCI-State-1 in FIGS. 25-27). The first TCI state may indicate the at least one first RS (e.g., RS-1 2612-2) for the first QCL assumption. The wireless device may determine, for the first QCL assumption and based on a default PDSCH RS selection, the at least one first RS (e.g., Default RS-1 2612-1). The wireless device may perform the default PDSCH RS selection, for example, if a first time offset (e.g., offset 2628-1) between a reception of the first DCI and a first reception the PDSCH 2624-1 is less than a threshold (e.g., timeDurationForQCL, Threshold-Sched-Offset). The wireless device may perform the default PDSCH RS selection, for example, if the first DCI scheduling the PDSCH 2624-1 is received in a first CORESET, wherein the first CORESET may not be configured with a field indicating that a TCI field is present in the DCI (e.g., TCI-PresentInDCI field). The wireless device may perform the default PDSCH RS selection, for example, if the first DCI does not comprise a TCI field. The wireless device may perform the default PDSCH RS selection, for example, if the first DCI corresponds to a DCI format that does not comprise a TCI field (e.g., DCI format 1_0).

The wireless device may detect a second PDCCH transmission (e.g., PDCCH 2620-2) with second DCI for the cell 2604-2. The wireless device may receive the second DCI, for example, based on monitoring the PDCCH 2620-2 for the cell 2604-2. The second DCI may schedule a second PDSCH transmission e.g., PDSCH 2624-2) for the cell 2604-2.

A second QCL assumption (e.g., a TCI state, default PDSCH RS selection) may indicate at least one second RS (e.g., SS/PBCH block, CSI-RS). The second QCL assumption may indicate a second QCL type (e.g., QCL-TypeD). The PDSCH 2624-2 may be associated with the second QCL assumption. The wireless device may determine/assume that at least one second DM-RS port of the PDSCH 2624-2 is quasi co-located with the at least one second RS (e.g., RS-2 2616-2 or Default RS-2 2616-1) with respect to the second QCL type, for example, based on the association.

A third QCL assumption (e.g., a TCI state, default PDSCH RS selection) may indicate at least one third RS (e.g., SS/PBCH block, CSI-RS). The third QCL assumption may indicate a third QCL type (e.g., QCL-TypeD). The PDSCH 2624-2 may be associated with the third QCL assumption. The wireless device may determine/assume that at least one third DM-RS port of the PDSCH 2624-2 is quasi co-located with the at least one third RS (e.g., RS-3 2618-2 or Default RS-3 2618-1) with respect to the third QCL type, for example, based on the association.

The wireless device may receive the PDSCH 2624-2, for example, based on the second QCL assumption and/or the third QCL assumption. The receiving the PDSCH 2624-2 based on the second QCL assumption and/or the third QCL assumption may comprise that the at least one second DM-RS port of the PDSCH 2624-2 is quasi co-located with the at least one second RS with respect to the second QCL type, and/or the at least one third DM-RS port of the PDSCH 2624-2 is quasi co-located with the at least one third RS with respect to the third QCL type.

The second DCI may comprise a second TCI field indicating a second TCI state (e.g., TCI-State-2 in FIG. 25, FIG. 26, and/or FIG. 27). The second TCI state may comprise one or more TCI state sets. The one or more TCI state sets may comprise a first TCI state set (e.g., first TCI state set in FIG. 23) and/or a second TCI state set (e.g., second TCI state set in FIG. 23). The first TCI state set may be indicated/identified by a first TCI set index (e.g., indicated/provided by TCI-StateSetId in FIG. 22, first TCI state set Id in FIG. 23). The second TCI state set may be indicated/identified by a second TCI set index (e.g., indicated/provided by TCI-StateSetId in FIG. 22, second TCI state set Id in FIG. 23). The first TCI set index and/or the second TCI set index may be indicated by the one or more configuration parameters. The first TCI state set may indicate the at least one second RS (e.g., RS-2 2616-2) for the second QCL assumption. The second TCI state set may indicate the at least one third RS (e.g., RS-3 2618-2) for the third QCL assumption. The first TCI state set may indicate the second QCL type for the second QCL assumption. The second TCI state set may indicate the third QCL type for the third QCL assumption.

The wireless device may determine, for the second QCL assumption, the at least one second RS (e.g. Default RS-22612-1) based on a default PDSCH RS selection. The wireless device may determine, for the third QCL assumption, the at least one third RS (e.g. Default RS-3 2618-1) based on the default PDSCH RS selection. The wireless device may perform the default PDSCH RS selection, for example, if a second time offset (e.g., offset 2628-2) between a reception of the second DCI and a second reception the PDSCH 2624-2 is less than a threshold (e.g., timeDurationForQCL, Threshold-Sched-Offset). The wireless device may perform the default PDSCH RS selection, for example, if the second DCI scheduling the PDSCH 2624-2 is received in a second CORESET, wherein the second CORESET may not be configured with a field indicating that a TCI field is present in the DCI (e.g., TCI-PresentInDCI field). The wireless device may perform the default PDSCH RS selection, for example, if the second DCI does not comprise a TCI field. The wireless device may perform the default PDSCH RS selection, for example, if the second DCI corresponds to a DCI format that does not comprise a TCI field (e.g., DCI format 1_0).

A first time offset (e.g., offset 2628-1 in FIG. 25) between a reception of the first DCI and a first reception of the PDSCH 2624-1 may be less than a threshold (e.g., timeDurationForQCL, Threshold-Sched-Offset). A second time offset (e.g., offset 2628-2 in FIG. 25) between a reception of the second DCI and a second reception of the PDSCH 2624-2 may be equal to or greater than the threshold.

A first time offset (e.g., offset 2628-1 in FIG. 26) between a reception of the first DCI and a first reception of the PDSCH 2624-1 may be equal to or greater than a threshold (e.g., timeDurationForQCL, Threshold-Sched-Offset). A second time offset (e.g., offset 2628-2 in FIG. 26) between a reception of the second DCI and a second reception of the PDSCH 2624-2 may be equal to or greater than the threshold. The cell 2604-2-specific index may be less than the cell 2604-1-specific index.

A first time offset (e.g., offset 2628-1 in FIG. 27) between a reception of the first DCI and a first reception of the PDSCH 2624-1 may be less than a threshold (e.g., timeDurationForQCL, Threshold-Sched-Offset). A second time offset (e.g., offset 2628-2 in FIG. 27) between a reception of the second DCI and a second reception of the PDSCH 2624-2 may be less than the threshold. The cell 2604-2-specific index may be less than the cell 2604-1-specific index.

The wireless may determine that the PDSCH 2624-1 and the PDSCH 2624-2 overlap in a time duration (e.g., overlap 2736). The time duration may be at least one symbol (or any other number of symbols). The time duration may be at least one slot. The time duration may be at least one subframe (or any other number of subframes). The time duration may be at least one frame (or any other number of frames).

The first QCL assumption may be different from the second QCL assumption and the third QCL assumption in the time duration. The first QCL assumption being different from the second QCL assumption and the third QCL assumption may comprise that the wireless device may not receive the PDSCH 2624-1 and the PDSCH 2624-2, simultaneously (or near simultaneously) in the time duration. The first QCL assumption being different from the second QCL assumption and the third QCL assumption may comprise the at least one first RS is different from the at least one second RS and the at least one third RS. The first QCL assumption being different from the second QCL assumption and the third QCL assumption may comprise the at least one first RS is not QCL-ed with the at least one second RS and the at least one third RS.

The second QCL assumption and the third QCL assumption may be different. The wireless device may receive the at least one second DM-RS port with respect to the second QCL type (e.g., associated with the second QCL assumption) and the at least one third DM-RS port with respect to the third QCL type (e.g., associated with the third QCL assumption) simultaneously (or near simultaneously).

One or more TRPs (e.g., TRP 2608-1, TRP 2608-2, and TRP 2608-3) may serve the wireless device. The cell 2604-1 may comprise the TRP 2608-1. The cell 2604-2 may comprise the TRP 2608-2 and the third TRP 2608-3. The wireless device may receive the first DCI from a first TRP (e.g., TRP 2608-1) of the one or more TRPs. The wireless device may receive the second DCI from a second TRP (e.g., TRP 2608-2) of the one or more TRPs. The wireless device may receive the at least one first DM-RS port of the PDSCH 2624-1 from the TRP 2608-1. The wireless device may receive the at least one second DM-RS port of the PDSCH 2624-2 from the TRP 2608-2. The wireless device may receive the at least one third DM-RS port of the PDSCH 2624-2 from a third TRP (e.g., the TRP 2608-3) of the one or more TRPs.

The one or more configuration parameters may indicate TRP-specific indices (e.g., indicated/provided by a higher layer parameter) for the one or more TRPs. Each TRP of the one or more TRPs may be indicated/identified by a respective one TRP-specific index of the TRP-specific indices. The TRP 2608-1 may be indicated/identified by a first TRP-specific index. The TRP 2608-2 may be indicated/identified by a second TRP-specific index. The TRP 2608-3 may be indicated/identified by a third TRP-specific index.

The PDSCH 2624-2 may comprise one or more DM-RS groups. The one or more DM-RS groups may comprise a first DM-RS group and a second DM-RS group. The first DM-RS group may comprise the at least one second DM-RS port of the PDSCH 2624-2. The second DM-RS group may comprise the at least one third DM-RS port of the PDSCH 2624-2.

The one or more configuration parameters may indicate DM-RS-group-specific indices (e.g., indicated/provided by a higher layer parameter) for the one or more DM-RS groups. Each DM-RS group of the one or more DM-RS groups may be indicated/identified by a respective one DM-RS-group-specific index of the DM-RS-group-specific indices. The first DM-RS group may be indicated/identified by a first DM-RS-group-specific index. The second DM-RS group may be indicated/identified by a second DM-RS-group-specific index.

The wireless device may determine/select a PDSCH (e.g., a selected PDSCH) among the PDSCH 2624-1 and the PDSCH 2624-2, for example, if the PDSCH 2624-1 and the PDSCH 2624-2 overlap in the time duration, and/or if the first QCL assumption is different from the second QCL assumption and/or the third QCL assumption. The wireless device may determine/select a PDSCH (e.g., a selected PDSCH) among the PDSCH 2624-1 and the PDSCH 2624-2 based on one or more criteria.

The one or more criteria may be based on a value of a cell-specific index. The determining/selecting may comprise determining/selecting a cell with a lowest/least cell-specific index among the first cell-specific index of the cell 2604-1 and the second cell-specific index of the cell 2604-2. The first cell-specific index may be lower/less than the second cell-specific index. The wireless device may determine/select the PDSCH 2624-1 of the cell 2604-1 as the selected PDSCH, for example, based on the first cell-specific index being less than the second cell-specific index. The first cell-specific index may be greater than the second cell-specific index. The wireless device may determine/select the PDSCH 2624-2 of the cell 2604-2 as the selected PDSCH, for example, based on the first cell-specific index being greater than the second cell-specific index.

The one or more criteria may be based on a value of a cell-specific index. The determining/selecting may comprise determining/selecting a cell with a highest/greatest cell-specific index among the first cell-specific index of the cell 2604-1 and the second cell-specific index of the cell 2604-2. The first cell-specific index may be greater than the second cell-specific index. The wireless device may determine/select the PDSCH 2624-1 of the cell 2604-1 as the selected PDSCH, for example, based on the first cell-specific index being greater than the second cell-specific index. The first cell-specific index may be less than the second cell-specific index. The wireless device may determine/select the PDSCH 2624-2 of the cell 2604-2 as the selected PDSCH, for example, based on the first cell-specific index being less than the second cell-specific index.

The one or more criteria may be based on a search space type (e.g., common search space, CSS, or wireless device-specific search space, USS). The determining/selecting may comprise determining/selecting a cell, among the cell 2604-1 and the cell 2604-2, configured with a CSS scheduling an overlapped PDSCH (e.g., the PDSCH 2624-1, the PDSCH 2624-2). The CSS may have a higher priority than a USS. The wireless device may receive system information parameters and/or RA parameters in the common search space.

The wireless device may receive the first DCI scheduling the PDSCH 2624-1 in a first CSS of the cell 2604-1. The wireless device may receive the second DCI scheduling the PDSCH 2624-2 in a second wireless device-specific search space (USS) of the cell 2604-2. The wireless device may determine/select the PDSCH 2624-1 of the cell 2604-1 as the selected PDSCH, for example, based on the receiving the first DCI scheduling the PDSCH 2624-1 in the first CSS and/or receiving the second DCI scheduling the PDSCH 2624-2 in the second USS.

The wireless device may receive the first DCI scheduling the PDSCH 2624-1 in a first USS of the cell 2604-1. The wireless device may receive the second DCI scheduling the PDSCH 2624-2 in a second CSS of the cell 2604-2. The wireless device may determine/select the PDSCH 2624-2 of the cell 2604-2 as the selected PDSCH, for example, based on receiving the first DCI scheduling the PDSCH 2624-1 in the first USS and/or based on receiving the second DCI scheduling the PDSCH 2624-2 in the second CSS.

The first cell-specific index may be less than the second cell-specific index. The wireless device may receive the first DCI scheduling the PDSCH 2624-1 in a first CSS of the cell 2604-1. The wireless device may receive the second DCI scheduling the PDSCH 2624-2 in a second CSS of the cell 2604-2. The wireless device may determine/select the PDSCH 2624-1 of the cell 2604-1 as the selected PDSCH, for example, based on receiving the first DCI in the first CSS, based on receiving the second DCI in the second CSS, and/or based on the first cell-specific index being less than the second cell-specific index.

The first cell-specific index may be less than the second cell-specific index. The wireless device may receive the first DCI scheduling the PDSCH 2624-1 in a first USS of the cell 2604-1. The wireless device may receive the second DCI scheduling the PDSCH 2624-2 in a second USSUSS of the cell 2604-2. The wireless device may determine/select the PDSCH 2624-1 of the cell 2604-1 as the selected PDSCH, for example based on receiving the first DCI in the first USS, based on receiving the second DCI in the second USS, and/or based on the first cell-specific index being less than the second cell-specific index.

The one or more criteria may be based on a time offset (e.g., the time offset 2628-1, the time offset 2628-2) between a reception of DCI (e.g., the first DCI, the second DCI) and a reception of a PDSCH transmission (e.g., the PDSCH 2624-1, the PDSCH 2624-2) scheduled by the DCI, and/or a threshold (e.g., timeDurationForQCL, Threshold-SchedOffset). The time offset 2628-1 of the cell 2604-1 may be less than the threshold. The time offset 2628-2 of the cell 2604-2 may be equal to or greater than the threshold (e.g., as shown in FIG. 26A). The wireless device may determine/select the PDSCH 2624-2 of the cell 2604-2 as the selected PDSCH, for example, based on the time offset 2628-1 being less than the threshold and/or the time offset 2628-2 being equal to or greater than the threshold. The time offset 2628-1 of the cell 2604-1 may be equal to or greater than the threshold. The time offset 2628-2 of the cell 2604-2 may be less than the threshold. The wireless device may determine/select the PDSCH 2624-1 of the cell 2604-1 as the selected PDSCH, for example, based on the time offset 2628-1 being equal to or greater than the threshold and/or based on the time offset 2628-2 being less than the threshold.

The first cell-specific index may be less than the second cell-specific index. The time offset 2628-1 of the cell 2604-1 may be equal to or greater than the threshold. The time offset 2628-2 of the cell 2604-2 may be equal to or greater than the threshold (e.g., as shown in FIG. 26B). The wireless device may determine/select the PDSCH 2624-1 of the cell 2604-1 as the selected PDSCH, for example, based on the first cell-specific index being less than the second cell-specific index, the time offset 2628-1 being equal to or greater than the threshold, and/or the time offset 2628-2 being equal to or greater than the threshold. The first cell-specific index may be less than the second cell-specific index. The time offset 2628-1 of the cell 2604-1 may be less than the threshold. The time offset 2628-2 of the cell 2604-2 may be less than the threshold (e.g., as shown in FIG. 26C). The wireless device may determine/select the PDSCH 2624-1 of the cell 2604-1 as the selected PDSCH, for example, based on the first cell-specific index being less than the second cell-specific index, the time offset 2628-1 being less than the threshold, and/or the time offset 2628-2 being less than the threshold.

The selected PDSCH may be the PDSCH 2624-2 of the second cell. The wireless device may determine that the first TCI set index of the first TCI state set is less (or greater) than the second TCI set index of the second TCI state set, for example, based on the selected PDSCH being the PDSCH 2624-2. The wireless device may prioritize the second QCL assumption with the second QCL type (e.g., QCL-TypeD), associated with the at least one second DM-RS port of the PDSCH 2624-2 (on the second cell), for example, based on the determining. The wireless device may prioritize the second QCL assumption with the second QCL type (e.g., QCL-TypeD) indicated by the first TCI state set, for example, based on the determining. The first TCI state set may indicate the at least one second RS for the second QCL assumption. The first TCI state set may indicate the second QCL type for the second QCL assumption. The at least one second DM-RS port of the PDSCH 2624-2 may be quasi co-located with the at least one second RS with respect to the second QCL type.

The selected PDSCH may be the PDSCH 2624-2 of the cell 2604-2. The wireless device may determine the second TRP-specific index of the TRP 2608-2 being less (or greater) than the third TRP-specific index of the TRP 2608-3, for example, based on the selected PDSCH being the PDSCH 2624-2. The wireless device may prioritize the second QCL assumption with the second QCL type (e.g., QCL-TypeD) associated with the at least one second DM-RS port of the PDSCH 2624-2 sent (e.g., transmitted) by the TRP 2608. The TRP 2608-2 may send (e.g., transmit) the at least one second DM-RS port of the PDSCH 2624-2.

The selected PDSCH may be the PDSCH 2624-2 of the cell 2604-2. The wireless device may determine the first DM-RS-group-specific index of the first DM-RS group (e.g., comprising the at least one second DM-RS port) being less (or greater) than the second DM-RS-group-specific index of the second DM-RS group (e.g., comprising the at least one third DM-RS port) of the PDSCH 2624-2, for example, based on the selected PDSCH being the PDSCH 2624-2. The wireless device may prioritize the second QCL assumption with the second QCL type (e.g., QCL-TypeD) associated with the at least one second DM-RS port of the PDSCH 2624-2 in the first DM-RS group, for example, based on the determining. The first DM-RS group may comprise the at least one second DM-RS port of the PDSCH 2624-2.

The selected PDSCH may be the PDSCH 2624-2 of the second cell. The wireless device may determine that the TRP 2604-2 sends (e.g., transmits) the second DCI scheduling the PDSCH 2624-2, for example, based on the selected PDSCH being the PDSCH 2624-2. The wireless device may determine that the wireless device receives the second DCI scheduling the PDSCH 2624-2, from the TRP 2608-2, for example, based on the selected PDSCH being the PDSCH 2624-2. The wireless device may prioritize the second QCL assumption with the second QCL type (e.g., QCL-TypeD) associated with the at least one second DM-RS port of the PDSCH 2624-2, sent (e.g., transmitted) by the TRP 2608-2, for example, based on the determining. The TRP 2608-2 may send (e.g., transmit) the at least one second DM-RS port of the PDSCH 2624-2.

The prioritizing the second QCL assumption with the second QCL type may comprise that the at least one first DM-RS port of the PDSCH 2624-1 is quasi co-located with the at least one second RS with respect to the second QCL type (e.g., indicated by the second QCL assumption) in the time duration. The wireless device may determine/assume that the at least one first DM-RS port of the PDSCH 2624-1 is quasi co-located with the at least one second RS with respect to the second QCL type. The prioritizing the second QCL assumption with the second QCL type may comprise that the wireless device may receive the PDSCH 2624-1 with the at least one second RS with respect to the second QCL type (e.g., indicated by the second QCL assumption) in the time duration. The prioritizing the second QCL assumption with the second QCL type may comprise that the wireless device may apply the at least one second RS with respect to the second QCL type (e.g., indicated by the second QCL assumption) for the first reception of the PDSCH 2624-1 in the time duration. The prioritizing the second QCL assumption with the second QCL type may comprise that the second QCL assumption with the second QCL type overrides the first QCL assumption with the first QCL type in the time duration. The first QCL type and the second QCL type may be the same (e.g., QCL-TypeD) or different.

FIG. 27 shows an example method for downlink beam management. At step 2704, a wireless device may receive an RRC configuration for a first cell and a second cell. At step 2708, the wireless device may receive DCI that schedules a first PDSCH for the first cell. The DCI may schedule the first PDSCH with a first QCL assumption. At step 2716, the wireless device may receive the first PDSCH with the first QCL assumption, for example, if the first PDSCH does not overlap with a second PDSCH for the second cell. At step 2720, the wireless device may perform a PDSCH selection/prioritization based on one or more criteria, for example, if the first PDSCH overlaps with the second PDSCH. At step 2724, the wireless device may determine/select the second PDSCH may be based on the one or more criteria. The wireless device may select/prioritize the second PDSCH based on procedures described with reference to FIGS. 18-20. At step 2736, the wireless device may receive the first PDSCH with a second QCL assumption of the second PDSCH, for example, if the second PDSCH has only a single QCL assumption (e.g., the second QCL assumption). At step 2728, the wireless device may perform a QCL selection/prioritization among at least two QCL assumptions, for example, if the second PDSCH has the at least two QCL assumptions. The selection/prioritization may be based on procedures described with reference to FIGS. 26A-26C. At step 2732, the wireless device may receive the first PDSCH with a QCL assumption selected at step 2728.

Figure 28:
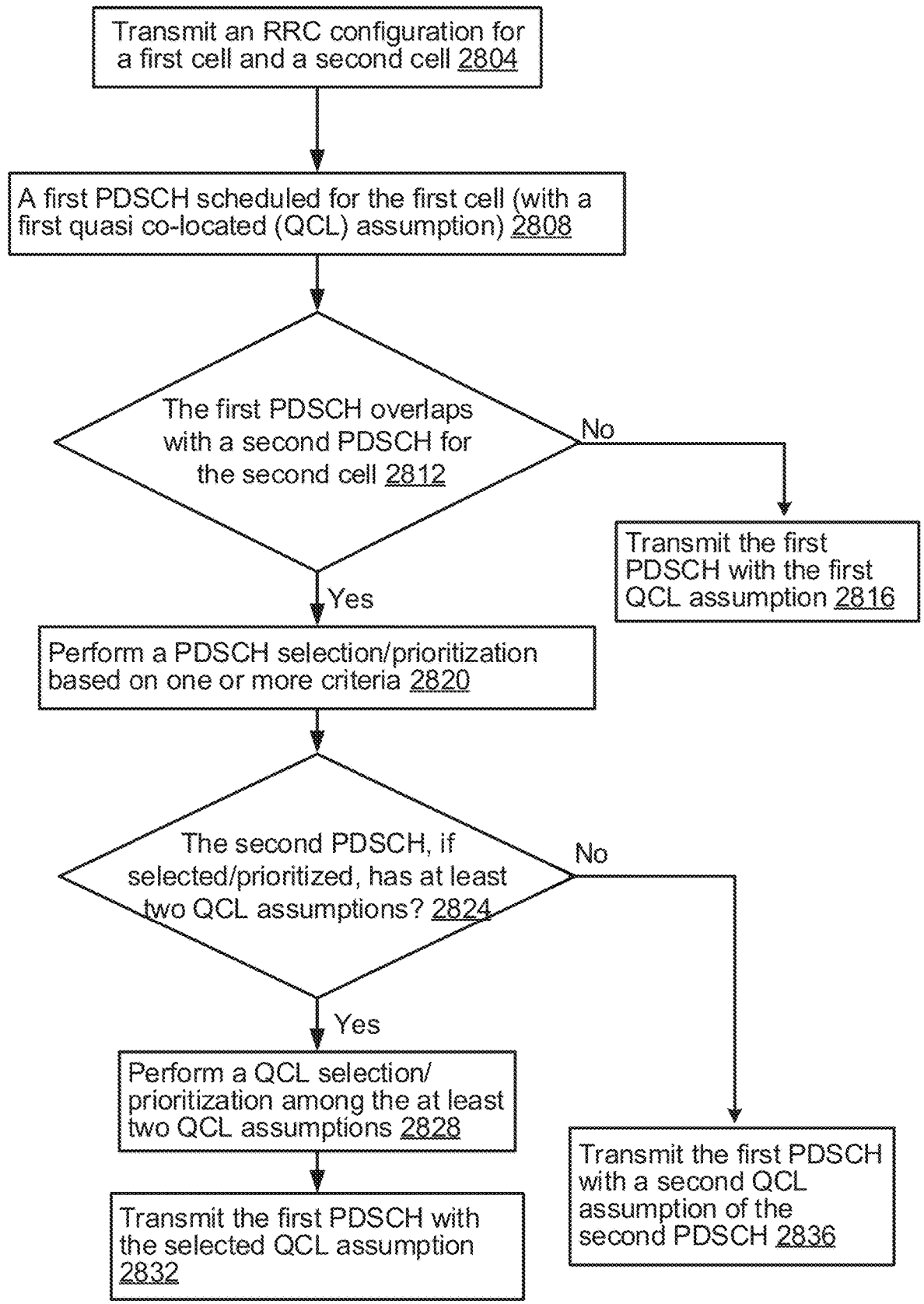
FIG. 28 shows an example method for downlink beam management.

FIG. 28 shows an example method for downlink beam management. At step 2804, a base station may send (e.g., transmit) an RRC configuration for a first cell and a second cell to the wireless device. At step 2808, a base station and/or a TRP may schedule a first PDSCH for the first cell, for example, by sending (e.g., transmitting) DCI to the wireless device. The DCI may schedule the first PDSCH with a first QCL assumption. At step 2816, the base station may send (e.g., transmit) the first PDSCH with the first QCL assumption, for example, if the first PDSCH does not overlap with a second PDSCH for the second cell. At step 2820, the base station may perform a PDSCH selection/prioritization based on one or more criteria, for example, if the first PDSCH overlaps with the second PDSCH. At step 2824, the base station may select/prioritize the second PDSCH based on the one or more criteria. The base station may select/prioritize the second PDSCH based on procedures described with reference to FIGS. 18-20. At step 2836, the base station may send (e.g., transmit) the first PDSCH with a second QCL assumption of the second PDSCH, for example, if the second PDSCH has only a single QCL assumption (e.g., the second QCL assumption). At step 2828, the base station may perform a QCL selection/prioritization among at least two QCL assumptions, for example, if the second PDSCH has the at least two QCL assumptions. The selection/prioritization may be based on procedures described with reference to FIGS. 26A-26C. At step 2832, the base station may send (e.g., transmit) the first PDSCH with a QCL assumption selected at step 2828.

A wireless device and a base station may be aligned to use a same QCL assumption for transmission and/or reception of one or more PDSCH transmissions. The wireless device may have better signal reception, for example, if the base station sends (e.g., transmits) a PDSCH with a first QCL assumption (e.g., a DM-RS of the PDSCH is QCL-ed with a first RS) and the wireless device receives the PDSCH with the first QCL assumption.

A wireless device may perform a method comprising multiple operations. The wireless device may transmit an indication of a time duration threshold. The wireless device may receive downlink control information (DCI) associated with a physical downlink shared channel (PDSCH). The wireless device may determine a time offset between a reception of the DCI and a reception of a scheduled PDSCH transmission associated with the DCI. The wireless device may determine, based on the time offset being less than the time duration threshold, a first transmission configuration indication (TCI) state and a second TCI state. The wireless device may receive, based on a first reference signal associated with the first TCI state and based on a second reference signal associated with the second TCI state, the scheduled PDSCH transmission.

The wireless device may also perform one or more additional operations. The receiving the scheduled PDSCH transmission may comprise: receiving, based on the first reference signal associated with the first TCI state, a first portion of the scheduled PDSCH transmission; and receiving, based on the second reference signal associated with the second TCI state, a second portion of the scheduled PDSCH transmission. The wireless device may receive one or more configuration parameters for a control resource set (CORESET). The determining the first TCI state and the second TCI state may be further based on a determination that the CORESET is not configured to indicate a TCI state. The DCI associated with the PDSCH may be for scheduling the PDSCH. The determining the first TCI state and the second TCI state may be further based on a determination that the DCI does not indicate a TCI state. At least one first demodulation reference signal (DM-RS) port for the scheduled PDSCH transmission may be quasi co-located with the first reference signal. At least one second DM-RS port for the scheduled PDSCH transmission may be quasi co-located with the second reference signal. The at least one first DM-RS port for the scheduled PDSCH transmission may be quasi co-located with the first reference signal with respect to a quasi co-location type indicated by the first TCI state. The at least one second DM-RS port for the scheduled PDSCH may be quasi co-located with the second reference signal with respect to a quasi co-location type indicated by the second TCI state. The wireless device may receive second DCI associated with a second PDSCH. The wireless device may receive, based on a determination that the scheduled PDSCH transmission overlaps in time with a second scheduled PDSCH transmission associated with the second DCI, the second scheduled PDSCH transmission. The receiving the second scheduled PDSCH transmission may be based on a determination that a first index associated with the first TCI state is less than a second index associated with the second TCI state. The time duration threshold may be associated with at least one of: a capability of the wireless device; a first time of reception of the DCI and a second time of reception of the scheduled PDSCH transmission; or a minimum time offset supported by the wireless device.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the DCI. A computer-readable medium may store instructions that, when executed, cause performance of the described method, additional operations and/or include the additional elements.

A wireless device may perform a method comprising multiple operations. The wireless device may receive one or more configuration parameters for a control resource set (CORESET). The wireless device may receive, via the CORESET, first downlink control information (DCI) for scheduling a physical downlink shared channel (PDSCH). The wireless device may determine that the CORESET is not configured to indicate a TCI state. The wireless device may receive, based on a first reference signal associated with a first TCI state and based on a second reference signal associated with a second TCI state, a scheduled PDSCH transmission associated with the first DCI.

The wireless device may also perform one or more additional operations. The receiving the scheduled PDSCH transmission may comprise: receiving, based on the first reference signal associated with the first TCI state, a first portion of the scheduled PDSCH transmission; and receiving, based on the second reference signal associated with the second TCI state, a second portion of the scheduled PDSCH transmission. The wireless device may determine a time offset between a reception of the first DCI and a reception of the scheduled PDSCH transmission associated with the first DCI. The wireless device may determine, based on the time offset being less than a time duration threshold, the first TCI state and the second TCI state. The first DCI associated with the PDSCH may be for scheduling the PDSCH. The wireless device may, based on the determining that the CORESET is not configured to indicate the TCI state, determine the first TCI state; and determine the second TCI state. At least one first demodulation reference signal (DM-RS) port for the scheduled PDSCH transmission may be quasi-co located with the first reference signal. At least one second DM-RS port for the scheduled PDSCH transmission may be quasi co-located with the second reference signal. The at least one first DM-RS port for the scheduled PDSCH transmission may be quasi co-located with the first reference signal with respect to a quasi co-location type indicated by the first TCI state. The at least one second DM-RS port for the scheduled PDSCH transmission may be quasi co-located with the second reference signal with respect to a quasi co-location type indicated by the second TCI state. The wireless device may receive second DCI associated with a second PDSCH. The wireless device may receive, based on a determination that the scheduled PDSCH transmission overlaps in time with a second scheduled PDSCH transmission associated with the second DCI, the second scheduled PDSCH transmission.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the first DCI. A computer-readable medium may store instructions that, when executed, cause performance of the described method, additional operations and/or include the additional elements.

A wireless device may perform a method comprising multiple operations. The wireless device may receive one or more configuration parameters for a control resource set (CORESET). The wireless device may receive, via the CORESET, first downlink control information (DCI) for scheduling a physical downlink shared channel (PDSCH). The wireless device may determine that the first DCI does not indicate a TCI state. The wireless device may receive, based on a first reference signal associated with a first TCI state and based on a second reference signal associated with a second TCI state, a scheduled PDSCH transmission associated with the first DCI.

The wireless device may also perform one or more additional operations. The receiving the scheduled PDSCH transmission may comprise: receiving, based on the first reference signal associated with the first TCI state, a first portion of the scheduled PDSCH transmission; and receiving, based on the second reference signal associated with the second TCI state, a second portion of the scheduled PDSCH transmission. The wireless device may determine a time offset between a reception of the first DCI and a reception of the scheduled PDSCH transmission associated with the first DCI. The wireless device may determine, based on the time offset being less than a time duration threshold, the first TCI state and the second TCI state. The first DCI associated with the PDSCH may be for scheduling the PDSCH. The wireless device may, based on the determining that the first DCI does not indicate the TCI state: determine the first TCI state; and determine the second TCI state. At least one first demodulation reference signal (DM-RS) port for the scheduled PDSCH transmission may be quasi-co located with the first reference signal. At least one second DM-RS port for the scheduled PDSCH transmission may be quasi co-located with the second reference signal. The at least one first DM-RS port for the scheduled PDSCH transmission may be quasi co-located with the first reference signal with respect to a quasi co-location type indicated by the first TCI state. The at least one second DM-RS port for the scheduled PDSCH may be quasi co-located with the second reference signal with respect to a quasi co-location type indicated by the second TCI state. The wireless device may receive second DCI associated with a second PDSCH. The wireless device may receive, based on a determination that the scheduled PDSCH transmission overlaps in time with a second scheduled PDSCH transmission associated with the second DCI, the second scheduled PDSCH transmission.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the first DCI. A computer-readable medium may store instructions that, when executed, cause performance of the described method, additional operations and/or include the additional elements.

Figure 29:
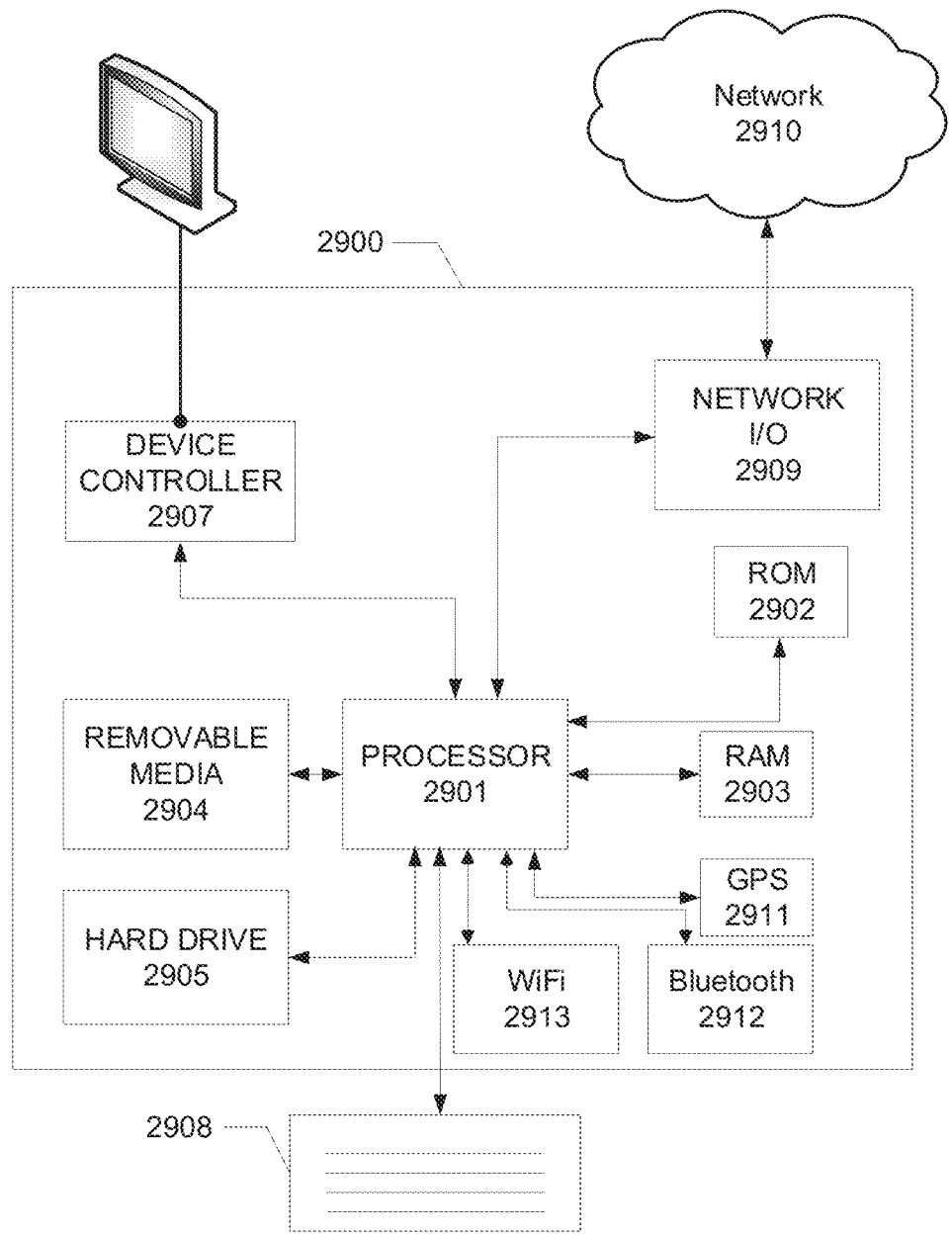
FIG. 29 shows example elements of a computing device that may be used to implement any of the various devices described herein.

FIG. 29 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 2900 may include one or more processors 2901, which may execute instructions stored in the random-access memory (RAM) 2903, the removable media 2904 (such as a Universal Serial Bus (USB) drive, compact disk (CD) or digital versatile disk (DVD), or floppy disk drive), or any other desired storage medium. Instructions may also be stored in an attached (or internal) hard drive 2905. The computing device 2900 may also include a security processor (not shown), which may execute instructions of one or more computer programs to monitor the processes executing on the processor 2901 and any process that requests access to any hardware and/or software components of the computing device 2900 (e.g., ROM 2902, RAM 2903, the removable media 2904, the hard drive 2905, the device controller 2907, a network interface 2909, a GPS 2911, a Bluetooth interface 2912, a WiFi interface 2913, etc.). The computing device 2900 may include one or more output devices, such as the display 2906 (e.g., a screen, a display device, a monitor, a television, etc.), and may include one or more output device controllers 2907, such as a video processor. There may also be one or more user input devices 2908, such as a remote control, keyboard, mouse, touch screen, microphone, etc. The computing device 2900 may also include one or more network interfaces, such as a network interface 2909, which may be a wired interface, a wireless interface, or a combination of the two. The network interface 2909 may provide an interface for the computing device 2900 to communicate with a network 2910 (e.g., a RAN, or any other network). The network interface 2909 may include a modem (e.g., a cable modem), and the external network 2910 may include communication links, an external network, an in-home network, a provider's wireless, coaxial, fiber, or hybrid fiber/coaxial distribution system (e.g., a DOCSIS network), or any other desired network. Additionally, the computing device 2900 may include a location-detecting device, such as a global positioning system (GPS) microprocessor 2911, which may be configured to receive and process global positioning signals and determine, with possible assistance from an external server and antenna, a geographic position of the computing device 2900.

The example in FIG. 29 may be a hardware configuration, although the components shown may be implemented as software as well. Modifications may be made to add, remove, combine, divide, etc. components of the computing device 2900 as desired. Additionally, the components may be implemented using basic computing devices and components, and the same components (e.g., processor 2901, ROM storage 2902, display 2906, etc.) may be used to implement any of the other computing devices and components described herein. For example, the various components described herein may be implemented using computing devices having components such as a processor executing computer-executable instructions stored on a computer-readable medium, as shown in FIG. 29. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A wireless device comprising:
one or more processors; and
memory storing instructions that, when executed by the one or more processors, cause the wireless device to:
receive one or more physical downlink shared channel (PDSCH) configuration parameters indicating one or more transmission configuration indication (TCI) state configurations to configure quasi co-location (QCL) relationships between at least one downlink reference signal and demodulation reference signal (DM-RS) ports of PDSCH of a cell;
receive downlink control information (DCI) scheduling a PDSCH for the cell, wherein a time offset between a reception of the DCI and the PDSCH is less than a time duration threshold for QCL;
based on the time offset being less than the time duration threshold, determine two TCI states for receiving the PDSCH, wherein the two TCI states indicate downlink reference signals with QCL types set to QCL TypeD; and
based on both of the downlink reference signals, with the QCL type set to the QCL TypeD, indicated by the two TCI states being different from a reference signal, with a QCL type set to QCL TypeD, used for receiving a downlink reception that overlaps with the PDSCH in at least one symbol, prioritize one of the downlink reception or the PDSCH.

2. The wireless device of claim 1, wherein:
the cell is a first cell;
the PDSCH is via the first cell;
the downlink reception is via a second cell.

3. The wireless device of claim 2, wherein the first cell and the second cell operate in intra-band carrier aggregation (CA).

4. The wireless device of claim 1, wherein the reference signal used for receiving the downlink reception is not quasi co-located, with respect to QCL Type D, with:
a first reference signal indicated by a first TCI state of the two TCI states; and
a second reference signal indicated by a second TCI state of the two TCI states.

5. The wireless device of claim 4, wherein the reference signal, used for receiving the downlink reception, is indicated by a QCL assumption of the downlink reception.

6. The wireless device of claim 5, wherein the QCL assumption of the downlink reception is a TCI state.

7. The wireless device of claim 1, wherein the PDSCH is prioritized among the downlink reception and the PDSCH.

8. The wireless device of claim 1, wherein the downlink reception is prioritized among the downlink reception and the PDSCH.

9. The wireless device of claim 8, wherein prioritization of the downlink reception comprises receiving the PDSCH using a QCL assumption of the downlink reception.

10. The wireless device of claim 9, wherein at least one DM-RS port of the PDSCH is quasi co-located with the reference signal indicated by the QCL assumption of the downlink reception with respect to QCL TypeD.

11. The wireless device of claim 8, wherein prioritization of the downlink reception comprises dropping reception of the PDSCH.

12. The wireless device of claim 9, wherein the QCL assumption of the downlink reception is a TCI state.

13. The wireless device of claim 1, wherein:
the PDSCH is a first PDSCH reception; and
the downlink reception is a second PDSCH reception.

14. The wireless device of claim 1, wherein the two TCI states for receiving the PDSCH indicate two QCL assumptions.

15. The wireless device of claim 1, wherein the instructions further cause the wireless device to:
receive, via a control resource set (coreset), a second DCI scheduling a second PDSCH, wherein:
the second DCI does not comprise a TCI field; and
a time offset between reception of the second DCI and the second PDSCH is equal to or greater than the time duration threshold; and
receive, using two TCI states, the second PDSCH based on:
the second DCI not comprising the TCI field; and
the time offset between reception of the second DCI and the second PDSCH being equal to or greater than the time duration threshold, wherein the two TCI states used to receive the second PDSCH comprises a TCI state or a QCL assumption of the coreset that the wireless device receives the second DCI.

16. The wireless device of claim 15, wherein the coreset is not configured with a TCI-present-in-DCI parameter indicating that DCIs transmitted via the coreset does not comprise a TCI field.

17. The wireless device of claim 15, wherein the instructions further cause the wireless device to monitor, via the coreset, downlink control channels using the TCI state or the QCL assumption.

18. The wireless device of claim 1, wherein the instructions further cause the wireless device to:
receive a second DCI scheduling a second PDSCH, wherein:
a time offset between reception of the second DCI and the second PDSCH is equal or greater than the time duration threshold; and
the second DCI comprises a TCI field indicating two TCI states for the second PDSCH;
receive a third DCI scheduling a downlink signal, wherein:
a time offset between reception of the third DCI and the downlink signal is less than a second time duration threshold; and
the downlink signal overlaps in at least one symbol with the second PDSCH; and
receive the downlink signal using a first TCI state of the two TCI states of the second PDSCH based on:
the time offset between reception of the third DCI and the downlink signal being less than the second time duration threshold; and
the downlink signal overlapping in the at least one symbol with the second PDSCH.

19. The wireless device of claim 1, wherein:
at least one DM-RS port of the downlink reception is quasi co-located with the reference signal with respect to QCL TypeD; and
the downlink reception is prioritized among the PDSCH and the downlink reception.

20. The wireless device of claim 19, wherein the instructions further cause the wireless device to:
receive a second DCI scheduling a second PDSCH, wherein:
a time offset between reception of the second DCI and the second PDSCH is equal or greater than the time duration threshold; and
the second DCI comprises a TCI field indicating two TCI states for the second PDSCH;
receive a third DCI scheduling a downlink signal, wherein:
a time offset between reception of the third DCI and the downlink signal is less than a second time duration threshold; and
the downlink signal overlaps in at least one symbol with the second PDSCH; and
receive the downlink signal using a first TCI state of the two TCI states of the second PDSCH based on:
the time offset between reception of the third DCI and the downlink signal being less than the second time duration threshold; and
the downlink signal overlapping in the at least one symbol with the second PDSCH.

* * * * *